US011967676B2

(12) United States Patent
Chan et al.

(10) Patent No.: US 11,967,676 B2
(45) Date of Patent: Apr. 23, 2024

(54) CATHOLYTES FOR A SOLID-STATE BATTERY

(71) Applicant: QuantumScape Battery, Inc., San Jose, CA (US)

(72) Inventors: Jan Chan, San Jose, CA (US); Aram Yang, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 0 days.

(21) Appl. No.: 18/320,074

(22) Filed: May 18, 2023

(65) Prior Publication Data

US 2023/0327184 A1 Oct. 12, 2023

Related U.S. Application Data

(63) Continuation of application No. PCT/US2022/051433, filed on Nov. 30, 2022.

(60) Provisional application No. 63/264,693, filed on Nov. 30, 2021.

(51) Int. Cl.
*H01M 10/056* (2010.01)

(52) U.S. Cl.
CPC .. *H01M 10/056* (2013.01); *H01M 2300/0065* (2013.01)

(58) Field of Classification Search
None
See application file for complete search history.

(56) References Cited

U.S. PATENT DOCUMENTS

| | | | |
|---|---|---|---|
| 3,839,306 A | 10/1974 | Emerson et al. |
| 4,567,031 A | 1/1986 | Riley |
| 5,738,957 A | 4/1998 | Amine et al. |
| 5,783,332 A | 7/1998 | Amine et al. |
| 6,204,219 B1 | 3/2001 | Brezny et al. |
| 6,333,128 B1 | 12/2001 | Takuya et al. |
| 6,420,069 B2 | 7/2002 | Amine et al. |
| 6,589,299 B2 | 7/2003 | Missling et al. |
| 6,613,478 B2 | 9/2003 | Munakata et al. |
| 6,613,479 B2 | 9/2003 | Fukuzawa et al. |
| 6,623,890 B2 | 9/2003 | Munakata et al. |
| 6,677,082 B2 | 1/2004 | Thackeray et al. |
| 6,680,143 B2 | 1/2004 | Thackeray et al. |
| 6,939,383 B2 | 9/2005 | Eastin et al. |
| 6,964,828 B2 | 11/2005 | Lu et al. |
| 7,078,128 B2 | 7/2006 | Lu et al. |
| 7,135,252 B2 | 11/2006 | Thackeray et al. |
| 7,205,073 B2 | 4/2007 | Kim et al. |

(Continued)

FOREIGN PATENT DOCUMENTS

| | | |
|---|---|---|
| CN | 1547277 A | 11/2004 |
| CN | 1 218 422 C | 9/2005 |

(Continued)

OTHER PUBLICATIONS

U.S. Appl. No. 90/012,243, filed Jul. 19, 2013, Thackeray et al.

(Continued)

*Primary Examiner* — Nathanael T Zemui
(74) *Attorney, Agent, or Firm* — Squire Patton Boggs (US) LLP

(57) ABSTRACT

Provided herein are compositions which are useful as electrolytes and/or catholytes in an electrochemical cell that includes a solid-state separator and a lithium-metal anode.

18 Claims, 12 Drawing Sheets

(56) References Cited

U.S. PATENT DOCUMENTS

| | | | |
|---|---|---|---|
| 7,314,684 | B2 | 1/2008 | Kang et al. |
| 7,468,223 | B2 | 12/2008 | Thackeray et al. |
| 7,517,613 | B2 | 4/2009 | Yuasa et al. |
| 7,709,149 | B2 | 5/2010 | Paulsen et al. |
| 7,968,235 | B2 | 6/2011 | Amine et al. |
| 8,241,791 | B2 | 8/2012 | Lu et al. |
| 8,268,198 | B2 | 9/2012 | Shin et al. |
| 8,277,683 | B2 | 10/2012 | Deng et al. |
| 8,465,556 | B2 | 6/2013 | Oladeji |
| 8,492,030 | B2 | 7/2013 | Park et al. |
| 8,591,774 | B2 | 11/2013 | Koenig et al. |
| 8,685,565 | B2 | 4/2014 | Lu et al. |
| 8,808,405 | B2 | 8/2014 | Oladeji |
| 8,865,348 | B2 | 10/2014 | Sun et al. |
| 9,190,660 | B2 | 11/2015 | Takemoto et al. |
| 9,692,041 | B2 | 6/2017 | Aihara et al. |
| 10,141,567 | B2 | 11/2018 | Choi et al. |
| 10,199,649 | B2 | 2/2019 | Beck et al. |
| 10,923,295 | B2 | 2/2021 | Raman et al. |
| 11,342,630 | B2 | 5/2022 | Roberts et al. |
| 11,430,613 | B2 | 8/2022 | Mitchell et al. |
| 11,545,666 | B2 | 1/2023 | Wang et al. |
| 11,545,667 | B2 | 1/2023 | Saidi |
| 11,581,526 | B2 | 2/2023 | Wurm et al. |
| 11,587,741 | B2 | 2/2023 | Raman et al. |
| 2003/0042473 | A1 | 3/2003 | Kloeppner et al. |
| 2005/0164084 | A1 | 7/2005 | Adamson et al. |
| 2008/0314482 | A1 | 12/2008 | Suzuki et al. |
| 2010/0014215 | A1 | 1/2010 | Zhong et al. |
| 2010/0068376 | A1 | 3/2010 | Chen et al. |
| 2010/0151332 | A1 | 6/2010 | Lopez et al. |
| 2011/0039155 | A1 | 2/2011 | Deguchi |
| 2011/0111298 | A1 | 5/2011 | Lopez et al. |
| 2011/0260099 | A1 | 10/2011 | Paulsen et al. |
| 2012/0064395 | A1 | 3/2012 | Chang et al. |
| 2012/0129045 | A1 | 5/2012 | Gin et al. |
| 2012/0282522 | A1 | 11/2012 | Axelbaum et al. |
| 2013/0157141 | A1 | 6/2013 | Zhong et al. |
| 2013/0202502 | A1 | 8/2013 | Schulz-Dobrick et al. |
| 2014/0193714 | A1 | 7/2014 | Kim et al. |
| 2015/0050522 | A1 | 2/2015 | Manthiram et al. |
| 2015/0099169 | A1 | 4/2015 | Dudney et al. |
| 2016/0156021 | A1 | 6/2016 | Aihara et al. |
| 2016/0268586 | A1 | 9/2016 | Kawakami et al. |
| 2016/0276658 | A1 | 9/2016 | Choi |
| 2017/0162901 | A1 | 6/2017 | Chen et al. |
| 2017/0179484 | A1 | 6/2017 | Park et al. |
| 2017/0321083 | A1 | 11/2017 | Fenn et al. |
| 2018/0034101 | A1 | 2/2018 | Lee et al. |
| 2018/0076446 | A1 | 3/2018 | Glock et al. |
| 2019/0044146 | A1 | 2/2019 | Ito et al. |
| 2020/0066463 | A1* | 2/2020 | Kinoshita ............ H01M 50/20 |
| 2021/0193398 | A1 | 6/2021 | Raman et al. |
| 2021/0249647 | A1 | 8/2021 | Wurm et al. |
| 2021/0399338 | A1* | 12/2021 | Arnold ................ H01M 50/431 |
| 2022/0029166 | A1 | 1/2022 | Hippauf et al. |
| 2022/0029242 | A1 | 1/2022 | Hippauf et al. |
| 2022/0246977 | A1 | 8/2022 | Brezesinski et al. |
| 2022/0278362 | A1 | 9/2022 | Finsy et al. |
| 2022/0293952 | A1 | 9/2022 | Brown |
| 2023/0042207 | A1 | 2/2023 | Kang et al. |
| 2023/0343954 | A1 | 10/2023 | Yu et al. |

FOREIGN PATENT DOCUMENTS

| | | |
|---|---|---|
| CN | 102 255 069 A | 11/2011 |
| CN | 105 006 594 A | 10/2015 |
| CN | 110 137 561 A | 8/2019 |
| CN | 111 952 562 A | 11/2020 |
| JP | 2003-059492 A | 2/2003 |
| JP | 2004-047448 A | 2/2004 |
| JP | 2004-193115 A | 7/2004 |
| JP | 2010-015959 A | 1/2010 |
| JP | 2013149586 A | 8/2013 |
| JP | 2013-218838 A | 10/2013 |
| JP | 2016-85843 A | 5/2016 |
| KR | 20210129841 A | 10/2021 |
| WO | WO 2018/044952 | 3/2018 |
| WO | WO 2019/213159 | 11/2019 |
| WO | WO 2019/245461 A1 | 12/2019 |
| WO | WO 2020/097018 A1 | 5/2020 |
| WO | WO 2022056039 A1 | 3/2022 |

OTHER PUBLICATIONS

Notice of Preliminary Rejection for the Korean Patent Application No. 10-2022-7044508 issued on Mar. 21, 2023 and its English translation.

International Search report and written opinion of PCT/US2022/051433 dated May 15, 2023; 16 pages.

Aiken et al., "A Survey of In Situ Gas Evolution during High Voltage Formation in Li-Ion Pouch Cells", Journal of the Electrochemical Society, 162 (4) A760-A767 (2015).

Amaresh, S. et al., "Facile synthesis of $ZrO_2$ coated $Li_2CoPO_4F$ cathode materials for lithium secondary batteries with improved electrochemical properties," Journal of Power Sources, 244, 2013, pp. 395-402.

Amatucci, Glenn et al., "Fluoride based electrode materials for advanced energy storage devices," Journal of Fluorine Chemistry, vol. 128, Issue 4, Apr. 2007, pp. 243-262.

Amine, K. et al., "A New Three-Volt Spinel $Li_{1+x}Mn_{1.5}Ni_{0.5}O_4$ for Secondary Lithium Batteries," J. Electrochem. Soc., vol. 143, No. 5, May 1996, pp. 1607-1613.

Ariyoshi, Kingo et al., "Structural change of $LiNi_{frax;1;2}Mn_{frax;1;2}O_2$ during charge and discharge in nonaqueous lithium cells," Journal of Physics and Chemistry of Solids, 69, 2008, pp. 1238-1241.

Armstrong, A. Robert et al., "Demonstrating Oxygen Loss and Associated Structural Reorganization in the Lithium Battery Cathode $Li[Ni_{0.2}Li_{0.2}Mn_{0.6}]O_2$," J. Am. Chem. Soc., 2006, vol. 128, pp. 8694-8698.

Armstrong, A. Robert et al., "Synthesis of layered $LiMnO_2$ as an electrode for rechargeable lithiu batteries," Nature, vol. 381, Jun. 6, 1996, pp. 499-500.

Armstrong, A. Robert et al., "The Layered Intercalation Compounds $Li(Mn_{1-y}, CO_y)O_2$: Positive Electrode Materials for Lithium-Ion Batteries," Journal of Solid State Chemistry, 145, 1999, pp. 549-556.

Ates, Mehmet Nurullah et al., "A Li-Rich Layered Cathode Material with Enhanced Structural Stability and Rate Capability for Li-on Batteries," Journal of the Electrochemical Society, 161 (3), 2014, pp. A355-A363.

Ates, Mehmet Nurullah et al., "Mitigation of Layered to Spinel Conversion of a Li-Rich Layered Metal Oxide Cathode Material for Li-Ion Batteries," Journal of the Electrochemical Society, 161 (3), 2014, pp. A290-A301.

Aurbach, Doron et al., "Studies of Aluminum-Doped $LiNi_{0.5}Co_{0.2}Mn_{0.3}O_2$: Electrochemical Behavior, Aging, Structural Transformations, and Thermal Characteristics," Journal of the Electrochemical Society, 162 (6), 2015, pp. A1014-A1027.

Bains, J. et al., "$Li(Ni_{0.40}Mn_{0.40}Co_{0.15}Al_{0.05})O_2$: A promising positive electrode material for high-power and safe lithium-ion batteries," Journal of Power Sources, 196, 2011, pp. 8625-8631.

Bareno et al., "Local Structure of Layered Oxide Electrode Materials for Lithium-Ion Batteries," Adv. Mater., 2010, 22, pp. 1122-1127.

Bareno et al., "Long-Range and Local Structure in the Layered Oxide $Li_{1.2}Co_{0.4}Mn_{0.4}O_2$," Chem. Mater., 2011, 23, pp. 2039-2050.

Benedek, R. et al., "Theory of Overlithiation Reaction in $LiMO_2$ Battery Electrodes," Chem. Mater., 2006, 18, pp. 1296-1302.

Bettge, Martin et al., "Improving high-capacity $Li_{1.2}Ni_{0.15}Mn_{0.55}Co_{0.1}O_2$-based lithium-ion cells by modifiying the positive electrode with alumina," Journal of Power Sources, 233, 2013, pp. 346-357.

Borkowska et al., "Composite polyether electrolytes with Lewis acid type additives", Electrochimica Acta, vol. 46, No. 10-11, Mar. 15, 2001, pp. 1737-1746, XP004231591, ISSN: 0013-4686, DOI: 10.1016/S0013-4686.

(56) References Cited

OTHER PUBLICATIONS

Burns et al., "Impedance Reducing Additives and Their Effect on Cell Performance", Journal of the Electrochemical Society, 159 (7) A1105-A1113 (2012).

Burns et al., "The Impact of Varying the Concentration of Vinylene Carbonate Electrolyte Additive in Wound Li-Ion Cells", Journal of the Electrochemical Society, 159 (2) A85-A90 (2012).

Busche et al., "Dynamic formation of a solid-liquid electrolyte interphase and its consequences for hybrid-battery concepts", Nature Chemistry, vol. 8, May 2016, pp. 426-434; DOI: 10.1038/NCHEM. 2470.

Bhattacharya, Jishnu et al., "Prediction b1 Quaternary Spinel Oxides a Li-Battery Cathodes: Cation Site Preference, Metal Mixing, Voltage an Phase Stability," Journal of the Electrochemical Society, 161 (9), 2014, pp. A1440-A1446.

Caldin, E.F. et al., "Kinetics and Thermodynamics of the Complex-formation of Nickel(II) and Cobalt(II) Ions with Ammonia and Pyridine-2-azodimethylaniline in Water, at Pressures from 1 bar to 2 kbar," Journal of the Chemical Society, Farady Transactions 1, vol. 68, 1972, pp. 2247-2258.

Camardese, J. et al., "Synthesis of Spherical Core-Shell $Ni(OH)_2$—$Ni_{frax;1;2}Mn_{frax;1;2}(OH)_2$ Particles via a Continuously Stirred Tank Reactor," Journal of the Electrochemical Society, 161 (6), 2014, pp. A890-A895.

Cheng, Ho-Ming et al., "Enhanced Cycleabity in Lithium Ion Batteries: Resulting from Atomic Layer Depostion of $Al_2O_3$ or $TiO_2$ on $LiCoO_2$ Electrodes," J. Phys. Chem. C, 2012, 116, pp. 7629-7637.

Chiang, Yet-Ming et al., "High Capacity, Temperature-Stable Lithium Aluminum Manganese Oxide Cathodes for Rechargeable Batteries," Electrochemical and Solid-State Letters, 2 (3) (1999) pp. 107-110.

Chiba, Kazuki et al., "$Na_xLi_{0.7-x}Ni_{1-y}Mn_yO_2$ as a new positive electrode material for lithiumion batteries," Journal of Power Sources, 311, 2016, pp. 103-110.

Cho, Jaephil et al., "A Breakthrough in the Safety of Lithium Secondary Batteries by Coating the Cathode Material with $AlPO_4$ Nanoparticles," Angew. Chem. Int. Ed., 2003, 42, pp. 1618-1621.

Cho, Woosuk et al., "Improved electrochemical and thermal properties of nickel rich $LiNi_{0.6}Co_{0.2}Mn_{0.2}O_2$ cathode materials by $SiO_2$ coating," Journal of Power Sources, 282, 2015, pp. 45-50.

Cho, Yonghyun et al., "A New Type of Protective Surface Layer for High-Capacity Ni-Based Cathode Materials: Nanoscaled Surface Pillaring Layer," Nano Lett., 2013, 13, pp. 1145-1152.

Cho, Yonghyun et al., Supporting Information "A New Type of Protective Surface Layer for High-Capacity Ni-Based Cathode Materials: Nanoscaled Surface Pillaring Layer," Nano Lett., 2013, 13, 16 pages.

Choi et al., "Recent advances in the electrolytes for interfacial stability of high-voltage cathodes in lithium-ion Batteries", The Royal Society of Chemistry 2015, 5, 2732-2748.

Choi, J. et al., "Investigation of the Irreversible Capacity Loss in the Layered $LiNi_{1/3}Mn_{1/3}Co_{1/3}O_2$ Cathodes," Electrochemical and Solid-State Letters, 8 (8), 2005, pp. C102-C105.

Choi, S. et al., "Factors Influencing the Layered to Spinel-like Phase Transition in Layered Oxide Cathodes," Journal of the Electrochemical Society, 2002, 149 (9), pp. A1157-A1163.

Chung, Kyung Yoon et al., "Comparative studies between oxygen-deficient $LiMn_2O_4$ and Al-doped $LiMn_2O_4$," Journal of Power Sources, 146, 2005, pp. 226-231.

Clause, O. et al., "Preparation and Characterization of Nickel-Aluminum Mixed Oxides Obtained by Thermal Decomposition of Hydrotalcite-Type Precursors," Journal of Catalysis, 133, 1992, pp. 231-246.

Conry, Thomas E. et al., "Structural Underpinnings of the Enhanced Cycling Stability upon Al-Substitution in $LiNi_{o.45}Mn_{0.45}Co_{0.1-y}AlO_2$ Positive Electrode Materials for Li-ion Batteries," Chem. Mater. 2012, 24, pp. 3307-3317.

Delmas, C. et al. "Layered Li(Ni, M)$O_2$ Systems as the Cathode Material in Lithium-Ion Batteries," MRS Bulletin, Aug. 2002, pp. 608-612.

Delp et al., "Importance of Reduction and Oxidation Stability of High Voltage Electrolytes and Additives", Electrochimica Acta 209 (2016) 498-510.

Deng, Haixia et al., "Nanostructured Lithium Nickel Manganese Oxides for Lithium-Ion Batteries," Journal of the Electrochemical Society, 157 (4), 2010, pp. A447-A452.

Deng, Z.Q. et al., "Influence of Cationic Substitutions on the Oxygen Loss and Reversible Capacity of Lithium-Rich Layered Oxide Cathodes," J. Phys. Chem. C, 2011, 115, pp. 7097-7103.

Doan, The Nam Long et al., "Recent developments in synthesis of $xLi_2MnO_3 \cdot (1-x)LiMO_2$ (M=Ni, Co, Mn) cathode powders for high-energy lithium rechargeable batteries," Frontiers in Energy Research, Energy Storage, Sep. 2014, vol. 2, Article 36, pp. 1-7.

Dou, Shumei, "Review and prospect of layered lithium nickel manganese oxide as cathode materials for Li-ion batteries," J Solid State Electrochem (2013) 17, pp. 911-926.

Dyatkin, B.L. et al., "The Acidic Properties of Fluorine-Containing Alcohols, Hydroxylamines and Oximes," Tetrahedron, 1965, vol. 21, pp. 2991-2995.

El Mofid, Wassima et al., "A high performance layered transition metal oxide cathode material obtained by simultaneous aluminum and iron cationic substitution," Journal of Power Sources, 268, 2014, pp. 414-422.

Eom, Junho et al., "Dependence of Electrochemical Behavior on Concentration and Annealing Temperature of $Li_xCoPO_4$ Phase-Grown $LiNi_{0.8}Co_{0.16}Al_{00.4}O_2$ Cathode Materials," Journal of the Electrochemical Society, 155 (3), 2008, pp. A228-A233.

Fathi et al., "Ultra High-Precision Studies of Degradation Mechanisms in Aged $LiCoO_2$/Graphite Li-Ion Cells", Journal of the Electrochemical Society, 161 (10) A1572-A1579 (2014).

Fu, Chaochao et al., "Nickel-Rich Layered Microspheres Cathodes: Lithium/Nickel Disordering and Electrochemical Performance," ACS Appl Mater Interfaces, Sep. 24, 2014, 6(18), 15822-15831.

Fu, Xian-Zhu et al., "Nickel oxyhydroxides with various oxidation states prepared by chemicaloxidation of spherical β—$Ni(OH)_2$," Solid State Ionics, 178, 2007, pp. 987-993.

Gallagher, Kevin G. et al., "Correlating hysteresis and voltage fade in lithium- and manganese-rich layered transition-metal oxide electrodes," Electrochemistry Communications, 33, 2013, pp. 96-98.

Glaeser, Hans H. et al., "The Kinetics of Ammonia Exchange between Nickel Ammine Complexes and Ammonia in Aqueous and Anhydrous Ammonia Solutions Measured by Nuclear Magnetic Resonance of Nitrogen-14." Inorganic Chemistry, vol. 4, No. 2, Feb. 1965, pp. 206-208.

Gopalakrishnan, J., "Chimie Douce Approaches to the Synthesis of Metastable Oxide Materials," Chemistry of Materials, vol. 7, No. 7, Jul. 1995, pp. 1265-1275.

Gummow, R J et al., "Lithium Extraction From Orthorhombic Lithium Manganese Oxide and the Phase Transformation to Spinel," Mat. Res. Bull., vol. 28, 1993, pp. 1249-1256.

Gummow, R.J. et al., "Improved capacity retention in rechargeable 4 V lithium/lithiummanganese oxide (spinel) cells," Solid State Ionics, 69, 1994, pp. 59-67.

Gutierrez, A. et al., "Understanding the Effects of Cationic and Anionic Substitutions in Spinel Cathodes of Lithium-Ion Batteries," Journal of the Electrochemical Society, 160 (6), 2013, pp. A901-A905.

Han et al., "Distinct Reaction Characteristics of Electrolyte Additives for High-Voltage Lithium-Ion Batteries: Tris(trimethylsilyl) Phosphite, Borate, and Phosphate", Electrochimica Acta 215 (2016) 455-465.

Han, Ah Reum et al., "Soft Chemical Dehydration Route to Carbon Coating of Metal Oxides: Its Application for Spinel Lithium Manganate," J. Phys. Chem. C, 2007, 111, pp. 11347-11352.

Hayashi, N. et al., "Cathode of $LiMg_yMn_{2-y}O_4$ and $LiMg_yMn_{2-y}O_4$, Spinel Phases for Lithium Secondary Batteries," Journal of the Electrochemical Society, 146 (4), 1999, pp. 1351-1354.

Hong, Jihyun et al., "Critical Role of Oxygen Evolved from Layered Li-Excess Metal Oxides in Lithium Rechargeable Batteries," Chem. Mater. 2012, 24, pp. 2692-2697.

(56) References Cited

OTHER PUBLICATIONS

Hou, Peiyu et al., "A high energy density Li-rich positive-electrode material with superior performances via a dual chelating agent co-precipitation route," J. Mater. Chem. A, 2015, 3, 9427-9431.

Hou, Peiyu et al., *Supporting Information* "A high energy density Li-rich positive-electrode material with superior performances via a dual chelating agent co-precipitation route," J. Mater. Chem. A, 2015, 3, 11 pages.

Hua, Chuanshan et al., "Study of full concentration-gradient Li(Ni$_{0.8}$Co$_{0.1}$Mn$_{0.1}$)O$_2$ cathode material for lithium ion batteries," Journal of Alloys and Compounds, 614, 2014, pp. 264-270.

Hua, Weibo et al., "Na-doped Ni-rich LiNi$_{0.5}$Co$_{0.2}$Mn$_{0.3}$o2 cathode material with both high rate capability and high tap density for lithium ion batteries," Dalton Trans., 2014, 43, pp. 14824-14832.

Hwang et al. (J. Mater. Chem., 2003, 13, 1962-1968).

Hwang, Sooyeon et al., "Investigation of Changes in the Surface Structure of Li$_x$ Ni$_{0.8}$Co$_{0.15}$Al$_{0.05}$O$_2$ Cathode Materials Induced by the Initial Charge," Chem. Mater. 2014, 26, pp. 1084-1092.

Hwang, Sooyeon et al., "Using Real-Time Electron Microscopy to Explore the Effects of Transition-Metal Composition on the Local Thermal Stability in Charged Li$_x$Ni$_y$Mn$_z$Co$_{1-y-z}$O$_2$ Cathode Materials," Chem. Mater., 2015, 27 (11), pp. 3927-3935.

Hy, Sunny et al., "Understanding the Role of Ni in Stabilizing the Lithium-Rich High-Capacity Cathode Material Li[Ni$_x$Li$_{(1-2x)/3}$Mn$_{(2-3x)/3}$]O$_2$ (0≤x≤0.5)," Chem. Mater. 2014, 26, pp. 6919-6927.

Irving, H. et al., "The Stability of Transition-metal Complexes," Journal of the Chemical Society, Issue 0, 1953, pp. 3192-3210.

Ito et al., "A rocking chair type all-solid-state lithium ion battery adopting Li$_2$O—ZrO$_2$ coated LiNi$_{0.8}$Co$_{0.15}$Al$_{0.05}$O$_2$ and a sulfide based electrolyte", Journal of Power Sources, vol. 248, 2014, pp. 943-950.

Jarvis, Karalee A. et al., "Atomic Structure of a Lithium-Rich Layered Oxide Material for Lithium-Ion Batteries: Evidence of a Solid Solution," Chem. Mater., 2011, 23 (16), pp. 3614-3621.

Johnson, C.S. et al. "Structural and electrochemical studies of a-manganese dioxide(α-MnO$_2$)", Journal of Power Sources 68 (1997) pp. 570-577.

Johnson, Christopher S. et al., "Structural Characterization of Layered Li$_x$Ni$_{0.5}$Mn$_{0.5}$O$_2$ (0 ≤x≤2) Oxide Electrodes for Li Batteries," Chem. Mater. 2003, 15, pp. 2313-2322.

Johnson, Christopher S. et al., "Synthesis, Characterization and Electrochemistry of Lithium Battery Electrodes: xLi$_2$MnO$_3$ • (1-x)LiMn$_{0.333}$Ni$_{0.333}$Co$_{0.333}$O$_2$ (0 ≤x≤ 7))," Chem. Mater. 2008, 20, pp. 6095-6106.

Johnson, Christopher S. et al., "The role of Li$_2$MO$_2$ structures (M=metal ion) in the electrochemistry of (x)LiMn$_{0.5}$Ni$_{0.5}$O$_2$·(1-x)Li$_2$TiO$_3$ electrodes for lithium-ion batteries," Electrochemistry Communications, 4, 2002, pp. 492-498.

Jouanneau, S. et al., "Preparation, Structure, an Thermal Stability of New Ni$_x$Co$_{1-2x}$Mn$_x$(OH)2 (0 ≤x≤ ½) Phases," Chem.Mater., vol. 15, No. 2, 2003, pp. 495-499.

Ju, Jin-Wook et al., "Optimization of Layered Cathode Material with Full Concentration Gradient for Lithium-Ion Batteries," J. Phys. Chem. C, 2014, 118, pp. 175-182.

Jung et al., "Li$_3$BO$_3$-Li$_2$CO$_3$: Rationally Designed Buffering Phase for Sulfide All-Solid-State Li-Ion Batteries", Chemistry of Materials, DOI: 10.1021/acs.chemmater.8b03321 • Publication Date (Web): Oct. 19, 2018.

Kam, Kinson C. et al., "Aliovalent titanium substitution in layered mixed Li Ni—Mn—Co oxides for lithium battery applications," J. Mater. Chem., 2011, 21, pp. 9991-9993.

Kam, Kinson C. et al., "Electrochemical and Physical Properties of Ti-Substituted Layered Nickel Manganese Cobalt Oxide (NMC) Cathode Materials," Journal of the Electrochemical Society, 159 (8), 2012, pp. A1383-A1392.

Kang, Kisuk et al., "Electrodes with High Power and High Capacity for Rechargeable Lithium Batteries," Science, vol. 311, Feb. 17, 2006, pp. 977-980.

Kang, Kisuk et al., "Factors that affect Li mobility in layered lithium transition metal oxides," Physical Review B, 74, 2006, pp. 094105-1-094195-7.

Kang, S.-H. et al., "The Effects of Acid Treatment on the Electrochemical Properties of 0.5 Li$_2$Mn$_{O3}$ • 0.5 LiNi$_{0.44}$Co$_{0.25}$Mn$_{0.31}$O$_2$ Electrodes in Lithium Cells," Journal of the Electrochemical Society, 153 (6), 2006, pp. A1186-A1192.

Kang, Sun-Ho et al., "Enhancing the rate capability of high capacity xLi$_2$MnO$_3$ • (1-x)LiMO$_2$ (M=Mn, Ni, Co) electrodes by Li—Ni—PO$_4$ treatment," Electrochemistry Communications, 11, 2009, pp. 748-751.

Kang, Sun-Ho et al., "First-cycle irreversibility of layered Li—Ni—Co—Mn oxide cathode in Li-ion batteries," Electrochimica Acta, 54, 2008, pp. 684-689.

Kang, Sun-Ho et al., "Investigating the first-cycle irreversibility of lithium metal oxide cathodes for Li batteries," J Mater Sci (2008) 43, pp. 4701-4706.

Kim, Chunjoong et al., "Stabilization of Battery Electrode/Electrolyte Interfaces Employing Nanocrystals with Passivating Epitaxial Shells," Chem. Mater. 2015, 27, pp. 394-399.

Kim, Duho et al., "Design of Nickel-rich Layered Oxides Using d Electronic Donor for Redox Reactions," Chem. Mater. 2015, 27, pp. 6450-6456.

Kim, H.-J. et al., "Coprecipitation and Characterization of Nickel-Cobalt-Manganese Hydroxides Precursor for Battery Cathode Materials," Abstract #849, 224th ECS Meeting, 2013 The Electrochemical Society, 1 page.

Kim, Hyun-Soo et al., "Enhanced electrochemical properties of LiNi$_{1/3}$Mn$_{1/3}$O$_2$ cathode material by coating with LiAlO$_2$ nanoparticles," Journal of Power Sources, 161, 2006, pp. 623-627.

Kim, Jeom-Soo et al., "Electrochemical and Structural Properties of xLi$_2$M'O$_3$ (1-x)LiMn$_{0.5}$Ni$_{0.5}$O$_2$ Electrodes for Lithium Batteries (M'=Ti, Mn, Zr; 0 ≤ v ≤ 0.3)," Chem. Mater. 2004, 16, pp. 1996-2006.

Kim, Ji Woo et al., "Unexpected high power performance of atomic layer deposition coated Li[Ni$_{1/3}$Mn$_{1/3}$Co$_{1/3}$]O$_2$ cathodes," Journal of Power Sources, 254, 2014, pp. 190-197.

Kong, Fantai et al., "Multivalent Li-Site Doping of Mn Oxides for Li-Ion Batteries," J. Phys. Chem. C, 2015, 119, pp. 21904-21912.

Koo et al., "Vinylene carbonate and tris(trimethylsilyl) phosphite hybrid additives to improve the electrochemical performance of spinel lithium manganese oxide/graphite cells at 60 ° C.", Electrochimica Acta 173 (2015) 750-756.

Kosova, N.V. et al., "Mixed layered Ni—Mn—Co hydroxides: Crystal structure, electronic state of ions, and thermal decomposition," Journal of Power Sources 174, 2007, pp. 735-740.

Kosova, N.V. et al., "Optimization of Ni$^{2+}$/Ni$^{3+}$ ratio in layered Li(Ni,Mn, Co)O$_2$ cathodes for better electrochemistry," Journal of Power Sources, 174, 2007, pp. 965-969.

Kovanda, Frantisek et al., "Mixed oxides obtained from Co and Mn containing layered double hydroxides: Preparation, characterization, and catalytic properties," Journal of Solid State Chemistry, 179, 2006, pp. 812-823.

Kovanda, Frantisek et al., "Thermal behaviour of Ni—Mn layered double hydroxide and characterization of formed oxides," Solid State Sciences, 5, 2003, pp. 1019-1026.

Koyama, Yukinori et al., "Crystal and electronic structures of superstructural Li$_{1-x}$[Co$_{1/3}$Ni$_{1/3}$Mn$_{1/3}$]O$_2$ (0 ≤x≤ 1)," Journal of Power Sources 119-121, 2003, pp. 644-648.

Kang, Sun-Ho et al., "Effects of Li Content on Structure an Electrochemical Properties of 0.5 Li2MnO3 Electrodes in Lithium Cel15 (1.0-4.8 V)," Journal of the Electrochemical Society, 154 (4), 2007, pp. A268-A274.

Lee, D.-K. et al., "High capacity Li[Li$_{0.2}$Ni$_{0.2}$Mn$_{0.6}$]O$_2$ cathode materials via a carbonate co-precipitation method," Journal of Power Sources 162, 2006, pp. 1346-1350.

Lee, Jyh-Tsung et al., "Low-temperature atomic layer deposited Al$_2$O$_3$ thin film on layer structure cathode for enhanced cycleability in lithium-ion batteries," Electrochimica Acta 55, 2010, pp. 4002-4006.

Lee, M.-H et al., "Synthetic optimization of Li[Ni$_{1/3}$Co$_{1/3}$Mn$_{1/3}$]O$_2$ via co-precipitation," Electrochimica Acta, 50, 2004, pp. 939-948.

(56) References Cited

OTHER PUBLICATIONS

Levasseur et al., "Oxygen Vacancies and Intermediate Spin Trivalent Cobalt Ions in Lithium-Overstoichiometric $LiCoO_2$", Chemistry of Materials, Jan. 1, 2003, vol. 15, No. 1, pp. 348-354, XP055474666.
Li et al., "Hybrid Polymer/Garnet Electrolyte with a Small Interfacial Resistance for Lithium-Ion Batteries", Angew. Chem. 2017, 129, 771-774; DOI: 10.1002/ange.201608924.
Li et al., "New electrolytes for lithium ion batteries using LiF salt and boron based anion receptors", Journal of Power Sources 184 (2008) 517-521; doi:10.1016/j.jpowsour.2008.03.016.
Li, Jinfeng et al., "Improve First-Cycle Efficiency and Rate Performance of Layered-Layered $Li_{1.2}Mn_{0.6}Ni_{0.2}O_2$ Using Oxygen Stabilizing Dopant," ACS Appl. Mater. Interfaces, 2015, 7, pp. 16040-16045.
Li, Jing et al., "Synthesis and Characterization of the Lithium-Rich Core-Shell Cathodes with Low Irreversible Capacity and Mitigated Voltage Fade," Chem. Mater. 2015, 27, pp. 3366-3377.
Li, Y. Y et al., "Understanding Long-Term Cycling Performance of $Li_{1.2}Ni_{0.15}Mn_{0.55}Co_{0.1}O_2$-Graphite Lithium-Ion Cells," Journal of the Electrochemical Society, 160 (5), 2013, pp. A3006-A3019.
Li, Zheng et al., "Stability and Rate Capability of Al Substituted Lithium-Rich High-Manganese Content Oxide Materials for Li-Ion Batteries," Journal of the Electrochemical Society, 159 (2), 2012, pp. A116-A120.
Liang, Jianbo et al., "Topochemical Synthesis, Anion Exchange, and Exfoliation of Co—Ni Layered Double Hydroxides: A Route to Positively Charged Co—Ni Hydroxide Nanosheets with Tunable Composition," Chem. Mater. 2010, 22, pp. 371-378.
Liao, Jin-Yun et al., "Surface-modified concentration-gradient Ni-rich layered oxide cathodes for high-energy lithium-ion batteries," Journal of Power Sources, 282, 2015, pp. 429-436.
Lim, Jae-Hwan et al., "Electrochemical characterization of $Li_2MnO_3$-$Li[Ni_{1/3}Co_{1/3}Mn_{1/3}]O_2$-$LiNiO_2$ cathode synthesized via co-precipitation for lithium secondary batteries," Journal of Power Sources, 189, 2009, pp. 571-575.
Lin, Feng et al., "Surface reconstruction and chemical evolution of stoichiometric layered cathode materials for lithium-ion batteries," Nature Communications, Mar. 27, 2014, pp. 1-9.
Liu et al., "Achieving high capacity in bulk-type solid-state lithium-ion battery based on $Li_{6.75}La_3Zr_{1.75}Ta_{0.25}O_{12}$ electrolyte: Interfacial resistance", journal of Power Sources 324 (2016) pp. 349-357.
Liu, H. H et al., "Electrochemical performance of $LifePO_4$ cathode material coated with $ZrO_2$ nanolayer," Electrochemistry Communications 10 (2008), pp. 165-169.
Liu, Hao-Han et al., "Structure Evolution and Electrochemical Performance of $Al_2O_3$-coated $LiNi_{0.4}Co_{0.2}Mn_{0.4}O_2$ During Charge-discharge Cycling," Chem. Res. Chinese Universities 2012, 28(4), pp. 686-690.
Liu, Jun et al. "Spherical nanoporous $LiCoPO_4$/C composites as high performance cathode materials for rechargeable lithium-ion batteries," J. Mater. Chem., 2011, 21, pp. 9984-9987.
Liu, Jun et al., "Carbon-coated high capacity layered $Li[Li_{0.2}Mn_{0.54}Ni_{0.13}Co_{0.13}]O_2$ cathodes," Electrochemistry Communications 12 (2010), pp. 750-753.
Liu, Jun et al., "Conductive Surface Modification with Aluminum of High Capacity Layered $Li[Li_{0.2}Mn_{0.54}Ni_{0.13}Co_{0.13}]O_2$ Cathodes," J. Phys. Chem. C 2010, 114, pp. 9528-9533.
Liu, Jun et al., "Understanding the Improvement in the Electrochemical Properties of Surface Modified 5 V $LiMn_{142}Ni_{042}Co_{016}O_4$ Spinel Cathodes in Lithium-ion Cells," Chem. Mater. 2009, 21, pp. 1695-1707.
Liu, Lijun et al., "Electrochemical and In Situ Synchrotron XRD Studies on $Al_2O_3$-Coated $LiCoO_2$ Cathode Material," Journal of the Electrochemical Society, 2014, 151 (9), A1344-A1351.
Liu, Shuang et al., "Long cycle life lithium ion battery with lithium nickel cobalt manganese oxide (NCM) cathode," Journal of Power Sources, 261, 2014, pp. 285-291.
Liu, Wen et al., "Nickel-Rich Layered Lithium Transitional-Metal Oxide for High-Energy Lithium-Ion Batteries," Angew. Chem. Int. Ed. 2015, 54, pp. 4440-4458.
Liu, Xizheng et al., "Study on the capacity fading of pristine and $FePO_4$ coated $LiNi_{1/3}Co_{1/3}Mn_{1/3}O_2$ by Electrochemical and Magnetical techniques," Electrochimica Acta 148, 2014, pp. 26-32.
Liu, Zhaoping et al., "Synthesis, Anion Exchange, and Delamination of Co—Al Layered Double Hydroxide: Assembly of the Exfoliated Nanosheet/Polyanion Composite Films and Magneto-Optical Studies," J. Am. Chem. Soc., 2006, 128, pp. 4872-4880.
Liu, Yi et al., "$Li_3V_2(PO_4)_3$-coated $Li_{1.17}Ni_{0.2}Co_{0.05}Mn_{0.58}O_2$ as the cathode materialswith high rate capability for Lithium ion batteries," Electrochimica Acta 147, 2014, pp. 696-703.
Luo, Wenbin et al., "Can Zr be Substituted for Co in $Co_{1-z}Zr_z(OH)_2$ and $LiCo_{1-z}Zr_zO_2$?," Journal of the Electrochemical Society, 158, (2), 2011, pp. A110-A114.
Luo, Wenbin et al., "Preparation of $Co_{1-z}Al_z(OH)_2(NO_3)_z$ Layered Double Hydroxides and $Li(Co_{1-z}Al_z)O_2$," Chem. Mater. 2009, 21, pp. 56-82.
Luo, Wenbin et al., "Synthesis, Characterization, and Thermal Stability of $LiNi_{1/3}Mn_{1/3}Co_{1/3}$-$zMgzO_2$, $LiNi_{1/3-z}Mn_{1/3}Co_{1/3}MgzO_2$, and $LiNi_{1/3}Mn_{1/3-z}Co_{1/3}MgzO_2$," Chem. Mater., 2010, 22, pp. 1164-1172.
Luo, Wenbin et al., "The Impact of Zr Substitution on the Structure, Electrochemical Performance and Thermal Stability of $Li[Ni_{1/3}Mn_{1/3-z}Co_{1/3}Zr_z]O_2$," Journal of the Electrochemical Society, 158 (4), 2011, pp. A428-A433.
Ma et al., "Ternary and Quaternary Electrolyte Additive Mixtures for Li-Ion Cells That Promote Long Lifetime, High Discharge Rate and Better Safety", Journal of The Electrochemical Society, 161 (9) A1261-A1265 (2014).
Ma et al., "Ternary Electrolyte Additive Mixtures for Li-Ion Cells that Promote Long Lifetime and Less Reactivity with Charged Electrodes at Elevated Temperatures", Journal of the Electrochemical Society, 162 (7) A1170-A1174 (2015).
Ma, Jin et al., "A highly homogeneous nanocoating strategy for Li-rich Mn-based layered oxides based on chemical conversion," Journal of Power Sources, 277, 2015, pp. 393-402.
Ma, Miaomiao et al., "Structural and electrochemical behavior of $LiMn_{0.4}Ni_{0.4}Co_{0.2}O_2$," Journal of Power Sources, 165, 2007, pp. 517-534.
Makimura, Yoshinari et al., "Lithium insertion material of $LiNi_{frac;1;2}Mn_{frac;1;2}O_2$ for advanced lithium-ion batteries," Journal of Power Sources, 119-121, 2003, pp. 156-160.
Manthiram, Arumugam, "Materials Challenges and Opportunities of Lithium-Ion Batteries," J. Phys. Chem. Lett., 2011, 2, pp. 176-184.
Markus, Isaac M. et al., "Computational and Experimental Investigation of Ti Substitution in $Li_1(Ni_xMn_xCo_{1-2x-y}Ti_y)O$ for Lithium Ion Batteries," J. Phys. Chem. Lett. 2014, 5, pp. 3649-3655.
McCalla, E. E et al., "Formation of Layered-Layered Composites in the Li—Co—Mn Oxide Pseudoternary System during Slow Cooling," Chem. Mater. 2013, 25, pp. 912-918.
McCalla, E. et al., "How Phase Transformations during Cooling Affect Li—Mn—Ni—O Positive Electrodes in Lithium Ion Batteries," Journal of the Electrochemical Society, 160 (8), 2013, pp. A1134-A1138.
McCalla, E. et al., "Lithium loss mechanisms during synthesis of layered $LiXNi_{2-x}O_2$ for lithium-ion batteries," Solid State Ionics 219, 2012, pp. 11-19.
McCalla, E. et al., "Structural Study of the Li—Mn—Ni Oxide Pseudoternary System of Interest for Positive Electrodes of Li-Ion Batteries," Chem. Mater., 2013, 25, pp. 989-999.
McCalla, E. et al., "The Role of Metal Site Vacancies in Promoting Li—Mn—Ni-0 Layered Solid Solutions," Chem. Mater., 2013, 25, pp. 2716-2721.
McCalla, E. et al., "The spinel and cubic rocksalt solid-solutions in the Li—Mn—Ni oxide pseudo-ternary system," Solid State Ionics, 242, 2013, pp. 1-9.
Meng, Ying S. et al., "Combining Ab Initio Computation with Experiments for Designing New Electrode Materials for Advanced Lithium Batteries: $LiNi_{1/3}Fe_{frac;1;6}Co_{frac;1;6}Mm_{1/3}O_2$," Journal of the Electrochemical Society, 151 (8), 2004, pp. A1134-A1140.

(56) References Cited

OTHER PUBLICATIONS

Mohanty, Debasish et al., "Structural transformation of a lithium rich Li1.2Co0.1Mn0.55Ni0.15O2 cathode during high voltage cycling resolved by in situ X-ray diffraction," Journal of Power Sources, 229, 2013, pp. 239-248.

Mueller-Neuhaus, J.R. et al., "Understanding Irreversible Capacity in $Li_xNi_{1-y}Fe_yO_2$ Cathode Materials," Journal of the Electrochemical Society, 147 (10), 2000, pp. 3598-3605.

Mulder, Grietus et al., "Comparison of commercial battery cells in relation to material properties," Electrochimica Acta, 87, 2013, pp. 473-488.

Myung, Seung-Taek et al., "Progress in High-Capacity Core-Shell Cathode Materials for Rechargeable Lithium Batteries," J. Phys. Chem. Lett., 5, 2014, pp. 671-679.

Nagash, A.R. et al., "Effect of oxygen non-stoichiometry on the electrochemical performance of lithium manganese oxide spinels," Journal of Power Sources, 102, 2001, pp. 68-73.

Nie et al., "Some Lewis acid-base adducts involving boron trifluoride as electrolyte additives for lithium ion cells", Journal of Power Sources, vol. 328, Aug. 17, 2016, pp. 433-442; DOI: 10.1016/J.JPOWSOUR.2016.08.048.

Noh, Hyung-Joo et al., "Cathode Material with Nanorod Structure—An Application for Advanced High-Energy and Safe Lithium Batteries," Chem. Mater., 2013, 25, pp. 2109-2115.

Noh, Hyung-Joo et al., "Comparison of the structural and electrochemical properties of layered $Li[Ni_xCo_yMn_z]O_2$ (x=⅓, 0.5, 0.6, 0.7, 0.8 and 0.85) cathode material for lithium-ion batteries," Journal of Power Sources, 233, 2013, pp. 121-130.

Noh, Hyung-Joo et al., "Formation of a Continuous Solid-Solution Particle and its Application to Rechargeable Lithium Batteries," Adv. Funct. Mater., 2013, 23, pp. 1028-1036.

Oh, Pilgun et al., "Superior Long-Term Energy Retention and Volumetric Energy Density for Li-Rich Cathode Materials," Nano Lett., 2014, 14, pp. 5965-5972.

Oh, Pilgun et al., *Supporting Information* "Superior Long-Term Energy Retention and Volumetric Energy Density for Li-Rich Cathode Materials," Nano Lett. 2014, 14, 12 pages.

Ohzuku, Tsutomo et al., "Electrochemistry and Structural Chemistry of $LiNiO_2$ (R3m) for 4 Volt Secondary Lithium Cells," J. Electrochem. Soc. 140(7), 1993, pp. 1862-1870.

Ohzuku, Tsutomo et al., "High-capacity lithium insertion materials of lithium nickel manganese oxides for advanced lithium-ion batteries: toward rechargeable capacity more than 300 mA h g$^{-1}$" J. Mater. Chem., 2011, 21, pp. 10179-101888.

Ohzuku, Tsutomu et al., "Synthesis and Characterization of $Li[Ni_{frax;1;2}Mn_{frax;3;2}]O_4$ by Two-Step Solid State Reaction," Journal of the Ceramic Society of Japan, 110 [5], 2002, pp. 501-505.

Oishi, Masatsugu et al., "Direct observation of reversible charge compensation by oxygen ion in Li-rich manganese layered oxide positive electrode material, $Li_{1.16}Ni_{0.15}Co_{0.19}Mn_{0.50}O_2$," Journal of Power Sources, 276, 2015, pp. 89-94.

Oka, Y. Y et al., "High-Temperature Cycling Performance of $LiNi_{1/3}Co_{1/3}Mn_{frax;1;2}O_2$ Cathode with DLC Protective Film," Journal of the Electrochemical Society, 162 (2), 2015, pp. A3032-A3037.

Okada, Shigeto et al., "Fluoride Phosphate Li2COPO4F as a High Voltage Cathode in Li-ion Batteries," Journal of Power Sources, 146, 2005, pp. 565-569.

Okamoto, Kaoru et al., "X-Ray Absorption Fine Structure Study on Layered $LIMO_2$ (M=Ni, Mn, Co) Cathode Materials," Journal of the Electrochemical Society, 153(6), 2006, pp. A1120-A1127.

Paik, Younkee et al., "Lithium and Deuterium NMR Studies of Acid-Leached Layered Lithium Manganese Oxides," Chem. Mater., 2002, 14, pp. 5109-5115.

Palacin, M.R. et al., "Electrochemical and structural study of the 3.3 V reduction step in defective $Li_xMn_2O_4$ and $LiMn_2O_{(4-y)}F_y$ compounds," Journal of Power Sources 81-82, 1999, pp. 627-631.

Palacin, M.R. et al., "On the role of defects in decreasing the extra 3.3/3.95 and 4.5 V redox steps in Li—Mn—O spinels," Journal of Power Sources, 97-98, 2001, pp. 398-401.

Pan, Cheng-chi et al., "Recent development of $LiNi_xCo_yMn_zO_2$: Impact of micro/nano structures for imparting improvements in lithium batteries," Trans. Nonferrous Met. Soc. China, 23, 2013, pp. 108-119.

Park, B.-C., et al., "Improvement of structural and electrochemical properties of $AlF_3$-coated $Li[Ni_{1/3}Co_{1/3}Mn_{1/3}]O_2$ cathode materials on high voltage region," Journal of Power Sources, 178, 2008, pp. 826-831.

Park, Joong Sun et al., "Amorphous Metal Fluoride Passivation Coatings Prepared by Atomic Layer Deposition on $LiCoO_2$ for Li-Ion Batteries," Chem. Mater. 2015, 27, pp. 1917-1920.

Park, S.-H. et al., "Lithium-manganese-nickel-oxide electrodes with integrated layered-spinel structures for lithium batteries," Electrochemistry Communications, 9, 2007, pp. 262-268.

Paulsen, J. J M. et al., "Layered Li—Mn-Oxide with the O2 Structure: A Cathode Material for Li-Ion Cells Which Does Not Convert to Spinel", Journal of the Electrochemical Society, 146 (10), 1991, pp. 3560-3565.

Pires et al., "Tris(2,2,2-trifluoroethyl) phosphite as an electrolyte additive for high-voltage lithium-ion batteries using lithium-rich layered oxide cathode", Journal of Power Sources 296 (2015) 413-425.

Pouillerie, C. et al., "The $Li_xNi_{1-y}Mg_yO_2$ (y=0.05, 0.10) system: structural modifications observed upon cycling," Solid State Ionics, 132, 2000, pp. 15-29.

Prasad, R. et al., "Dopant-induced stabilization of rhombohedral $LiMnO_2$ against Jahn-Teller distortion," Physical Review B 71, 2005, 134111-1-134111-11.

Qi et al., "Lifetime limit of tris(trimethylsilyl) phosphite as electrolyte additive for high voltage lithium-ion batteries", J. Name., 2013, 00, 1-3.

Qian, Danna et al., "Uncovering the roles of oxygen vacancies cation migration in lithium excess layered oxides," Phys. Chem. Chem. Phys., 2014, 16, pp. 14665-14668.

Rashid, Muhammad et al., "Effect of Relaxation Periods over Cycling Performance of a Li-Ion Battery," Journal of the Electrochemical Society, 162 (2), 2015, pp. A3145-A3153.

Riley, Leah A., "Electrochemical effects of ALD surface modification on combustion synthesized $LiNi_{1/3}Mn_{1/3}Co_{1/3}O_2$ as a layered-cathode material," Journal of Power Sourcesm, 196, 2011, pp. 3317-3324.

Robert, Rosa et al., "Enhancement of the high potential specific charge in layered electrode materials for lithium-ion batteries," J. Mater. Chem. A, 2014, 2, pp. 8589-8598.

Rowe, Aaron W. et al., "Positive Electrode Materials in the Li—Mn—Ni—O System Exhibiting Anomalous Capacity Growth during Extended Cycling," Journal of the Electrochemical Society, 161 (3), 2014, pp. A308-A317.

Saavedra-Arias, Jose J. et al., "Synthesis and electrochemical properties of $Li(Ni_{0.8}Co_{0.1}Mn_{0.1})O_2$ cathode material: Ex situ structural analysis by Raman scattering and X-ray diffraction at various stages of charge-discharge process," Journal of Power Sources, 183, 2008, pp. 761-765.

Schleutker et al., "On the interfacial charge transfer between solid and liquid Li+ electrolytes", Phys. Chem. Chem. Phys., 2017, 19, 26596-26605.

Sekizawa, Oki et al., "Crystal and electronic structure change determined by various method for delithiation process of $Li_x(Ni,Mn)O_2$-based cathode material," Journal of Power Sources, 196, 2011, pp. 6651-6656.

Shen, Chong-Heng et al., "Facile Synthesis of The U-Rich Layered Oxide $Li_{1.23}Ni_{0.009}Co_{0.12}Mn_{0.56}O_2$ with SuperiorLithium Storage Performance and New Insights into Structural Transformation of the Layered Oxide Material during Charge-Discharge Cycle: In Situ XRD Characterization," ACS Appl. Mater. Interfaces, 2014, 6, pp. 5516-5524.

Shunmugasundaram, Ramesh et al., "High Capacity Li-Rich Positive Electrode Materials with Reduced First-Cycle Irreversible Capacity Loss," Chem. Mater. 2015, 27, pp. 757-767.

Son, In Hyuk et al., "Self-Terminated Artificial SEI Layer for Nickel-Rich Layered Cathode Material via Mixed Gas Chemical Vapor Deposition," Chem. Mater. 2015, 27, pp. 7370-7379.

(56) References Cited

OTHER PUBLICATIONS

Song et al., "A multifunctional phosphite-containing electrolyte for 5 V-class $LiNi_{0.5}Mn_{1.5}O_4$ cathodes with superior electrochemical performance", J. Mater. Chem. A, 2014, 2, 9506-9513.

Song et al., "Exploiting chemically and electrochemically reactive phosphite derivatives for high-voltage spinel $LiNi_{0.5}Mn_{1.5}O_4$ cathodes", Journal of Power Sources 302 (2016) 22-30.

Song, Jie et al., "Role of Oxygen Vacancies on the Performance of $Li[Ni_{0.5-x}Mn_{1.5+x}]O_4$ (x=0, 0.05, and 0.08) Spinel Cathodes for Lithium-Ion Batteries," Chem. Mater., 2012, 24 (15), pp. 3101-3109.

Sun, Yang-Kook et al., "High-energy cathode material for long-life and safe lithium batteries," Nature Materials, vol. 8, Apr. 2009, pp. 320-324.

Sun, Yang-Kook et al., "Nanostructured high-energy cathode materials for advanced lithium batteries," Nature Materials, vol. 11, 2012, pp. 942-947.

Sun, Yang-Kook et al., "Synthesis and Characterization of $Li[(Ni_{0.8}Co_{0.1}Mn_{0.1})_{0.8}(Ni_{0.5}Mn_{0.5})_{0.2}]O_2$ with the Microscale Core-Shell Structure as the Positive Electrode Material for Lithium Batteries," J. Am. Chem. Soc., 2005, 127, pp. 13411-13418.

Sun Yang-Kook et al., "The Role of $AlF_3$ Coatings in Improving Electrochemical Cycling of Li-Enriched Nickel-Manganese Oxide Electrodes for Li-Ion Batteries," Adv. Mater. 2012, 24, pp. 1192-1196.

Sun, Yang-Kook, "Concentration-Gradient Materials," Energy Storage & Conversion Material Laboratory, Hanyang University, (0305-30), 14 pages.

Tan, ShuangYuan et al., "Highly enhanced low temperature discharge capacity of $LiNi_{1/3}Co_{1/3}Mn_{1/3}O_2$ with lithium boron oxide glass modification," Journal of Power Sources, 277, 2015, pp. 139-146.

Tarascon, J.M. et al., "Synthesis Conditions and Oxygen Stoichiometry Effects on Li Insertion into the Spinel $LiMn_2O_4$," J. Electrochem. Soc., vol. 141, No. 6, Jun. 1994, pp. 1421-1431.

Tarascon, J.M. et al., "The Spinel Phase of $LiMn_2O_4$ as a Cathode in Secondary Lithium Cells," J. Electrochem. Soc., vol. 138, No. 10, Oct. 1991, pp. 2859-2864.

Thackeray, M. M. et al., "Advances in manganese-oxide 'composite' electrodes for lithium-ion batteries," J. Mater. Chem., 2005, 15, pp. 2257-2267.

Thackeray, M. M. et al., "$ZrO_2$- and $Li_2ZrO_3$-stabilized spinel and layered electrodes for lithium batteries," Electrochemistry Communications, 5, 2003, pp. 752-758.

Thackeray, M. M., "Structural Considerations of Layered and Spinel Lithiated Oxides for Lithium Ion Batteries," J. Electrochem. Soc., vol. 142, No. 8, Aug. 1995, pp. 2558-2563.

Thackeray, M.M. et al., "Comments on the structural complexity of lithium-rich $Li_{1+x}M_{1-x}O_2$ electrodes (M=Mn, Ni, Co) for lithium batteries," Electrochemistry Communications 8 (2006), pp. 1531-1538.

Thackeray, Michael M. et al., "$Li_2MnO_3$-stabilized $LiMO_2$ (M=Mn, Ni, Co) electrodes for lithium-ion batteries," J. Mater. Chem., 2007, 17, pp. 3112-3125.

Van Bommel, Andrew et al., "Analysis of the Growth Mechanism of Coprecipitated Spherical and Dense Nickel, Manganese, and Cobalt-Containing Hydroxides in the Presence of Aqueous Ammonia," Chem. Mater., 2009, 21, pp. 1500-1503.

Van Bommel, Andrew et al., "Synthesis of Spherical and Dense Particles of the Pure Hydroxide Phase $Ni_{1/3}Mn_{1/3}Co_{1/3}(OH)_2$," Journal of the Electrochemical Society, 156 (5), 2009, pp. A362-A365.

Van Der Ven, A., et al. "Lithium Diffusion in Layered $Li_xCoO_2$," Electrochemical and Solid-State Letters, 3 (7) (2000), pp. 301-304.

Wang et al., "A comparative study of Si-containing electrolyte additives for lithium-ion battery: Which one is better and why is it better", Journal of Power Sources 342 (2017) 677-684.

Wang et al., "A Systematic Study of Electrolyte Additives in $Li[Ni_{1/3}Mn_{1/3}Co_{1/3}]O_2$ (NMC)/Graphite Pouch Cells", Journal of the Electrochemical Society, 161 (12) A1818-A1827 (2014).

Wang et al., "Trimethyl borate as an electrolyte additive for high potential layered cathode with concurrent improvement of rate capability and cyclic stability", Electrochimica Acta 184 (2015) 40-46.

Wang, Dapeng et al., "Synthesis of high capacity cathodes for lithium-ion batteries by morphology-tailored hydroxide co-precipitation," Journal of Power Sources, 274, 2015, pp. 451-457.

Wang, Dapeng et al., "Synthesis of Lithium and Manganese-Rich Cathode Materials via an Oxalate Co-Precipitation Method," Journal of the Electrochemical Society, 160 (5), 2013, pp. A3108-A3112.

Wang, Q. Y. et al., "High capacity double-layer surface modified $Li[Li_{0.2}Mn_{0.54}Ni_{0.13}Co_{0.13}]O_2$ cathode with improved rate capability," J. Mater. Chem., 2009, 19, pp. 4965-4972.

Wang, Tao et al., "Synthesis optimization of $Li_{1+x}[Mn_{0.45}Co_{0.40}Ni_{0.15}]O_2$ with different spherical sizes via co- precipitation," Powder Technology, 187, 2008, pp. 124-129.

Wei et al. "Improved electrochemical performances of nanocrystalline $Li[Li_{0.2} Mn_{0.54}Ni_{0.13}Co_{0.13}]O_2$ cathode material for Li-ion batteries", RSC Advances, 2012, 2, pp. 3423-3429.

Wei, Yi et al., "Kinetics Tuning of Li-ion Diffusion in Layered $U(Ni_xMn_yCO_z)O_2$," J. Am. Chem. Soc., 2015, 137, pp. 8364-8367, together with Supporting Information, 48 pages.

Wilcox, James D. et al., "The Impact of Aluminum and Iron Substitution on the Structure and Electrochemistry of $Li(Ni_{0.4}Co_{0.2-y}M_yMn_{0.4})O_2$ Materials," Journal of the Electrochemical Society, 156 (12) 2009, pp. A1011-A1018.

Wilcox, James et al., "Structure and Electrochemistry of $LiNi_{1/3}Co_{1/3-y}MyMn_{1/3}O_2$ (M=Ti, Al, Fe) Positive Electrode Materials," Journal of the Electrochemical Society, 156 (3), 2009, pp. A192-A198.

Wolf-Goodrich, Silas et al., "Tailoring the surface properties of $LiNi_{0.4}Mn_{0.4}Co_{0.2}O_2$ by titanium substitution for improved high voltage cycling performance," Phys.Chem.Chem.Phys., 2015, 17, pp. 21778-21781.

Woo, S —W, et al. "Improvement of electrochemical and thermal properties of $Li[Ni_{0.8}Co_{0.1}Mn_{0.1}]O_2$ positive electrode materials by multiple metal (Al, Mg) substitution," Electrochimica Acta, 54, 2009, pp. 3851-3856.

Wu, Feng et al., "Effect of $Ni^{2+}$ Content on Lithium/Nickel Disorder for Ni-Rich Cathode Materials," ACS Appl. Mater. Interfaces 2015, 7, pp. 7702-7708.

Wu, Kuichen et al., "Effect of precursor and synthesis temperature on the structural and electrochemical properties of $Li(Ni_{0.5}Co_{0.2}Mn_{0.3})O_2$," Electrochimica Acta, 75, 2012, pp. 393-398.

Wu, Xiaobiao et al., "Sol-gel Synthesis of $Li_2CoPO_4F$/C Nanocomposite as a High-Power Cathode Material for Lithium-Ion Batteries," Journal of Power Sources, 220, 2012, pp. 122-129.

Wu, Y et al. "Structural stability of chemically delithiated layered $(1-z)Li[Li_{1/3}Mn_{frac;2;3}]O_2$-$zLi[Mn_{0.5-y}Ni_{0.5-y}CO_2y]O_2$ solid solution cathodes," Journal of Power Sources, 183, 2008, pp. 749-754.

Xia et al., "Fluorinated electrolyte for 4.5 V $Li(Ni_{0.4}Mn_{0.4}Co_{0.2})O_2$/ graphite Li-ion Cells", Journal of Power Sources 307 (2016) 340-350; http://dx.doi.org/10.1016/j.jpowsour.2015.12.132.

Xia et al., "Improving sulfolane-based electrolyte for high voltage Li-ion cells with electrolyte additives", Journal of Power Sources 324 (2016) 704-711.

Xiang, Xingde et al., "Understanding the Effect of $Co^{3+}$ Substitution on the Electrochemical Properties of Lithium-Rich Layered Oxide Cathodes for Lithium-Ion Batteries," J. Phys. Chem. C, 2014, 118, pp. 21826-21833.

Xiong, Xunhui et al., "A modified LiF coating process to enhance the electrochemical performance characteristics of $LiNi_{0.8}Co_{0.1}Mn_{0.1}O_2$ cathode materials," Materials Letters, 110, 2013, pp. 4-9.

Xu, Bo et al., "Identifying surface structural changes in layered Li-excess nickel manganese oxides in high voltage lithium-ion batteries: A joint experimental and theoretical study," Energy Environ. Sci., May 3, 20133, 11 pages.

Yabuuchi, Naoaki et al., "Novel lithium insertion material of $LiCo_{1/3}Ni_{1/3}Mn_{1/3}O_2$ for advanced lithium-ion batteries," Journal of Power Sources 119-121, 2003, pp. 171-174.

(56) References Cited

OTHER PUBLICATIONS

Yabuuchi, Naoki et al., "High-capacity electrode materials for rechargeable lithium batteries: $Li_3NbO_4$-based system with cation-disordered rocksalt structure," PNAS, vol. 112, No. 25, Jun. 23, 2015, pp. 7650-7655.

Yan, Jianhua et al., "Recent progress in Li-rich layered oxides as cathode materials for Li-ion batteries," RSC Adv., 2014, 4, pp. 63268-63284.

Yan, Pengfei et al., "Atomic-Resolution Visualization of Distinctive Chemical Mixing Behavior of Ni, Co, and Mn with Li in Layered Lithium Transition-Metal Oxide Cathode Materials," Chem. Mater., 2015, 27 (15), pp. 5393-5401.

Yang, Feifei et al., "Nanoscale Morphological and Chemical Changes of High Voltage Lithium-Manganese Rich NMC Composite Cathodes with Cycling," Nano Lett., 2014, 14, pp. 4334-4341.

Yang, Xiao-Qing et al., "Crystal structure changes of $LiMn_{0.5}Ni_{0.5}O_2$ cathode materials during charge and discharge studied by synchrotron based in situ XRD," Electrochemistry Communications, 4, 2002, pp. 649-654.

Yang, Yuan et al., "A membrane-free lithium/polysulfide semi-liquid battery for large-scale energy storage," Energy Environ. Sci., 2013, 6, pp. 1552-1558.

Yano, Akira et al., "Surface Structure and High-Voltage Charge/Discharge Characteristics of Al-Oxide Coated $LiNi_{1/3}Co_{1/3}Mn_{1/3}O_2$ Cathodes," Journal of the Electrochemical Society, 162 (2), 2015, pp. A3137-A3144.

Ye, Delai et al., "Ni-induced stepwise capacity increase in Ni-less Li-rich cathode materials for high performance lithium-ion batteries," Nano Research, 8(3), Feb. 2014, pp. 808-820.

Yin, S -C et al. X-ray/Neutron Diffraction and Electrochemical Studies of Lithium De/Re-Intercalation in $Li_{1-x}Co⅓Ni_{⅓}Mn ⅓O_2$ (x=0 --> 1), Chem. Mater. 2006, 18, pp. 1901-1910.

Yoon, Sung-Jun et al., "Improved Performances of $Li[Ni_{0.65}Co_{0.08}Mn_{0.27}]O_2$ Cathode Material with Full Concentration Gradient for Li-Ion Batteries," Journal of the Electrochemical Society, 162 (2), 2015, pp. A3059-A3063.

Yoon, Won-Sub et al. "Investigation of the Charge Compensation Mechanism on the Electrochemically Li-Ion Deintercalated $Li_{1-x}Co_{1/3}Ni_{1/3}Mn_{1/3}O_2$ Electrode System by Combination of Soft and Hard X-ray Absorption Spectroscopy," J. Am. Chem. Soc., 2005, 127, pp. 17479-17487.

Yoon, Won-Sub et al., "Electronic structural changes of the electrochemically Li-ion deintercalated $LiNi_{0.8}Co_{0.15}Al_{0.05}O_2$ cathode material investigated by X-ray absorption spectroscopy," Journal of Power Sources, 174, 2007, pp. 1015-1020.

Yoon, Won-Sub et al., "In Situ X-ray Absorption Spectroscopic Study on $LiNi0.5Mn0.5O2$ Cathode Material during Electrochemical Cycling," Chem. Mater. 2003, 15, pp. 3161-3169.

Yoon, Won-Sub et al., "Investigation of the Local Structure of the $LiNi_{0.5}Mn_{0.5}O_2$ Cathode Material during Electrochemical Cycling by X-Ray Absorption and NMR Spectroscopy," Electrochemical and Solid-State Letters, 5 (11), 2002, pp. A263-A266.

Yoon, Won-Sub et al., "Li MAS NMR and in situ X-ray studies of lithium nickel manganese oxides," Journal of Power Sources 119-121, 2003, pp. 649-653.

Yu, Haijun et al., "Study of the lithium/nickel ions exchange in the layered $LiNi_{0.42}Mn_{0.42}Co_{0.16}O_2$ cathode material for lithium ion batteries: experimental and first-principles calculations," Energy Environ. Sci., 2014, 11 pages.

Yue, Peng et al., "A low temperature fluorine substitution on the electrochemical performance of layered $LiNi_{0.8}Co_{0.1}Mn_{0.1}O_{2-z}F_z$ cathode materials," Electrochimica Acta, 92, 2013, pp. 1-8.

Yue, Peng et al., "Effect of fluorine on the electrochemical performance of spherical $LiNi_{0.8}Co_{0.1}Mn_{0.1}O_2$ cathode materials via a low temperature method," Powder Technology, 237, 2013 pp. 623-626.

Yue, Yang et al., "Growth mechanisms for spherical mixed hydroxide agglomerates prepared by co-precipitation method: A case of $Ni_{1/3}Co_{1/3}Mn_{1/3}(OH)_2$," Journal of Alloys and Compounds, 619, 2015, pp. 846-853.

Zhang et al., "Artificial Interface Deriving from Sacrificial Tris(trimethylsilyl)phosphate Additive for Lithium Rich Cathode Materials", Electrochimica Acta 117 (2014) 99-104.

Zhang et al., "Direct Visualization of the Interfacial Degradation of Cathode Coatings in Solid State Batteries: A Combined Experimental and Computational Study", Adv. Energy Mater. 2020, 1903778 (9 pages); DOI: 10.1002/aenm.201903779.

Zhang, H.Z et al., "Surface nitridation of Li-rich layered $Li(Li_{0.17}Ni_{0.25}Mn_{0.58})O_2$ oxide as cathode material for lithium-ion battery," J. Mater. Chem., 2012, 22, pp. 13104-13109.

Zhang, Shengmao et al., "Self-Assembled Hollow Spheres of $13-Ni(OH)_2$ and Their Derived Nanomaterials," Chem. Mater., 2009, 21, pp. 871-883.

Zhao et al., "Robust and sulfur-containing ingredient surface film to improve the electrochemical performance of LiDFOB-based high-voltage electrolyte", Electrochimica Ada 260 (2018) 536-548.

Zhao, Yujuan et al., "Enhanced Electrochemical Performance of $Li[Li_{0.2}Ni_{0.2}Mn_{0.6}]O_2$ Modified by Manganese Oxide Coating for Lithium-Ion Batteries," Electrochemical and Solid-State Letters, 14 (1), 2011, pp. A1-A5.

Zheng et al., "Interface modifications by anion receptors for high energy lithium ion batteries", Journal of Power Sources 250 (2014) 313-318.

Zhou, Fu et al., "Advantages of Simultaneous Substitution of Co in $Li[Ni_{1/3}Mn_{1/3}Co_{1/3}]O_2$ by Ni and Al," Electrochemical and Solid-State Letters, 12 (4), 2009, pp. A81-A83.

Zhou, Fu et al., "Coprecipitation Synthesis of $Ni_xMm1-x(OH)_2$ Mixed Hydroxides," Chem. Mater., vol. 22, No. 3, 2010, pp. 1015-1021.

Zhou, Fu et al., "Solid-State Synthesis as a Method for the Substitution of Al for Co in $LiNi_{1/3}Mn_{1/3}Co_{(1/3-z)}Al_zO_2$," Journal of the Electrochemical Society, 156 (10), 2009, pp. A796-A801.

Zhou, Fu et al., "The effect of Al substitution on the reactivity of delithiated $LiNi_{1/3}Mn_{1/3}Co_{(1/3-z)}Al_zO_2$ with non-aqueous electrolyte," Electrochemistry Communications 10 (2008), pp. 1168-1171.

Zhou, Hongming et al., "Enhanced performance of the electrolytes based on sulfolane and lithiumdifluoro(oxalate)borate with enhanced interfacial stability for Li $Ni_{0.5}Mn_{1.5}O_4$ cathode", Journal of Electroanalytical Chemistry, vol. 808, 2018, pp. 293-302; DOI: 10.1016/J.JELECHEM.2017.12.040.

Zhu, Ye et al., "Positive Electrode Passivation by LiDFOB Electrolyte Additive in High-Capacity Lithium-Ion Cells," Journal of the Electrochemical Society, 159 (12), 2012, pp. A2109-A2117.

International Search Report and written opinion of PCT/US2023/019468 dated Aug. 11, 2023; 14 pages.

Written Opinion of the PCT/US2022/053080 dated Mar. 30, 2023; 9 pages.

Yang et al., "Pushing Lithium Cobalt Oxides to 4.7 V by Lattice-Matched Interfacial Engineering", Advanced Energy Materials 2022, 12, 2200197; 12 pages.

Zhan et al., "Influence of annealing atmosphere on $Li_2ZrO_3$-coated $LiNi_{0.6}Co_{0.2}Mn_{0.2}O_2$ and its high-voltage cycling performance", Electrochimica Acta, vol. 300, Jan. 18, 2019, pp. 36-44.

Communication pursuant to Article 94(3) EPC for EP application No. 22851184.6 dated Jan. 25, 2024; 9 pages.

N.N.: "Wikipedia—Crystal strcuture", 2024, XP093120949, URL: https://en.wikipedia.org/wiki/Crystal structure as accessed on Jan. 18, 2024.

\* cited by examiner

CATHOLYTES FOR A SOLID-STATE BATTERY

CROSS-REFERENCE TO RELATED APPLICATIONS

This application is a continuation of PCT Patent Application No. PCT/US22/51433, filed Nov. 30, 2022, which claims priority to, and the benefit of, U.S. Provisional Patent Application No. 63/264,693, filed Nov. 30, 2021, and titled CATHOLYTES FOR A SOLID-STATE BATTERY, the entire contents of which are herein incorporated by reference in their entirety for all purposes.

FIELD

The present disclosure concerns solid-state rechargeable batteries and electrolytes and catholytes used in solid-state rechargeable batteries.

BACKGROUND

Solid-state rechargeable batteries, which include a lithium-metal anode, require a specific kind of solid-state electrolyte separator positioned between the cathode and anode. The solid-state electrolyte separator must be a solid, also stable in contact with lithium metal, and able to conduct $Li^+$ ions but not electrons at appreciable rates. Liquid-based rechargeable batteries that include carbon-based (e.g., graphite) anodes (i.e., negative electrode) don't use such solid-state electrolytes. Instead, between the cathode and anode in these liquid-based rechargeable batteries is a liquid electrolyte. These liquid electrolytes are typically carbonate-based in that they use carbonate solvents, such as diethyl carbonate or dimethyl carbonate, to dissolve a lithium-salt, such as $LiPF_6$.

In some publications, ethylene sulfite was used as an additive to carbonate-based solvent electrolytes. These compositions were optimized for graphite-based anodes. See, for example, https://doi.org/10.1149/1.1391630; https://doi.org/10.1021/la015553h; https://doi.org/10.1016/j.jpowsour.2010.08.092; https://doi.org/10.1016/j.jpowsour.2005.02.007; and https://doi.org/10.1039/C5CP04221F. There exists a need for new electrolytes and catholytes which are compatible with solid-state battery electrolyte separators.

SUMMARY

In one embodiment, provided herein is a catholyte solution including a lithium salt; and at least two aprotic $C_{3-10}$ heterocyclic molecules, each independently, in each instance, comprising at least one sulfur (S) ring atom and optionally substituted with 1 to 6 substituents.

In a second embodiment, provided herein is a catholyte solution comprising: a lithium salt; an aprotic $C_{3-10}$ heterocyclic molecule comprising at least one sulfur (S) ring atom and optionally substituted with 1 to 6 substituents.

In a third embodiment, provided herein is an electrochemical cell including: a positive electrode, a lithium-metal negative electrode, a solid-state electrolyte comprising a lithium-stuffed garnet, and a catholyte, wherein the catholyte includes: a lithium salt; and at least two $C_{3-10}$ heterocyclic molecules, each independently, in each instance, including at least one sulfur (S) ring atom and optionally substituted with 1 to 6 substituents.

In a fourth embodiment, provided herein is an electrochemical cell including: a positive electrode, a lithium-metal negative electrode, a solid-state electrolyte comprising a lithium-stuffed garnet, and a catholyte, wherein the catholyte includes: a lithium salt; and an aprotic $C_{3-10}$ heterocyclic molecule comprising at least one sulfur (S) ring atom and optionally substituted with 1 to 6 substituents.

In a fifth embodiment, provided herein is a process for making a catholyte solution, comprising mixing a lithium salt and at least two $C_{3-10}$ heterocyclic molecules, each independently, in each instance, comprising at least one sulfur (S) ring atom and optionally substituted with 1 to 6 substituents.

In a sixth embodiment, provided herein is a process for making a catholyte solution, comprising mixing a lithium salt and an aprotic $C_{3-10}$ heterocyclic molecule comprising at least one sulfur (S) ring atom and optionally substituted with 1 to 6 substituents.

In a seventh embodiment, provided herein is a process for making an electrochemical cell, including: providing a catholyte in a positive electrode, the catholyte comprising a lithium salt; and at least two $C_{3-10}$ heterocyclic molecules, each independently, in each instance, comprising at least one sulfur (S) ring atom and optionally substituted with 1 to 6 substituents; and contacting a solid-state electrolyte separator that includes lithium-stuffed garnet to the positive electrode.

In an eight embodiment, provided herein is a process for making an electrochemical cell, including: providing a catholyte in a positive electrode, the catholyte comprising a lithium salt; and an aprotic $C_{3-10}$ heterocyclic molecule comprising at least one sulfur (S) ring atom and optionally substituted with 1 to 6 substituents; and contacting a solid-state electrolyte separator that includes lithium-stuffed garnet to the positive electrode.

In a ninth embodiment, provided herein is a catholyte solution comprising: a lithium salt; and at least two aprotic $C_{3-10}$ heterocyclic molecules, each independently, in each instance, comprising at least one sulfur (S) ring atom and optionally substituted with 1 to 6 substituents, wherein the at least one $C_{3-10}$ heterocyclic molecule is selected from the group consisting of ethylene sulfite; 4-methyl-1,3,2-dioxathiolane 2-oxide; 1,3-propane sultone; sulfolane; thiophene; thiazole; 1,2-oxathiolane; thiepine; 1,4-thiazepine; 6-H-1,2,5-thiadiazine; 2H,6H-1,5,2-dithiazine; methylene methanedisulfonate; ethylene sulfate; thiopyran; thiocine, derivatives thereof, and combinations thereof.

In a tenth embodiment, provided herein is a rechargeable battery comprising a catholyte disclosed herein.

In an eleventh embodiment, provided herein is an electric vehicle comprising a rechargeable battery disclosed herein.

BRIEF DESCRIPTIONS OF THE DRAWINGS

Figure 3:
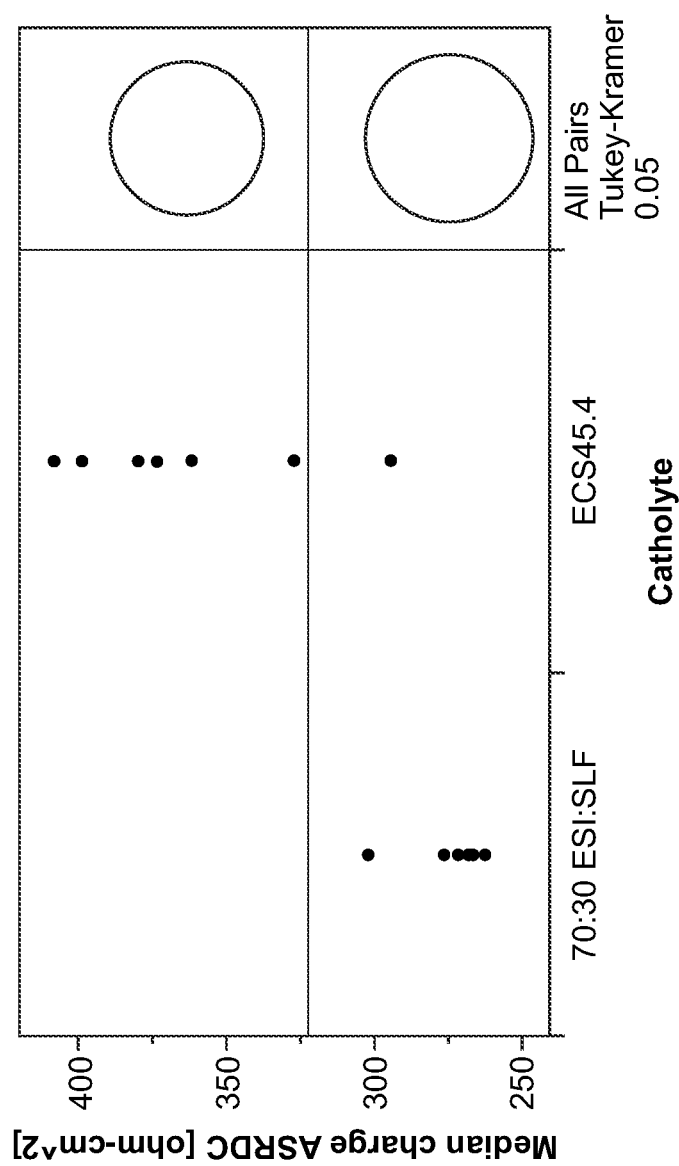

FIG. 3 is a plot of Median charge area-specific direct current resistance (ASRDC) ($\Omega$-$cm^2$) for two catholytes: a 70:30 by volume (v/v) mixture of ethylene sulfite (ESI) and sulfolane (SLF) with 1.4 M $LiPF_6$ (labeled as 70:30 ESI:SLF); and a 45:55 by volume (v/v) mixture of ethylene carbonate and sulfolane with 1.4 M $LiPF_6$ (labeled as ECS45.4). Herein, the "0.4" in "ECS45.4" refers to the 1.4M concentration of $Li^+$ ions. The "ECS45" refers to a 45:55 v/v ratio of ethylene carbonate to sulfolane.

Figure 4:
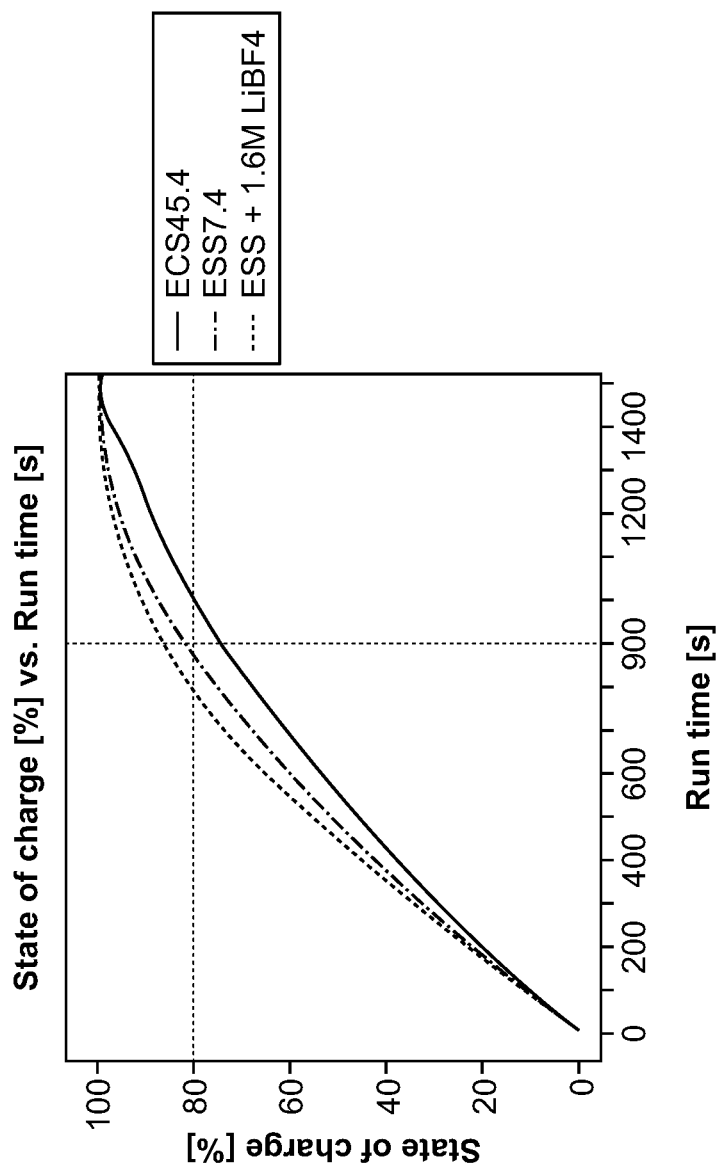

FIG. 4 is a plot of SOC (%) as a function of run time (seconds).

Figure 5:
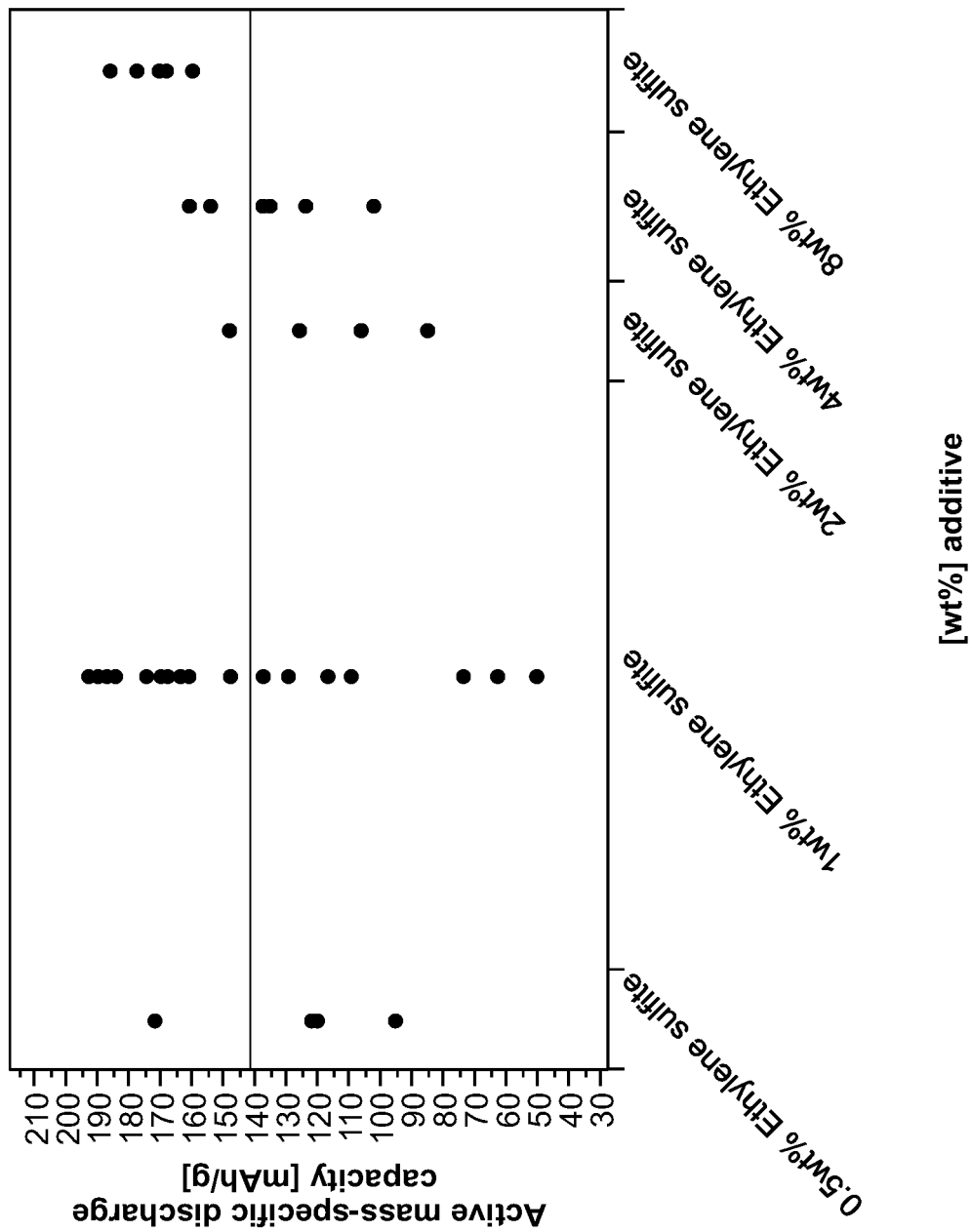

FIG. 5 is a plot of active mass-specific discharge capacity (mAh/g) for five catholyte mixtures: (a) 0.5 weight % ethylene sulfite; (b) 1 weight % ethylene sulfite; (c) 2 weight % ethylene sulfite; (d) 4 weight % ethylene sulfite; and (e) 8 weight % ethylene sulfite.

Figure 6:
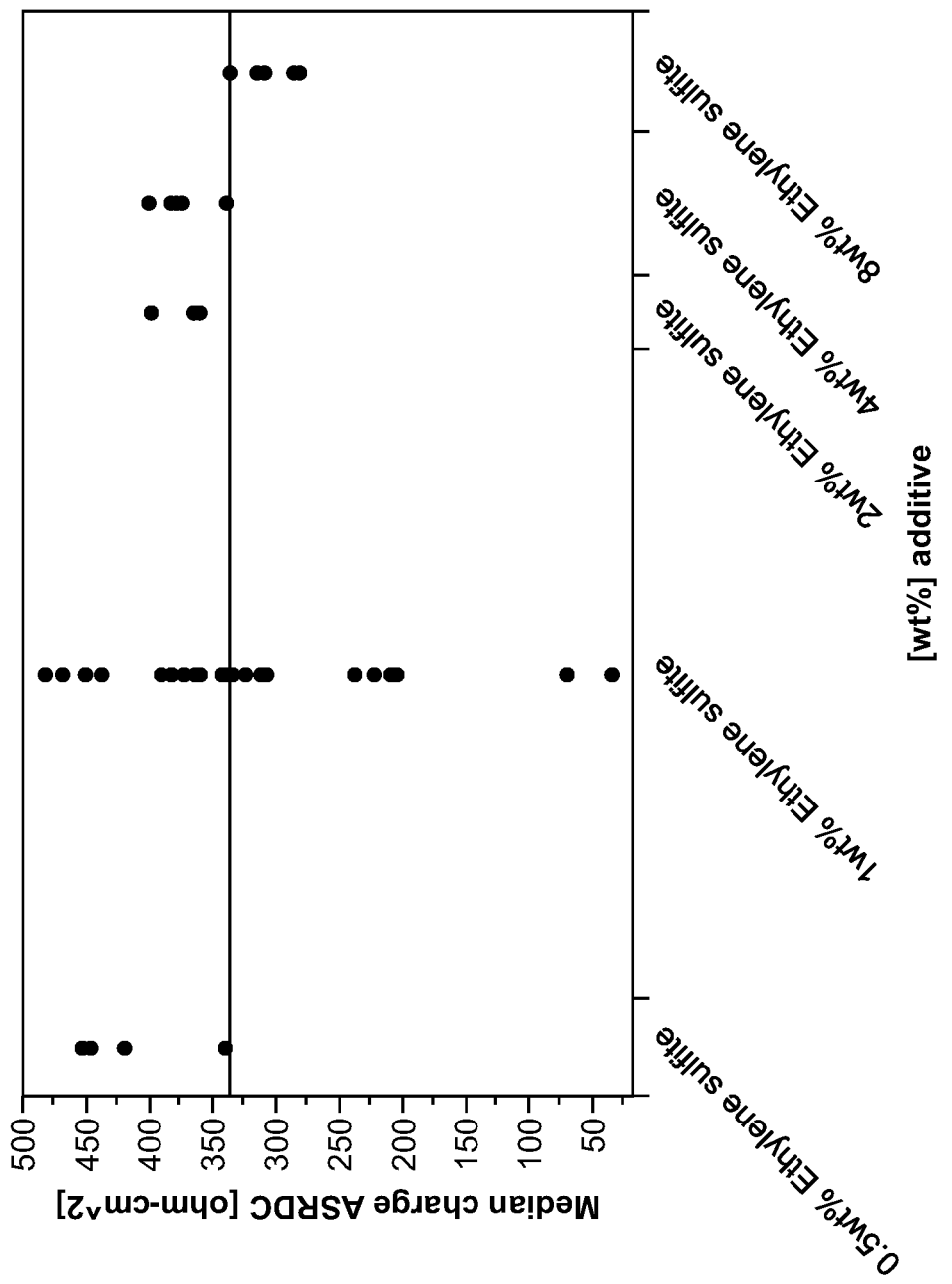

FIG. 6 is a plot of median charge area-specific resistance (ASR, $\Omega cm^2$) direct current for five catholyte mixtures: (a) 0.5 weight % ethylene sulfite; (b) 1 weight % ethylene sulfite; (c) 2 weight % ethylene sulfite; (d) 4 weight % ethylene sulfite; and (e) 8 weight % ethylene sulfite.

Figure 7:
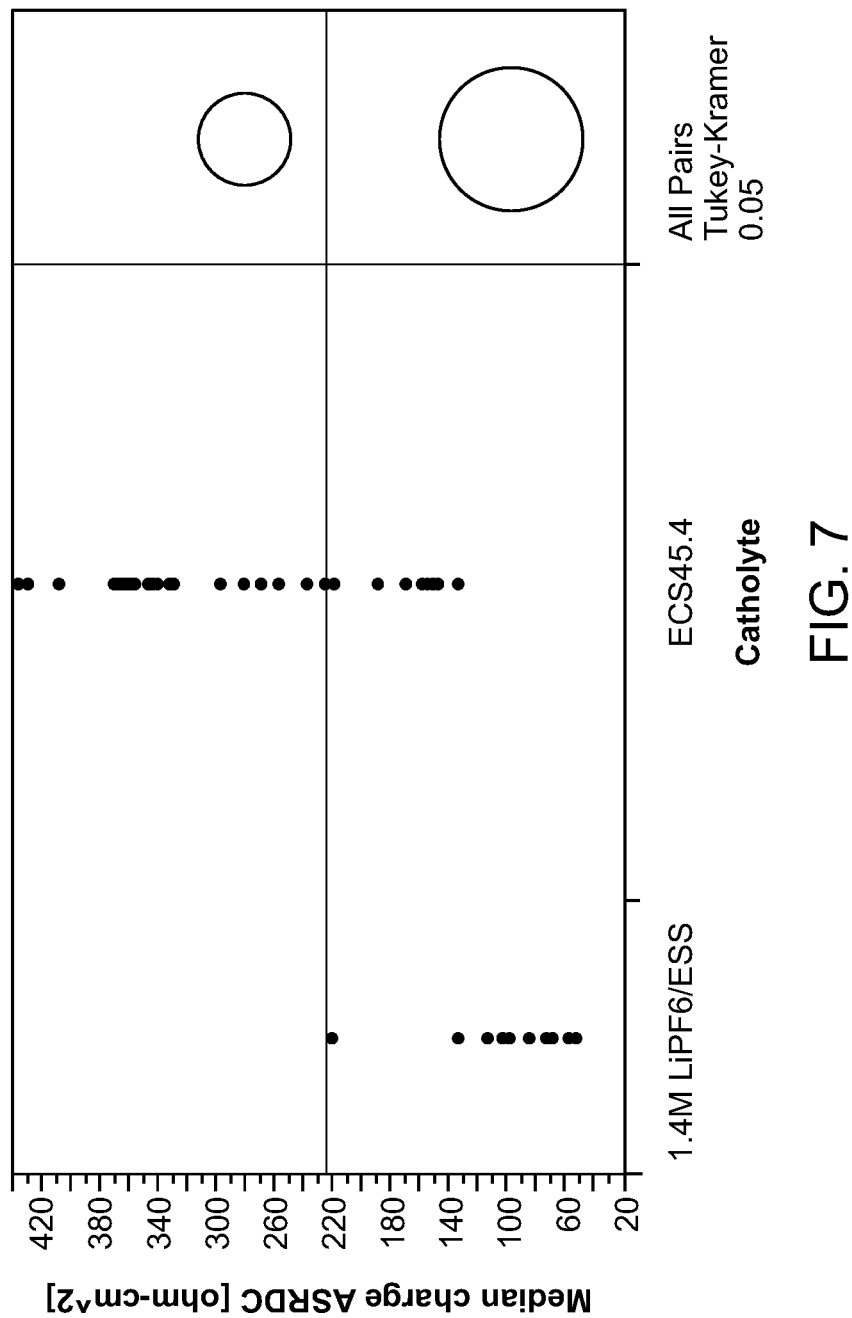

FIG. 7 is a plot of median charge area-specific resistance (ASR, $\Omega cm^2$), measured in direct current, for two catholyte mixtures: (a) 1.4M LiPF$_6$/ESS; and (b) ECS45.4. Herein, ESS refers to the combination of ethylene sulfite and sulfolane. Herein, ECS refers to the combination of ethylene carbonate and sulfolane.

Figure 8:
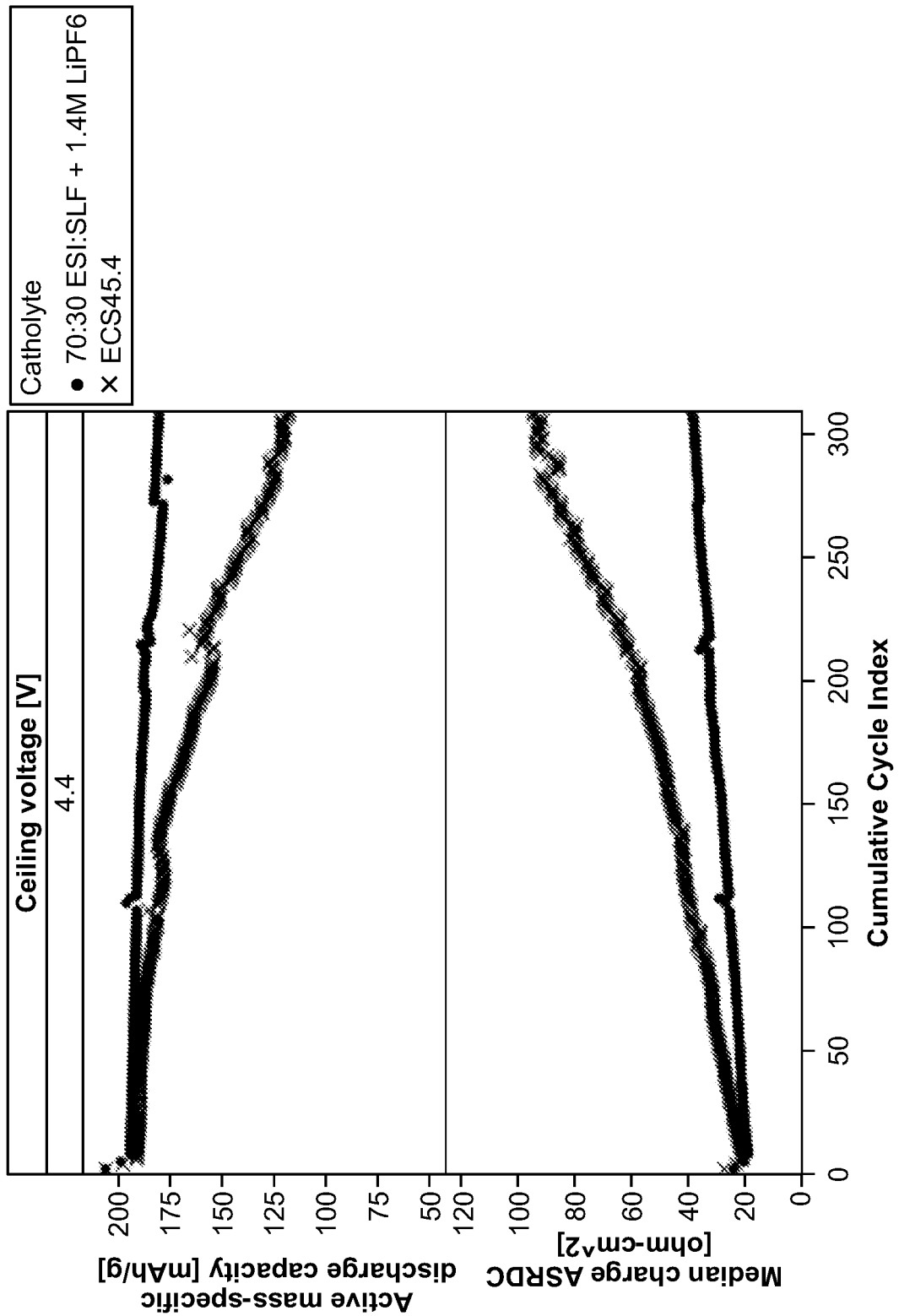

FIG. 8 is a plot (top) of active mass-specific discharge capacity (mAh/g) as a function of cumulative cycle index for two catholyte mixtures: (a) 1.4M LiPF$_6$/ESS; and (b) ECS45.4. FIG. 8 is also a plot (bottom) of median charge area-specific resistance (ASR, $\Omega cm^2$) direct current for as a function of cumulative cycle index for two catholyte mixtures: (a) 1.4M LiPF$_6$/ESS; and (b) ECS45.4.

Figure 9:
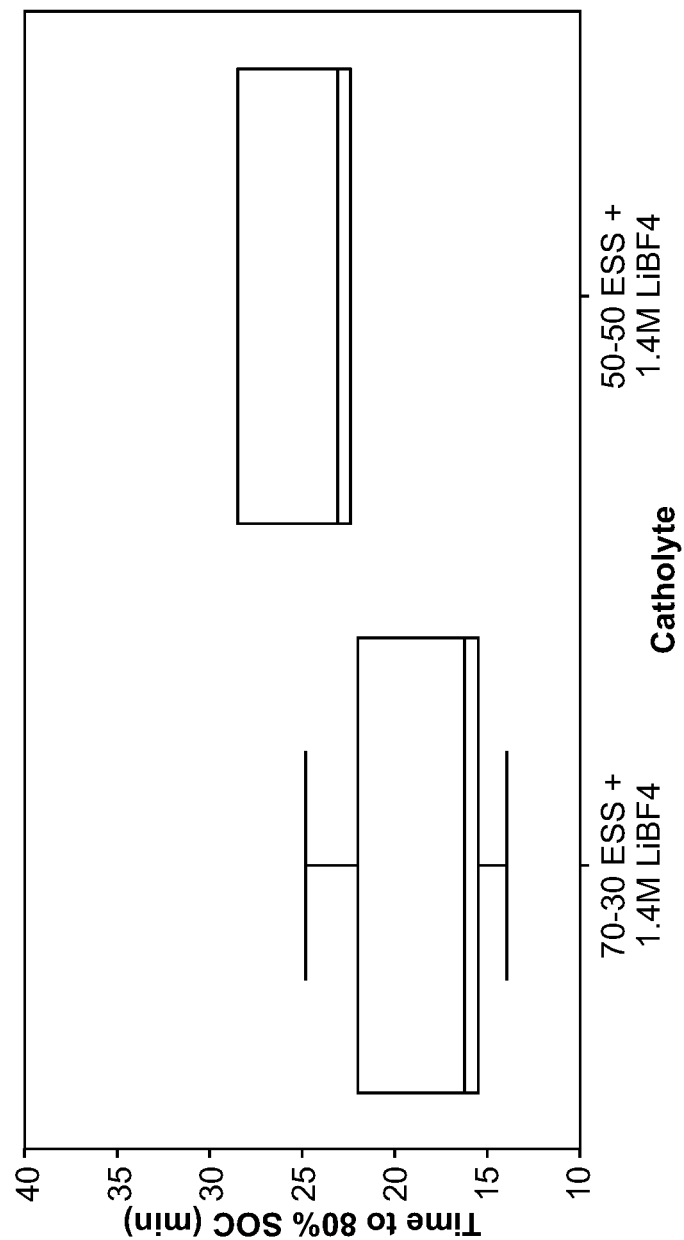

FIG. 9 shows the time to 80% SOC (min) for two electrochemical cells that used catholytes with different ratios of ethylene sulfite and sulfolane, in a 4 C fast charge assay at 25° C. These results relate to Example 2, herein. These results are described in Example 2, herein.

Figure 10:
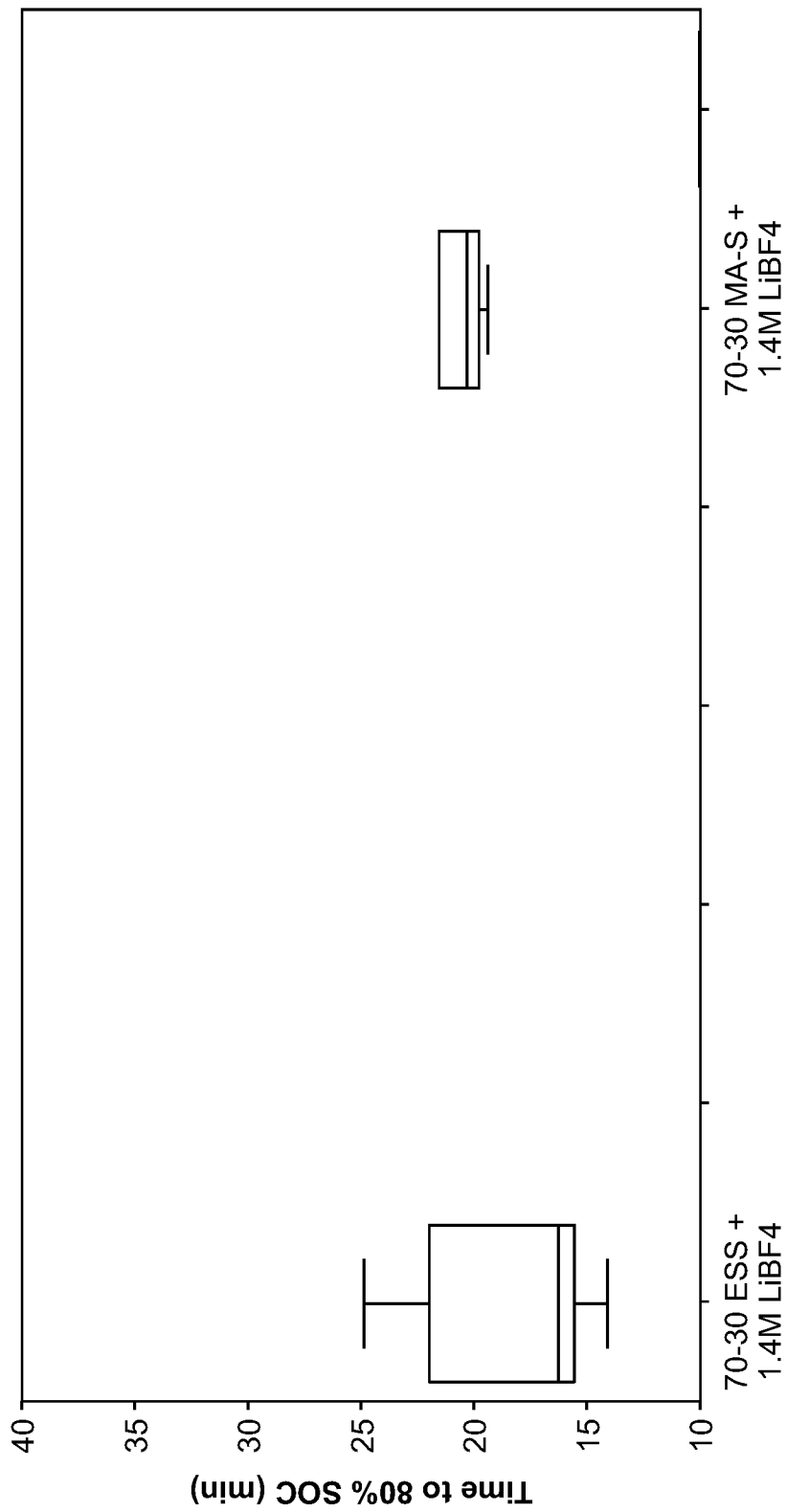

FIG. 10 shows the time to 80% SOC (min) for two electrochemical cells that used catholytes, one of which includes a third cosolvent-methyl acetate (labeled MA), in a 4 C fast charge assay at 25° C. These results are described in Example 2, herein.

Figure 11:
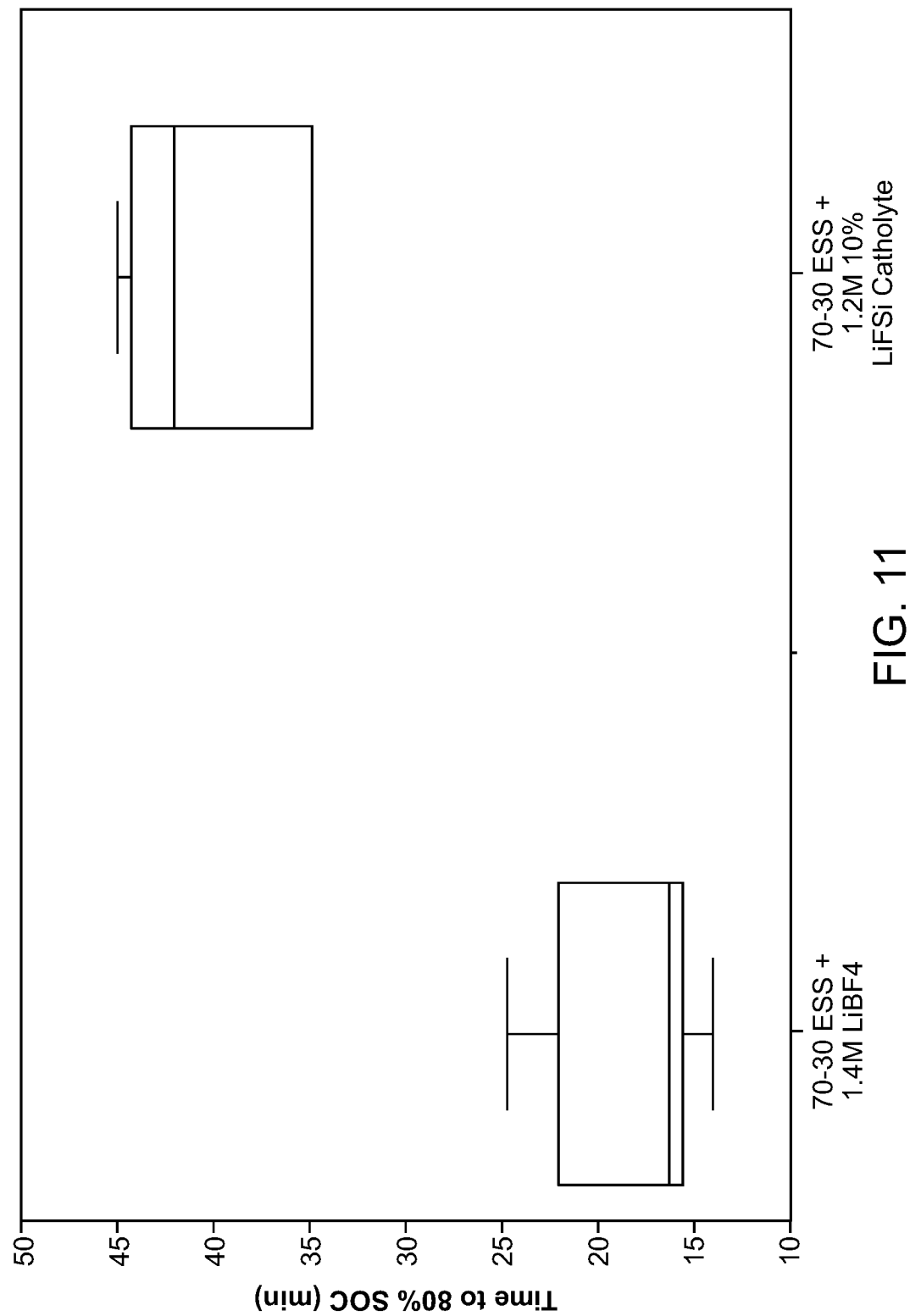

FIG. 11 shows the time to 80% SOC (min) for two catholytes, one of which includes a 70:30 volume ratio of ethylene sulfite to sulfolane with 1.4 M LiBF$_4$; and the other of which includes 1.2 M 10% LiFSi, in a 4 C fast charge assay at 25° C. These results are described in Example 2, herein.

Figure 12:
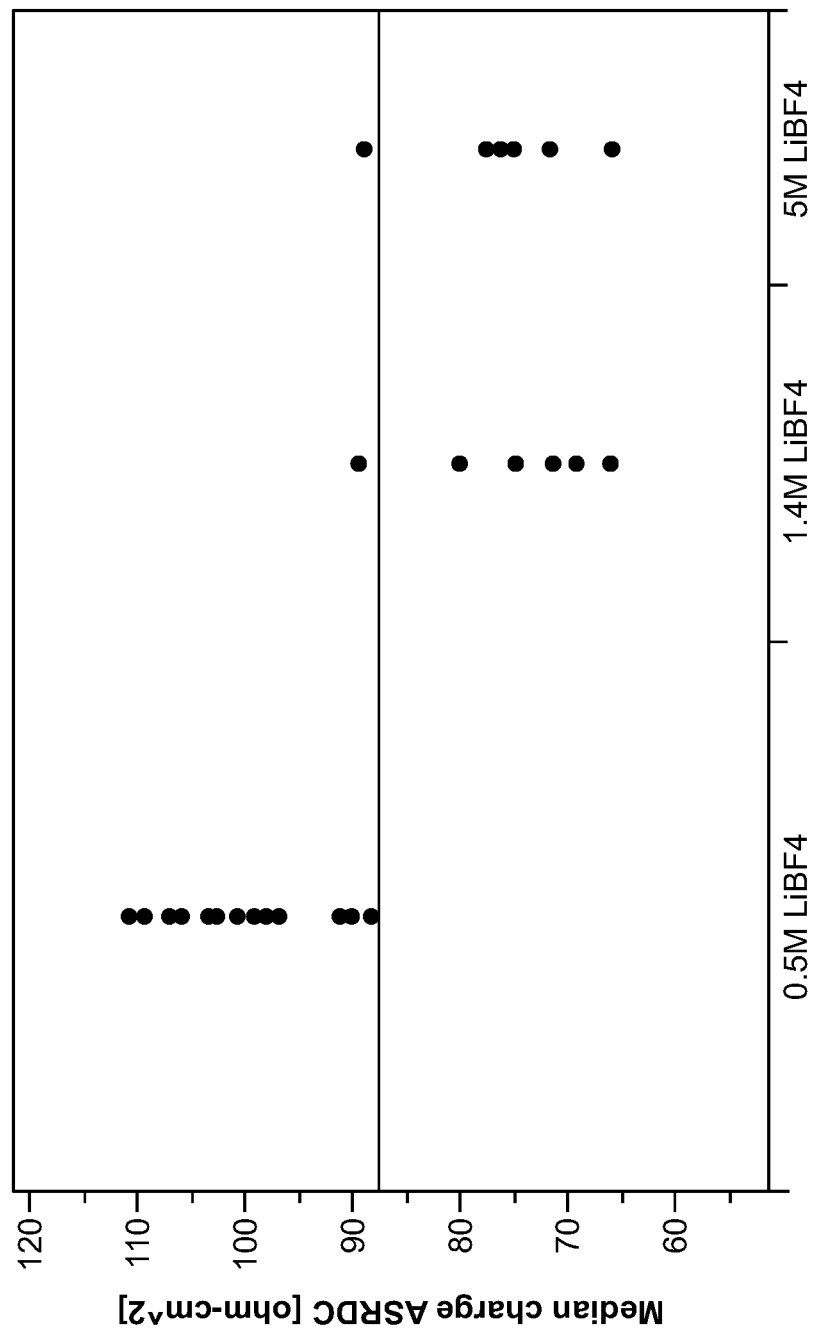

FIG. 12 shows the results of a one-month ASR measurement for a catholyte molarity skew of 0.5 M to 5 M. These results relate to Example 3, herein.

DETAILED DESCRIPTION

The following description is presented to enable one of ordinary skill in the art to make and use the instant disclosure and to incorporate it in the context of particular applications. Various modifications, as well as a variety of uses in different applications will be readily apparent to those skilled in the art, and the general principles defined herein may be applied to a wide range of embodiments. Thus, the instant disclosure is not intended to be limited to the embodiments presented, but is to be accorded the widest scope consistent with the principles and novel features disclosed herein.

In the following detailed description, numerous specific details are set forth in order to provide a more thorough understanding of the present disclosure. However, it will be apparent to one skilled in the art that the disclosures herein may be practiced without necessarily being limited to these specific details.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Set forth herein are catholytes that include solvents or additives such as ethylene sulfite and sulfolane. In some embodiments, ethylene sulfite, sulfolane, or both, are used as additives. As additives, ethylene sulfite, sulfolane, or both, are present at less than 10% w/w, and in some embodiments less than 9% w/w; less than 8% w/w; less than 7% w/w; less than 6% w/w; less than 5% w/w; less than 4% w/w; less than 3% w/w; less than 2% w/w; less than 1% w/w; or less than 0.5% w/w. As solvents, ethylene sulfite, sulfolane, or both, are present at greater than 10% w/w.

In some embodiments, the % w/w is calculated with respect to the weight of the cathode. In some other embodiments, and unless specified otherwise, the % w/w is calculated with respect to the weight of the catholyte which is introduced into the cathode. Unless specified otherwise, % w/w is calculated with respect to the weight of the catholyte which is introduced into the cathode.

The catholytes, herein, when used in lithium rechargeable batteries with a lithium-stuffed garnet solid-state electrolyte separator, improve high voltage stability and reduce charge transfer at the lithium-stuffed garnet interface. Charge transfer at the lithium-stuffed garnet interface may result in an increase area-specific resistance (ASR). In some embodiments, including any of the foregoing, these catholytes allow for fast charging to 80% capacity within 15 minutes in a cathode with high energy density. In certain embodiments, including any of the foregoing, a cathode with high energy density is a cathode with volumetric energy density of 2000 Wh/L. In some embodiments, including any of the foregoing, these catholytes demonstrate high continuous discharge capacity and pulsed power at −30° C. In some embodiments, including any of the foregoing, these catholytes improve calendar life (e.g., calendar life performance at 4.4V and 60° C.). In some embodiments, including any of the foregoing, the catholytes herein have an improved accelerated storage test at 4.4 V and 60° C.

In some embodiments, set forth herein is a solution, wherein the solution is an electrolyte that includes ethylene sulfite, sulfolane, and lithium salt. Herein ethylene sulfite is synonymous with 1,3,2-dioxathiolan-2-oxide, cyclic ethylene sulfite, ES, and glycol sulfite.

In some embodiments, ethylene sulfite is mixed with sulfolane to provide a deep eutectic solution. The deep eutectic solution, in some embodiments, has its freezing point depressed to as low as −50° C.

In some embodiments, the solution comprises ethylene carbonate and sulfolane (ECS). Some known combinations of ECS have an insufficient low temperature conductivity to perform well at low temperature. By replacing ethylene carbonate with ethylene sulfite, and optionally by using coated cathode active material improves, calendar life may be improved by a couple orders of magnitude. By replacing ethylene carbonate with ethylene sulfite, and optionally by using coated cathode active material, low temperature performance (e.g., low temperature power) may be improved.

Definitions

As used herein, the term "about," when qualifying a number, e.g., about 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the term "ECS," is an acronym for a mixture or solution of ethylene carbonate and sulfolane.

As used herein the phrase "solid separator" refers to a Li$^+$ ion-conducting material that is substantially insulating to electrons (e.g., the lithium-ion conductivity is at least 103 times, and often $10^6$ times, greater than the electron conductivity), and which acts as a physical barrier or spacer between the positive and negative electrodes in an electrochemical cell.

As used herein, area-specific resistance (ASR) is measured by electrochemical cycling using an Arbin, Maccor, or Biologic instrument unless otherwise specified to the contrary.

As used herein, ionic conductivity is measured by electrical impedance spectroscopy methods known in the art.

As used herein, the phrase "deep eutectic solution," is a solution or mixture of two or more chemicals that has a freezing point depressed by at least 30° C. compared to the lowest freezing point component of the deep eutectic solution. For example, if one chemical had a freezing point of −30° C. and another chemical had a freezing point of −60° C., and the 50:50 v/v mixture of these chemicals had a freezing point of −90° C., then the mixture would be considered a deep eutectic solution.

As used herein, the phrase "film" or "thin film" refers to a thin membrane of less than 0.5 mm in thickness and greater than 10 nm in thickness. A thin film is also greater than 5 mm in a lateral dimension. A "film" or "thin-film" may be produced by a continuous process such as tape-casting, slip casting, or screen-printing.

As used herein, the phrase "film thickness" refers to the distance, or median measured distance, between the top and bottom faces of a film. As used herein, the top and bottom faces refer to the sides of the film having the largest geometric surface area, wherein the geometric surface area is calculated by multiplying the face length by its width. As used herein, thickness is measured by cross-sectional scanning electron microscopy.

As used herein, "binder" refers to a polymer with the capability to increase the adhesion and/or cohesion of material, such as the solids in a green tape. Suitable binders may include, but are not limited to, PVDF, PVDF-HFP, SBR, and ethylene alpha-olefin copolymer. A "binder" refers to a material that assists in the adhesion of another material. For example, as used herein, polyvinyl butyral is a binder because it is useful for adhering garnet materials. Other binders may include polycarbonates. Other binders may include poly acrylates and poly methacrylates. These examples of binders are not limiting as to the entire scope of binders contemplated here but merely serve as examples. Binders useful in the present disclosure include, but are not limited to, polypropylene (PP), polyethylene, atactic polypropylene (aPP), isotactic polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), polyethylene-co-poly(methylene cyclopentane) (PE-co-PMCP), poly(methyl methacrylate) (PMMA), acrylics, polyvinylacetacetal resin, polyvinyl butyral resin, PVB, stereoblock polypropylenes, polypropylene polymethylpentene copolymer, polyethylene oxide (PEO), PEO block copolymers, silicone, polyacrylonitrile (PAN), polyvinyl chloride (PVC), polyvinyl pyrrolidone (PVP), polyethylene oxide poly(allyl glycidyl ether) PEO-AGE, polyethylene oxide 2-methoxy ethoxy ethyl glycidyl ether (PEO-MEEGE), polyethylene oxide 2-methoxyethoxyethyl glycidyl poly(allyl glycidyl ether) (PEO-MEEGE-AGE), polysiloxane, polyvinylidene fluoride (PVDF), polyvinylidene fluoride hexafluoropropylene (PVDF-HFP), nitrile rubber (NPR), polybutadiene polymer, polybutadiene rubber (PB), polyisobutadiene rubber (PIB), polyolefin, alpha-polyolefin, ethylene alpha-polyolefin, polyisoprene rubber (PI), polychloroprene rubber (CR), acrylonitrile-butadiene rubber (NBR), and polyethyl acrylate (PEA), and the like.

As used herein, the phrase "Lewis acid" refers to a molecule or functional group that has a tendency to accept electrons (or electron density) from basic molecules. Examples of Lewis acids include, but are not limited to, tris(trimethysilyl) phosphite (TTSPi), tris(trimethysilyl) phosphate (TTSPa), tris(2,2,2-trifluoroethyl) phosphite, tris (2,2,2-trifluoroethyl) phosphate (TTFEP), tris(2,2,2-trifluoroethyl) borate (TTFEB), trimethoxyboroxine ($C_3H_9B_3O_6$, TMOBX), triallyl phosphate (TAP), tris(trimethylsilyl) borate (TMSB), tris(pentafluorophenyl) borane (TPFPB), and combinations thereof.

Examples of non-Lewis acids used herein include: vinylene carbonate (VC), vinyl ethylene carbonate (VEC), methylene methane disulfonate (MMDS), ethylene sulfate, 1,3 propylene sulfate, prop-1-ene-1,3 sultone (PES), propylene sulfite, 1,4 butane sultone, fluoroethylene carbonate (FEC), LiTFSi, LiBOB, 3-sulfolene, succinonitrile, glutaronitrile, trimethyl sulfate (TMS), and combinations thereof.

As used herein, the term "alkyl" by itself or as part of another substituent refers to a saturated branched or straight-chain monovalent terminal group, or divalent bridging group, hydrocarbon radical derived by the removal of at least one hydrogen atom from a single carbon atom of a parent alkane. Alkyl groups of interest include, but are not limited to, methyl; ethyl, n-propyl, i-propyl, n-butyl, i-butyl, t-butyl. In some embodiments, an alkyl group includes from 1 to 20 carbon atoms. In some embodiments, an alkyl group includes from 1 to 10 carbon atoms. In certain embodiments, an alkyl group includes from 1 to 6 carbon atoms, such as from 1 to 4 carbon atoms. This term includes, by way of example, linear and branched hydrocarbyl groups such as methyl ($CH_3$—), ethyl ($CH_3CH_2$—), n-propyl ($CH_3CH_2CH_2$—), isopropyl (($CH_3$)$_2$CH—), n-butyl ($CH_3CH_2CH_2CH_2$—), isobutyl (($CH_3$)$_2$CHCH$_2$—), sec-butyl (($CH_3$)($CH_3CH_2$)CH—), t-butyl (($CH_3$)$_3$C—), n-pentyl ($CH_3CH_2CH_2CH_2CH_2$—), and neopentyl (($CH_3$)$_3$CCH$_2$—). Alkyl substituents may be substituted with 1 to 6 substituents which are not further substituted.

"Heteroalkyl" refers to a straight- or branched-chain alkyl group preferably having from 2 to 14 carbons, more preferably 2 to 10 carbons in the chain, one or more of which has been replaced by a heteroatom selected from S, O, P and N. Exemplary heteroalkyls include alkyl ethers (i.e., alkoxyl), secondary and tertiary alkyl amines, amides, alkyl sulfides (i.e., thiol), and the like. Heteroalkyl substituents may be substituted with 1 to 6 substituents which are not further substituted. The group may be a monovalent terminal group or a divalent bridging group.

As used herein, the phrase "$C_{3-10}$ heterocyclic molecule comprising at least one sulfur (S) ring atom" refers to a cyclic alkyl, alkenyl, or alkynyl ring in which at least one carbon atom is replaced by a sulfur (S) atom. A $C_{3-10}$ heterocyclic molecule is a molecule which includes 3, 4, 5, 6, 7, 8, 9, or 10 carbon atoms in a continuous ring structure.

As used herein, the phrase "optionally substituted with 1 to 6 substituents," refers to the condition where a group may or may not have substituents. When substituents are present, only 1, 2, 3, 4, 5, or 6 substituents are present. Substituents include, but are not limited to, polyethylene glycol (PEG), $=O$, $SO_2$, $-CF_3$, $-CH_2F$, $CHF_2$, $-NO_2$, $-NO_3$, $-NH_3$, $-CH_3$, $PO_4$, $PO_3$, $BO_3$, $-CN$, F, Cl, Br, I, and combinations thereof. Herein, these substituents are not further substituted unless explicitly stated so. Herein, these substituents are not protic unless explicitly stated so.

As used herein, the phrase "$C_{3-10}$ heterocyclic molecule comprising at least one sulfur (S) ring atom and one oxygen (O) ring atom" refers to a cyclic alkyl, alkenyl, or alkynyl ring in which at least one carbon atom is replaced by a sulfur (S) atom and at least one carbon atom is replaced by an oxygen (O) atom. A $C_{3-10}$ heterocyclic molecule is a molecule which includes 3, 4, 5, 6, 7, 8, 9, or 10 carbon atoms in a continuous ring structure.

As used herein, the phrases "electrochemical cell" or "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container.

As used herein the phrase "electrochemical stack," refers to one or more units which each include at least a negative electrode (e.g., Li, $LiC_6$), a positive electrode (e.g., $FeF_3$, $NiF_x$ wherein x is 2 or 3, nickel-cobalt aluminum oxide NCA, lithium iron phosphate (LFP), $LiNi_xMn_yCo_zO_2$, [NMC] or $LiNi_xAl_yCo_zO_2$ [NCA], wherein x+y+z=1; and wherein 0≤x≤1; 0≤y≤1; and 0≤z≤1), optionally combined with a solid-state electrolyte or a gel electrolyte), and a solid-state electrolyte (e.g., an oxide electrolyte set forth herein such as a lithium-stuffed garnet ($Li_7La_3Zr_2O_{12}$)) between and in contact with the positive and negative electrodes. In some embodiments, including any of the foregoing, between the solid-state electrolyte and the positive electrode, there is an additional layer comprising a compliant material (e.g., gel electrolyte). An electrochemical stack may include one of these aforementioned units. An electrochemical stack may include several of these aforementioned units arranged in electrical communication (e.g., serial or parallel electrical connection). In some embodiments, including any of the foregoing, when the electrochemical stack includes several units, the units are layered or laminated together in a column. In some embodiments, including any of the foregoing, when the electrochemical stack includes several units, the units are layered or laminated together in an array. In some embodiments, including any of the foregoing, when the electrochemical stack includes several units, the stacks are arranged such that one negative electrode is shared with two or more positive electrodes. Alternatively, in some embodiments, including any of the foregoing, when the electrochemical stack includes several units, the stacks are arranged such that one positive electrode is shared with two or more negative electrodes. Unless specified otherwise, an electrochemical stack includes one positive electrode, one solid-state electrolyte, and one negative electrode, and optionally includes a bonding layer between the positive electrode and the solid electrolyte.

As used here, the phrase "positive electrode," refers to the electrode in a secondary battery towards which positive ions, e.g., $Li^+$, conduct, flow, or move during discharge of the battery.

As used herein, the phrase "negative electrode" refers to the electrode in a secondary battery from where positive ions, e.g., $Li^+$ flow, or move during discharge of the battery. A negative electrode that includes lithium metal is referred to herein as a lithium metal negative electrode.

In a battery comprised of a Li-metal electrode and a conversion chemistry, intercalation chemistry, or combination of conversion/intercalation chemistry-including electrode (i.e., cathode active material), the electrode having the conversion chemistry, intercalation chemistry, or combination conversion/intercalation chemistry material is referred to as the positive electrode. In some common usages, cathode is used in place of positive electrode, and anode is used in place of negative electrode. When a Li-secondary battery is charged, Li ions move from the positive electrode (e.g., $NiF_x$, NMC, NCA) towards the negative electrode (e.g., Li-metal). When a Li-secondary battery is discharged, Li ions move towards the positive electrode and from the negative electrode.

As used herein, the phrase "positive electrode terminal," refers to an electrical connection to the positive electrode. A positive electrode terminal may also be referred to as a positive electrode current collector.

As used herein, the phrase "negative electrode terminal," refers to an electrical connection to the negative electrode. A negative electrode terminal may also be referred to as a negative electrode current collector.

As used herein the phrase "cathode active material," refers to a material which can intercalate lithium ions or react with lithium ions in a reversible manner. Examples include $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, x+y+z=1, 0≤x≤1, 0≤y≤1, and 0≤z≤1; and $LiNi_xCo_yAl_zO_2$, wherein x+y+z=1, and 0≤x≤1, 0≤y≤1, and 0≤z≤1. In these formula, x, y, and z are chosen so that the formula is charge neutral.

As used herein the phrase "solid-state cathode" refers to a cathode which does not include a liquid-phase electrolyte. As used herein, the terms "cathode" and "anode" refer to the electrodes of a battery. The cathode and anode are often referred to in the relevant field as the positive electrode and negative electrode, respectively.

As used herein, the term "electrolyte," refers to a material that allows ions, e.g., $Li^+$, to migrate therethrough, but which does not allow electrons to conduct therethrough. An electrolyte is ionically conductive and electrically insulating material, Electrolytes are useful for electrically insulating the cathode and anode of a secondary battery while allowing ions, e.g., $Li^+$, to transmit through the electrolyte.

As used herein, the phrases "gel electrolyte," unless specified otherwise, refers to a suitable $Li^+$ ion conducting gel or liquid-based electrolyte, for example, those set forth in U.S. Pat. No. 5,296,318, entitled RECHARGEABLE LITHIUM INTERCALATION BATTERY WITH HYBRID POLYMERIC ELECTROLYTE, which is incorporated by reference in its entirety for all purposes. A gel electrolyte has lithium-ion conductivity of greater than $10^5$S/cm at room temperature, a lithium transference number between 0.05-

0.95, and a storage modulus greater than the loss modulus at some temperature. A gel may comprise a polymer matrix, a solvent that gels the polymer, and a lithium containing salt that is at least partly dissociated into Li$^+$ ions and anions. Herein, in some examples, the gel electrolyte is used as the bonding layer.

As used herein, the term "catholyte," refers to a liquid or gel lithium-ion conductor that is intimately mixed with, or surrounded by, a cathode (i.e., positive electrode) active material. A liquid electrolyte, when mixed with a cathode, is a catholyte.

As used here, the phrase "solid-state electrolyte separator," or "solid-state separator," or "solid-state separator," is used interchangeably with the phrase "solid separator" refers to a material which does not include carbon and which conducts atomic ions (e.g., Li$^+$) but does not conduct electrons. A solid-state electrolyte separator is a solid material suitable for electrically isolating the positive and negative electrodes of a lithium secondary battery while also providing a conduction pathway for lithium ions. Example inorganic solid-state electrolytes include oxide electrolytes and sulfide electrolytes, which are further defined below. Non-limiting examples of sulfide electrolytes are found, for example, in U.S. Pat. No. 9,172,114, which issued Oct. 27, 2015, and also in US Patent Application Publication No. 2017-0162901 A1, which published Jun. 8, 2017, the entire contents of which are herein incorporated by reference in its entirety for all purposes. Non-limiting example oxide electrolytes are found, for example, in US Patent Application Publication No. 2015-0200420 A1, which published Jul. 16, 2015, the entire contents of which are herein incorporated by reference in its entirety for all purposes. In some examples, the inorganic solid-state electrolyte also includes a polymer and is referred to as a composite electrolyte. Composite electrolytes are found for example in U.S. Pat. No. 9,666, 870, the entire contents of which are herein incorporated by reference in its entirety for all purposes.

As used herein, the terms "separator," and "Li$^+$ ion-conducting separator," are used interchangeably with separator being a short-hand reference for Li$^+$ ion-conducting separator, unless specified otherwise explicitly. As used herein the phrase "solid-state electrolyte separator" refers to a Li$^+$ ion-conducting material that is substantially insulating to electrons (e.g., the lithium-ion conductivity is at least 103 times, and often 10$^6$ times, greater than the electron conductivity), and which acts as a physical barrier or spacer between the positive and negative electrodes in an electrochemical cell.

Unless explicitly specified to the contrary, a separator as used herein is stable when in contact with lithium metal.

As used herein, the phrase "thickness" or "film thickness" refers to the distance, or median measured distance between the top and bottom faces or surfaces. As used herein, the top and bottom faces refer to the sides having the largest geometric surface area.

As used herein, "thin" means, when qualifying a solid-state electrolyte, a thickness dimension less than 200 m, sometimes less than 100 m and in some cases between 0.1 and 60 m, and in other cases between about 10 nm to about 100 m; in other cases, about 1 m, 10 m, or 50 m in thickness.

As used herein, "sintered thin film," refers to a thin film that has been sintered, e.g., heated above 1000° C. to densify its structure without changing its chemical composition.

As used herein, the phrase "lithium stuffed garnet" refers to oxides that are characterized by a crystal structure related to a garnet crystal structure. Example lithium-stuffed garnet electrolytes include those electrolytes set forth in US Patent Application Publication No. 2015/0099190, published on Apr. 9, 2015, entitled GARNET MATERIALS FOR LI SECONDARY BATTERIES AND METHODS OF MAKING AND USING GARNET MATERIALS, and filed Oct. 7, 2014, the contents of which are incorporated by reference in their entirety. Li-stuffed garnets generally having a composition according to $Li_4La_BM'_CM''_DZr_EO_F$, $Li_4La_BM'_CM''_DTa_EO_F$, or $Li_4La_BM'_CM''_DNb_EO_F$, wherein $4<A<8.5$, $1.5<B<4$, $0\leq C\leq 2.5$, $0\leq D\leq 2.5$; $0\leq E\leq 2.3$, $10<F<13$, and M' and M" are each, independently in each instance selected from Al, Mo, W, Ga, Gd, Y, Nb, Sb, Ca, Ba, Sr, Ce, Hf, Rb, or Ta, or $Li_aLa_bZr_cAl_dMe''_eO_f$, wherein $5<a<8.5$; $2<b<4$; $0<c\leq 2.5$; $0\leq d<2$; $0\leq e<2$, and $10<f<13$ and Me" is a metal selected from Nb, Ta, V, W, Mo, or Sb and as otherwise described in U.S. Patent Application Publication No. U.S. 2015/0099190. In some embodiments, A may be about 6.0 or about 6.1 or about 6.2 or about 6.3 or about 6.4 or about 6.5 or about 6.6 or about 6.7 or about 6.8 or about 6.9 or about 7.0 or about 7.1 or about 7.2 or about 7.3 or about 7.4. In some embodiments, B may be about 2.8 or about 2.9 or about 3.0 or about 3.1 or about 3.2. In some embodiments, C may be about 0 or about 0.1 or about 0.2 or about 0.3 or about 0.4 or about 0.5 or about 0.6 or about 0.7 or about 0.8 or about 0.9 or about 1.0 or about 1.1 or about 1.2 or about 1.3 or about 1.4 or about 1.5 or about 1.6 or about 1.7 or about 1.8 or about 1.9 or about 2.0. In some embodiments D may be about 0 or about 0.1 or about 0.2 or about 0.3 or about 0.4 or about 0.5 or about 0.6 or about 0.7 or about 0.8 or about 0.9 or about 1.0 or about 1.1 or about 1.2 or about 1.3 or about 1.4 or about 1.5 or about 1.6 or about 1.7 or about 1.8 or about 1.9 or about 2.0. In some embodiments, E may be about 1.4 or about 1.5 or about 1.6 or about 1.7 or about 1.8 or about 1.9 or about 2.0 or about 2.1 or about 2.2. In some embodiments, F may be about 11.0 or about 11.1 or about 11.2 or about 11.3 or about 11.4 or about 11.5 or about 11.6 or about 11.7 or about 11.8 or about 11.9 or about 12.0 or about 12.1 or about 12.2 or about 12.3 or about 12.4 or about 12.5 or about 12.6 or about 12.7 or about 12.8 or about 12.9 or about 13.0. Herein, the subscript values and coefficient values are selected so the compound is charge neutral unless stated otherwise to the contrary. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (subscripts t1+t2+t3=subscript 2) so that the La:(Zr/Nb/Ta) ratio is 3:2. Also, garnets used herein include, but are not limited to, $Li_xLa_3Zr_2O_F+yAl_2O_3$, wherein x ranges from 5.5 to 9; and y ranges from 0 to 1. In these embodiments, subscripts x, y, and F are selected so that the garnet is charge neutral. In some embodiments x is 7 and y is 1.0. In some embodiments, x is 5 and y is 1.0. In some embodiments, x is 6 and y is 1.0. In some embodiments, x is 8 and y is 1.0. In some embodiments, x is 9 and y is 1.0. In some embodiments x is 7 and y is 0.35. In some embodiments, x is 5 and y is 0.35. In some embodiments, x is 6 and y is 0.35. In some embodiments, x is 8 and y is 0.35. In some embodiments, x is 9 and y is 0.35. In some embodiments x is 7 and y is 0.7. In some embodiments, x is 5 and y is 0.7. In some embodiments, x is 6 and y is 0.7. In some embodiments, x is 8 and y is 0.7. In some embodiments, x is 9 and y is 0.7. In some embodiments x is 7 and y is 0.75. In some embodiments, x is 5 and y is 0.75. In some embodiments, x is 6 and y is 0.75. In some embodiments, x is 8 and y is 0.75. In some embodiments, x is 9 and y is 0.75. In some embodiments x is 7 and y is 0.8. In some embodiments, x is 5 and y is 0.8. In some embodiments, x is 6 and y is 0.8. In some embodiments, x is 8 and y is 0.8. In some embodiments x is 9 and y is 0.8. In some embodiments x is 7 and y is 0.5. In some embodiments, x is 5 and y is 0.5. In some embodiments, x is 6 and y is 0.5. In some embodiments, x is 8 and y is 0.5. In some embodiments, x is 9 and y is 0.5. In some embodiments x is 7 and y is 0.4. In some embodiments, x is 5 and y is 0.4. In some embodiments, x is 6 and y is 0.4. In some embodiments, x is 8 and y is 0.4. In some embodiments, x is 9 and y is 0.4. In some embodiments x is 7 and y is 0.3. In some embodiments, x is 5 and y is 0.3. In some embodiments, x is 6 and y is 0.3. In some embodiments, x is 8 and y is 0.3. In some embodiments, x is 9 and y is 0.3. In some embodiments x is 7 and y is 0.22. In some embodiments, x is 5 and y is 0.22. In some embodiments, x is 6 and y is 0.22. In some embodiments, x is 8 and y is 0.22. In some embodiments, x is 9 and y is 0.22. Also, garnets as used herein include, but are not limited to, $Li_xLa_3Zr_2O_{12}+yAl_2O_3$. In one embodiment, the Li-stuffed garnet herein has a composition of $Li_7Li_3Zr_2O_{12}$. In another embodiment, the Li-stuffed garnet herein has a composition of $Li_7Li_3Zr_2O_{12} \cdot Al_2O_3$. In yet another embodiment, the Li-stuffed garnet herein has a composition of $Li_7Li_3Zr_2O_{12} \cdot 0.22Al_2O_3$. In yet another embodiment, the Li-stuffed garnet herein has a composition of $Li_7Li_3Zr_2O_{12} \cdot 0.35Al_2O_3$. In certain other embodiments, the Li-stuffed garnet herein has a composition of $Li_7Li_3Zr_2O_{12} \cdot 0.5Al_2O_3$. In another embodiment, the Li-stuffed garnet herein has a composition of $Li_7Li_3Zr_2O_{12} \cdot 0.75Al_2O_3$.

As used herein, lithium-stuffed garnet and/or garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrases "garnet precursor chemicals," "chemical precursor to a garnet-type electrolyte," "precursors to garnet" and "garnet precursor materials" refer to chemicals which react to form a lithium stuffed garnet material described herein. These chemical precursors include, but are not limited to lithium hydroxide (e.g., LiGH), lithium oxide (e.g., $Li_2O$), lithium carbonate (e.g., $LiCO_3$), zirconium oxide (e.g., $ZrO_2$), zirconium hydroxide, zirconium acetate, zirconium nitrate, zirconium acetylacetonate, zirconium nitrate x-hydrate, lanthanum oxide (e.g., $La_2O_3$), lanthanum hydroxide (e.g., $La(OH)_3$), lanthanum nitrate, lanthanum acetate, lanthanum acetylacetonate, aluminum oxide (e.g., $Al_2O_3$), aluminum hydroxide (e.g., $Al(OH)_3$), aluminum (e.g., Al), aluminum nitrate (e.g., $Al(NO_3)_3$), aluminum nitrate nonahydrate, boehmite, gibbsite, corundum, aluminum oxyhydroxide, niobium oxide (e.g., $Nb_2O_5$), gallium oxide ($Ga_2O_3$), and tantalum oxide (e.g., $Ta_2O_5$). Other precursors to garnet materials may be suitable for use with the methods set forth herein.

As used herein the phrase "garnet-type electrolyte," refers to an electrolyte that includes a lithium stuffed garnet material described herein as the $Li^+$ ion conductor.

As used herein, the phrase "doped with alumina" means that $Al_2O_3$ is used to replace certain components of another material, e.g., a garnet. A lithium stuffed garnet that is doped with $Al_2O_3$ refers to garnet wherein aluminum (Al) substitutes for an element in the lithium stuffed garnet chemical formula, which may be, for example, Li or Zr.

As used herein, area-specific resistance (ASR) is measured by electrochemical cycling using an Arbin or Biologic instrument unless otherwise specified to the contrary.

Electrochemical Cells

In one embodiment, provided herein is an electrochemical cell including: a positive electrode, a lithium-metal negative electrode, a solid-state electrolyte comprising lithium-stuffed garnet, and a catholyte, wherein the catholyte includes: a lithium salt; and at least two $C_{3-10}$ heterocyclic molecules, each independently, in each instance, including at least one sulfur (S) ring atom and optionally substituted with 1 to 6 substituents.

In another embodiment, provided herein is an electrochemical cell including: a positive electrode, a lithium-metal negative electrode, a solid-state electrolyte comprising lithium-stuffed garnet, and a catholyte, wherein the catholyte includes: a lithium salt; and at least two $C_{3-10}$ heterocyclic molecule comprising at least one sulfur (S) ring atom, each independently, in each instance, including at least one sulfur (S) ring atom and optionally substituted with 1 to 6 substituents.

In another embodiment, provided herein is an electrochemical cell including: a positive electrode, a lithium-metal negative electrode, a solid-state electrolyte comprising lithium-stuffed garnet, and a catholyte, wherein the catholyte includes: a lithium salt; and at least two $C_{3-10}$ heterocyclic molecule comprising at least one sulfur (S) ring atom and one oxygen (O) ring atom, each independently, in each instance, including at least one sulfur (S) ring atom and optionally substituted with 1 to 6 substituents.

In certain embodiments, including any of the foregoing, the substitutes are selected from polyethylene glycol (PEG), $=O$, $SO_2$, $-CF_3$, $-CH_2F$, $CHF_2$, $-NO_2$, $-NO_3$, $-NH_3$, $-CH_3$, $PO_4$, $PO_3$, $BO_3$ and $-CN$.

Catholyte Solutions

In one embodiments, including any of the foregoing, provided herein is catholyte solution which includes a lithium salt; and at least two $C_{3-10}$ heterocyclic molecules, each independently, in each instance, including at least one sulfur (S) ring atom and optionally substituted with 1 to 6 substituents.

In another embodiments, including any of the foregoing, provided herein is catholyte solution which includes a lithium salt; and at least two $C_{3-10}$ heterocyclic molecule comprising at least one sulfur (S) ring atom, each independently, in each instance, including at least one sulfur (S) ring atom and optionally substituted with 1 to 6 substituents.

In certain embodiments, including any of the foregoing, the substitutes are selected from polyethylene glycol (PEG), $=O$, $SO_2$, $-CF_3$, $-CH_2F$, $CHF_2$, $-NO_2$, $-NO_3$, $-NH_3$, $-CH_3$, $PO_4$, $PO_3$, $BO_3$ and $-CN$.

In some embodiments, including any of the foregoing, the $C_{3-10}$ heterocyclic molecules is a molecule of Formula (I):

wherein $R^1$ is selected from the group consisting of polyethylene glycol (PEG), =O, $SO_2$, —$CF_3$, —$CH_2F$, $CHF_2$, —$NO_2$, —$NO_3$, —$NH_3$, —$CH_3$, $PO_4$, $PO_3$, $BO_3$, —CN, and combinations thereof; $R^2$ is =O or is absent; $R^3$ is =O or is absent; and subscript n is an integer from 0 to 8.

In some embodiments, including any of the foregoing, the $C_{3-10}$ heterocyclic molecule is a molecule of Formula (II):

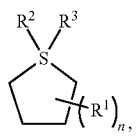

(II)

wherein $R^1$ is selected from the group consisting of polyethylene glycol (PEG), =O, $SO_2$, —$CF_3$, —$CH_2F$, $CHF_2$, —$NO_2$, —$NO_3$, —$NH_3$, —$CH_3$, $PO_4$, $PO_3$, $BO_3$, —CN, and combinations thereof; $R^2$ is =O or is absent; $R^3$ is =O or is absent; and subscript n is an integer from 0 to 8.

In some embodiments, including any of the foregoing, the $C_{3-10}$ heterocyclic molecules is a molecule of Formula

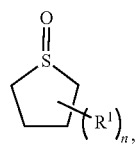

(IIa)

wherein $R^1$ is selected from the group consisting of polyethylene glycol (PEG), =O, $SO_2$, —$CF_3$, —$CH_2F$, $CHF_2$, —$NO_2$, —$NO_3$, —$NH_3$, —$CH_3$, $PO_4$, $PO_3$, $BO_3$, —CN, and combinations thereof; and subscript n is an integer from 0 to 8.

In some embodiments, including any of the foregoing, the $C_{3-10}$ heterocyclic molecules is a molecule of Formula (IIb):

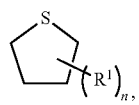

(IIb)

wherein $R^1$ is selected from the group consisting of polyethylene glycol (PEG), =O, $SO_2$, —$CF_3$, —$CH_2F$, $CHF_2$, —$NO_2$, —$NO_3$, —$NH_3$, —$CH_3$, $PO_4$, $PO_3$, $BO_3$, —CN, and combinations thereof; and subscript n is an integer from 0 to 8.

In some embodiments, including any of the foregoing, the $C_{3-10}$ heterocyclic molecules are a molecule of Formula (III):

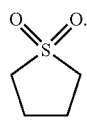

(III)

In some embodiments, including any of the foregoing, the $C_{3-10}$ heterocyclic molecules are a molecule of Formula (VII):

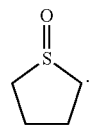

(VII)

In some embodiments, including any of the foregoing, the $C_{3-10}$ heterocyclic molecules is a molecule of Formula (IV):

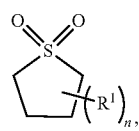

(IV)

wherein $R^1$ is selected from the group consisting of polyethylene glycol (PEG), =O, $SO_2$, —$CF_3$, —$CH_2F$, $CHF_2$, —$NO_2$, —$NO_3$, —$NH_3$, —$CH_3$, $PO_4$, $PO_3$, $BO_3$, —CN, and combinations thereof; and subscript n is an integer from 0 to 8.

In some embodiments, including any of the foregoing, the $C_{3-10}$ heterocyclic molecule comprises at least one sulfur (S) ring atom.

In some embodiments, including any of the foregoing, the $C_{3-10}$ heterocyclic molecule comprises at least one sulfur (S) ring atom and one oxygen (O) ring atom.

In some embodiments, including any of the foregoing, the $C_{3-10}$ heterocyclic molecules is a molecule of Formula (V):

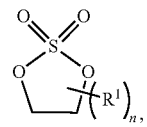

(V)

wherein $R^1$ is selected from the group consisting of polyethylene glycol (PEG), =O, $SO_2$, —$CF_3$, —$CH_2F$, $CHF_2$, —$NO_2$, —$NO_3$, —$NH_3$, —$CH_3$, $PO_4$, $PO_3$, $BO_3$, —CN, and combinations thereof. Subscript n is an integer from 0 to 8.

In some embodiments, including any of the foregoing, the $C_{3-10}$ heterocyclic molecules are a molecule of Formula (VI):

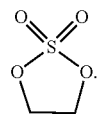

(VI)

In some embodiments, including any of the foregoing, $R^1$ is PEG. In certain embodiments, including any of the foregoing, subscript n is 1. In certain other embodiments, including any of the foregoing, subscript n is 2. In some embodiments, including any of the foregoing, subscript n is 3. In some other embodiments, including any of the foregoing, subscript n is 4. In certain embodiments, including any of the foregoing, subscript n is 5. In yet other embodiments, including any of the foregoing, subscript n is 6. In some embodiments, including any of the foregoing, subscript n is 7. In some other embodiments, including any of the foregoing, subscript n is 8.

In certain embodiments, including any of the foregoing, subscript n is 0. In certain embodiments, including any of the foregoing, subscript n is 1. In certain other embodiments, including any of the foregoing, subscript n is 2. In some embodiments, including any of the foregoing, subscript n is 3. In some other embodiments, including any of the foregoing, subscript n is 4. In certain embodiments, including any of the foregoing, subscript n is 5. In yet other embodiments, including any of the foregoing, subscript n is 6. In some embodiments, including any of the foregoing, subscript n is 7. In some other embodiments, including any of the foregoing, subscript n is 8.

In some embodiments, including any of the foregoing, $R^1$ is =O. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, $R^1$ is $SO_2$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, $R^1$ is —$CF_3$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, $R^1$ is —$CH_2F$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, $R^1$ is $CHF_2$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8. In some embodiments, including any of the foregoing, $R^1$ is —$NO_2$.

In some embodiments, including any of the foregoing, $R^1$ is —$NO_3$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8. In some embodiments, including any of the foregoing, $R^1$ is —$NH_3$.

In some embodiments, including any of the foregoing, $R^1$ is —$CH_3$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, $R^1$ is $PO_4$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, $R^1$ is $PO_3$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, $R^1$ is $BO_3$. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, $R^1$ is —CN. In certain embodiments, subscript n is 1. In certain other embodiments, subscript n is 2. In some embodiments, subscript n is 3. In some other embodiments, subscript n is 4. In certain embodiments, subscript n is 5. In yet other embodiments, subscript n is 6. In some embodiments, subscript n is 7. In some other embodiments, subscript n is 8.

In some embodiments, including any of the foregoing, at least one $C_{3-10}$ heterocyclic molecule is selected from the group consisting of ethylene sulfite, propylene glycol sulfite, sulfolane; 1,3-propane sultone; sulfolane; thiophene, thiazole, 1,2-oxathiolane, thiepine, 1,4-thiazepine, 6-H-1,2,5-thiadiazine, 2H,6H-1,5,2-dithiazine, thiopyran, thiepine, thiocine, derivatives thereof, and combinations thereof.

In some embodiments, including any of the foregoing, at least one $C_{3-10}$ heterocyclic molecule is selected from ethylene sulfite.

In some embodiments, including any of the foregoing, at least one $C_{3-10}$ heterocyclic molecule is selected from propylene glycol sulfite.

In some embodiments, including any of the foregoing, at least one $C_{3-10}$ heterocyclic molecule is selected from sulfolane.

In some embodiments, including any of the foregoing, at least one $C_{3-10}$ heterocyclic molecule is selected from 1,3-propane sultone.

In some embodiments, including any of the foregoing, at least one $C_{3-10}$ heterocyclic molecule is selected from sulfolane.

In some embodiments, including any of the foregoing, at least one $C_{3-10}$ heterocyclic molecule is selected from thiophene.

In some embodiments, including any of the foregoing, at least one $C_{3-10}$ heterocyclic molecule is selected from thiazole.

In some embodiments, including any of the foregoing, at least one $C_{3-10}$ heterocyclic molecule is selected from 1,2-oxathiolane.

In some embodiments, including any of the foregoing, at least one $C_{3-10}$ heterocyclic molecule is selected from thiepine.

In some embodiments, including any of the foregoing, at least one $C_{3-10}$ heterocyclic molecule is selected from 1,4-thiazepine.

In some embodiments, including any of the foregoing, at least one $C_{3-10}$ heterocyclic molecule is selected from 6-H-1,2,5-thiadiazine.

In some embodiments, including any of the foregoing, at least one $C_{3-10}$ heterocyclic molecule is selected from 2H,6H-1,5,2-dithiazine.

In some embodiments, including any of the foregoing, at least one $C_{3-10}$ heterocyclic molecule is selected from thiopyran.

In some embodiments, including any of the foregoing, at least one $C_{3-10}$ heterocyclic molecule is selected from thiepine.

In some embodiments, including any of the foregoing, at least one $C_{3-10}$ heterocyclic molecule is selected from thiocine.

In some embodiments, including any of the foregoing, at least one $C_{3-10}$ heterocyclic molecule is selected from the group consisting of ethylene sulfite and propylene glycol sulfite.

In some embodiments, including any of the foregoing, the derivatives of the at least one $C_{3-10}$ heterocyclic molecule includes derivative which include —$CH_3$, —$CF_3$, or F substituents.

In some embodiments, including any of the foregoing, the solid-state electrolyte is a thin film.

In some embodiments, including any of the foregoing, the solid-state electrolyte is a sintered thin film.

In some embodiments, including any of the foregoing, the solid-state electrolyte is a sintered thin film comprising lithium-stuffed garnet.

In some embodiments, including any of the foregoing, the lithium salt is selected from the group consisting of $LiPF_6$, Lithium bis(oxalato)borate (LiBOB), lithium bis(perfluoroethanesulfonyl)imide (LIBETI), bis(trifluoromethane)sulfonimide (LiTFSI), $LiBF_4$, $LiClO_4$, $LiAsF_6$, lithium bis(fluorosulfonyl)imide (LiFSI), LiI, and combinations thereof.

In some embodiments, including any of the foregoing, the $LIPF_6$ formulations include 30:70 sulfolane:ethylene sulfite v/v+1.4M $LiPF_6$.

In some embodiments, including any of the foregoing, the $LiBF_4$ formulations include 30:70 sulfolane:ethylene sulfite v/v+1.4M $LiBF_4$.

In some embodiments, including any of the foregoing, a catholyte includes 30:70 sulfolane:ethylene sulfite v/v+1.4M $LiPF_6$.

In some embodiments, including any of the foregoing, a catholyte includes 30:70 sulfolane:ethylene sulfite v/v+1.4M $LiPF_6$.

In some embodiments, including any of the foregoing, a catholyte includes 30:70 sulfolane:ethylene sulfite v/v+1.4M $LiBF_4$.

In some embodiments, including any of the foregoing, a catholyte includes 30:70 sulfolane:ethylene sulfite v/v+1.4M $LiPF_6$.

In some embodiments, including any of the foregoing, the lithium salt is present at a concentration of about 0.5 M to about 2.5 M. In some other embodiments, including any of the foregoing, the lithium salt is present at a concentration of about 0.5 M to about 2.0 M. In certain embodiments, the lithium salt is present at a concentration of about 0.5 M. In certain other embodiments, the lithium salt is present at a concentration of about 0.6 M. In some embodiments, the lithium salt is present at a concentration of about 0.7 M. In some other embodiments, the lithium salt is present at a concentration of about 0.8 M. In other embodiments, the lithium salt is present at a concentration of about 0.9 M. In still other embodiments, the lithium salt is present at a concentration of about 1.0 M. In certain embodiments, the lithium salt is present at a concentration of about 1.1 M. In certain embodiments, the lithium salt is present at a concentration of about 1.2 M. In certain embodiments, the lithium salt is present at a concentration of about 1.3 M. In certain embodiments, the lithium salt is present at a concentration of about 1.4 M. In certain embodiments, the lithium salt is present at a concentration of about 1.5 M. In certain embodiments, the lithium salt is present at a concentration of about 1.6 M. In certain embodiments, the lithium salt is present at a concentration of about 1.7 M. In certain embodiments, the lithium salt is present at a concentration of about 1.8 M. In certain embodiments, the lithium salt is present at a concentration of about 1.9 M. In certain embodiments, the lithium salt is present at a concentration of about 2.0 M. In certain embodiments, the lithium salt is present at a concentration of about 2.1 M. In certain embodiments, the lithium salt is present at a concentration of about 2.2 M. In certain embodiments, the lithium salt is present at a concentration of about 2.3 M. In certain embodiments, the lithium salt is present at a concentration of about 2.4 M. In certain embodiments, the lithium salt is present at a concentration of about 2.5 M. In certain embodiments, the lithium salt is present at a concentration of about 2.6 M.

In some embodiments, including any of the foregoing, the lithium salt is present at a concentration of about 0.5 M to about 5 M. In certain embodiments, the lithium salt is present at a concentration of about 0.5 M. In certain other embodiments, the lithium salt is present at a concentration of about 0.6 M. In some embodiments, the lithium salt is present at a concentration of about 0.7 M. In some other embodiments, the lithium salt is present at a concentration of about 0.8 M. In other embodiments, the lithium salt is present at a concentration of about 0.9 M. In still other embodiments, the lithium salt is present at a concentration of about 1.0 M. In certain embodiments, the lithium salt is present at a concentration of about 1.1 M. In certain embodiments, the lithium salt is present at a concentration of about 1.2 M. In certain embodiments, the lithium salt is present at a concentration of about 1.3 M. In certain embodiments, the lithium salt is present at a concentration of about 1.4 M. In certain embodiments, the lithium salt is present at a concentration of about 1.5 M. In certain embodiments, the lithium salt is present at a concentration of about 1.6 M. In certain embodiments, the lithium salt is present at a concentration of about 1.7 M. In certain embodiments, the lithium salt is present at a concentration of about 1.8 M. In certain embodiments, the lithium salt is present at a concentration of about 1.9 M. In certain embodiments, the lithium salt is present at a concentration of about 2.0 M. In certain embodiments, the lithium salt is present at a concentration of about 2.1 M. In certain embodiments, the lithium salt is present at a concentration of about 2.2 M. In certain embodiments, the lithium salt is present at a concentration of about 2.3 M. In certain embodiments, the lithium salt is present at a concentration of about 2.4 M. In certain embodiments, the lithium salt is present at a concentration of about 2.5 M. In certain embodiments, the lithium salt is present at a concentration of about 2.6 M. In certain embodiments, the lithium salt is present at a concentration of about 2.7 M. In certain embodiments, the lithium salt is present at a concentration of about 2.8 M. In certain embodiments, the lithium salt is present at a concentration of about 2.9 M. In certain embodiments, the lithium salt is present at a concentration of about 3.0 M. In certain embodiments, the lithium salt is present at a concentration of about 3.1 M. In certain embodiments, the lithium salt is present at a concentration of about 3.2 M. In certain embodiments, the lithium salt is present at a concentration of about 3.3 M. In certain embodiments, the lithium salt is present at a concentration of about 3.4 M. In certain embodiments, the lithium salt is present at a concentration of about 3.5 M. In certain embodiments, the lithium salt is present at a concentration of about 3.6 M. In certain embodiments, the lithium salt is present at a concentration of about 3.7 M. In certain embodiments, the lithium salt is present at a concentration of about 3.8 M. In certain embodiments, the lithium salt is present at a concentration of about 3.9 M. In certain embodiments, the lithium salt is present at a concentration of about 4.0 M. In certain embodiments, the lithium salt is present at a concentration of about 4.1 M. In certain embodiments, the lithium salt is present at a concentration of about 4.2 M. In certain embodiments, the lithium salt is present at a concentration of about 4.3 M. In certain embodiments, the lithium salt is present at a concentration of about 4.4 M. In certain embodiments, the lithium salt is present at a concentration of about 4.5 M. In certain embodiments, the lithium salt is present at a concentration of about 4.6 M. In certain embodiments, the lithium salt is present at a concentration of about 4.7 M. In certain embodiments, the lithium salt is present at a concentration of about 4.8 M. In certain embodiments, the lithium salt is present at a concentration of about 4.9 M. In certain embodiments, the lithium salt is present at a concentration of about 5.0 M.

In some embodiments, including any of the foregoing, the lithium salt is present at a concentration of 0.5 M to 2.5 M. In some other embodiments, including any of the foregoing, the lithium salt is present at a concentration of 0.5 M to 2.0 M. In certain embodiments, the lithium salt is present at a concentration of 0.5 M. In certain other embodiments, the lithium salt is present at a concentration of 0.6 M. In some embodiments, the lithium salt is present at a concentration of 0.7 M. In some other embodiments, the lithium salt is present at a concentration of 0.8 M. In other embodiments, the lithium salt is present at a concentration of 0.9 M. In still other embodiments, the lithium salt is present at a concentration of 1.0 M. In certain embodiments, the lithium salt is present at a concentration of 1.1 M. In certain embodiments, the lithium salt is present at a concentration of 1.2 M. In certain embodiments, the lithium salt is present at a concentration of 1.3 M. In certain embodiments, the lithium salt is present at a concentration of 1.4 M. In certain embodiments, the lithium salt is present at a concentration of 1.5 M. In certain embodiments, the lithium salt is present at a concentration of 1.6 M. In certain embodiments, the lithium salt is present at a concentration of 1.7 M. In certain embodiments, the lithium salt is present at a concentration of 1.8 M. In certain embodiments, the lithium salt is present at a concentration of 1.9 M. In certain embodiments, the lithium salt is present at a concentration of 2.0 M. In certain embodiments, the lithium salt is present at a concentration of 2.1 M. In certain embodiments, the lithium salt is present at a concentration of 2.2 M. In certain embodiments, the lithium salt is present at a concentration of 2.3 M. In certain embodiments, the lithium salt is present at a concentration of 2.4 M. In certain embodiments, the lithium salt is present at a concentration of 2.5 M. In certain embodiments, the lithium salt is present at a concentration of 2.6 M. In certain embodiments, the lithium salt is present at a concentration of 2.7 M. In certain embodiments, the lithium salt is present at a concentration of 2.8 M. In certain embodiments, the lithium salt is present at a concentration of 2.9 M. In certain embodiments, the lithium salt is present at a concentration of 3.0 M. In certain embodiments, the lithium salt is present at a concentration of 3.1 M. In certain embodiments, the lithium salt is present at a concentration of 3.2 M. In certain embodiments, the lithium salt is present at a concentration of 3.3 M. In certain embodiments, the lithium salt is present at a concentration of 3.4 M. In certain embodiments, the lithium salt is present at a concentration of 3.5 M. In certain embodiments, the lithium salt is present at a concentration of 3.6 M. In certain embodiments, the lithium salt is present at a concentration of 3.7 M. In certain embodiments, the lithium salt is present at a concentration of 3.8 M. In certain embodiments, the lithium salt is present at a concentration of 3.9 M. In certain embodiments, the lithium salt is present at a concentration of 4.0 M. In certain embodiments, the lithium salt is present at a concentration of 4.1 M. In certain embodiments, the lithium salt is present at a concentration of 4.2 M. In certain embodiments, the lithium salt is present at a concentration of 4.3 M. In certain embodiments, the lithium salt is present at a concentration of 4.4 M. In certain embodiments, the lithium salt is present at a concentration of 4.5 M. In certain embodiments, the lithium salt is present at a concentration of 4.6 M. In certain embodiments, the lithium salt is present at a concentration of 4.7 M. In certain embodiments, the lithium salt is present at a concentration of 4.8 M. In certain embodiments, the lithium salt is present at a concentration of 4.9 M. In certain embodiments, the lithium salt is present at a concentration of 5.0 M.

In some embodiments, including any of the foregoing, at least one $C_{3-10}$ heterocyclic molecules is sulfolane.

In some embodiments, including any of the foregoing, at least one $C_{3-10}$ heterocyclic molecules is 1,3-propane sultone.

In some embodiments, including any of the foregoing, at least one $C_{3-10}$ heterocyclic molecules is sulfolene.

In some embodiments, including any of the foregoing, at least one $C_{3-10}$ heterocyclic molecules is thiophene.

In some embodiments, including any of the foregoing, at least one $C_{3-10}$ heterocyclic molecules is ethylene sulfite.

In some embodiments, including any of the foregoing, the catholyte includes ethylene sulfite and sulfolane.

In some embodiments, including any of the foregoing, the catholyte consists essentially of ethylene sulfite and sulfolane.

In some embodiments, including any of the foregoing, the catholyte consists essentially of ethylene sulfite and sulfolane in a 70:30 volume ratio.

In some embodiments, including any of the foregoing, the catholyte consists of ethylene sulfite and sulfolane.

In some embodiments, including any of the foregoing, the catholyte consists of ethylene sulfite and sulfolane in a 70:30 volume ratio.

In some embodiments, including any of the foregoing, the catholyte includes two $C_{3-10}$ heterocyclic molecules, wherein a ratio of one $C_{3-10}$ heterocyclic molecule to the other $C_{3-10}$ heterocyclic molecules is from 20:80 vol/vol (v/v) to 80:20 v/v.

In some embodiments, including any of the foregoing, the ratio of one $C_{3-10}$ heterocyclic molecule to the other $C_{3-10}$ heterocyclic molecules is from 15:85 vol/vol (v/v) to 85:15 v/v.

In some embodiments, including any of the foregoing, the ratio of one $C_{3-10}$ heterocyclic molecule to the other $C_{3-10}$ heterocyclic molecules is from 20:80 vol/vol (v/v) to 80:20 v/v.

In some embodiments, including any of the foregoing, the ratio of one $C_{3-10}$ heterocyclic molecule to the other $C_{3-10}$ heterocyclic molecules is from 25:75 vol/vol (v/v) to 75:25 v/v.

In some embodiments, including any of the foregoing, the ratio of one $C_{3-10}$ heterocyclic molecule to the other $C_{3-10}$ heterocyclic molecules is from 30:70 vol/vol (v/v) to 70:30 v/v.

In some embodiments, including any of the foregoing, the ratio of one $C_{3-10}$ heterocyclic molecule to the other $C_{3-10}$ heterocyclic molecules is from 35:65 vol/vol (v/v) to 65:35 v/v.

In some embodiments, including any of the foregoing, the ratio of one $C_{3-10}$ heterocyclic molecule to the other $C_{3-10}$ heterocyclic molecules is from 40:60 vol/vol (v/v) to 60:40 v/v.

In some embodiments, including any of the foregoing, the ratio of one $C_{3-10}$ heterocyclic molecule to the other $C_{3-10}$ heterocyclic molecules is from 45:55 vol/vol (v/v) to 55:45 v/v.

In some embodiments, including any of the foregoing, the ratio of one $C_{3-10}$ heterocyclic molecule to the other $C_{3-10}$ heterocyclic molecules is 50:50 vol/vol (v/v).

In some embodiments, including any of the foregoing, the ratio of sulfolane:(ethylene sulfite) is from 30:70 v/v to 50:50 v/v.

In some embodiments, including any of the foregoing, the ratio of sulfolane:(ethylene sulfite) is 30:70 v/v.

In some embodiments, including any of the foregoing, the ratio of sulfolane:(ethylene sulfite) is 50:50 v/v.

In some embodiments, including any of the foregoing, the catholyte also includes an additive selected from the group consisting of tris(trimethysilyl) phosphite (TTSPi), tris(trimethysilyl) phosphate (TTSPa), trimethoxyboroxine ($C_3H_9B_3O_6$, TMOBX), vinylene carbonate (VC), vinyl ethylene carbonate (VEC), methylene methane disulfonate (MMDS), prop-1-ene-1,3 sultone (PES), fluoroethylene carbonate (FEC), LiTFSi, LiBOB, succinonitrile, trimethylene sulfate (TMS), triallyl phosphate (TAP), tris(trimethylsilyl) borate (TMSB), tris(pentafluorophenyl) borane (TPFPB), and combinations thereof.

In some embodiments, including any of the foregoing, the additive is TTSPi.

In some embodiments, including any of the foregoing, the additive is TTSPa.

In some embodiments, including any of the foregoing, the additive is a combination of TTSPi and TTSPa.

In some embodiments, including any of the foregoing, the lithium-stuffed garnet is characterized by a formula selected from the group consisting of $Li_ALa_BM'_CM''_DZr_EO_F$, $Li_ALa_BM'_CM''_DTa_EO_F$, and $Li_ALa_BM'_CM''_DNb_EO_F$, wherein $4<A<8.5$, $1.5<B<4$, $0 \leq C<2$, $0 \leq D<2$; $0<E<2$, $10<F<14$, and wherein M' and M" are each, independently, selected from the group consisting of Al, Mo, W, Nb, Ga, Y, Gd, Sb, Ca, Ba, Sr, Ce, Hf, Rb, and Ta.

In some embodiments, including any of the foregoing, the lithium-stuffed garnet characterized by a formula selected from the group consisting of $Li_ALa_BM'_CM''_DZr_EO_F$, $Li_ALa_BM'_CM''_DTa_EO_F$, and $Li_ALa_BM'_CM''_DNb_EO_F$, wherein $4<A<8.5$, $1.5<B<4$, $0 \leq C<2.5$, $0 \leq D<2.5$; $0<E<2.5$, $10<F<14$, and wherein M' and M" are each, independently, selected from the group consisting of Al, Mo, W, Nb, Ga, Y, Gd, Sb, Ca, Ba, Sr, Ce, Hf, Rb, and Ta In some embodiments, including any of the foregoing, the lithium-stuffed garnet is characterized by a formula selected from the group consisting of $Li_aLa_bZr_cAl_dMe''_eO_f$ wherein $5<a<7.7$; $2<b<4$; $0<c<2.5$; $0<d<2.5$; $0 \leq e<2.5$, $10<f<14$, and wherein Me" is a metal selected from the group consisting of Nb, Ta, V, W, Mo, and Sb.

In some embodiments, including any of the foregoing, the lithium-stuffed garnet is characterized by a formula selected from the group consisting of $Li_aLa_bZr_cAl_dO_f$ wherein $5<a<7.7$; $2<b<4$; $0<c<2.5$; $0<d<2.5$; $10<f<14$.

In some embodiments, including any of the foregoing, set forth herein is an electrochemical cell that includes a catholyte described herein.

In some embodiments, including any of the foregoing, set forth herein is a rechargeable battery including an electrochemical cell set forth herein.

In some embodiments, including any of the foregoing, set forth herein is an electric vehicle comprising a rechargeable battery set forth herein.

In certain embodiments, including any of the foregoing, the substitutes are selected from polyethylene glycol (PEG), =O, $SO_2$, $-CF_3$, $-CH_2F$, $CHF_2$, $-NO_2$, $-NO_3$, $-NH_3$, $-CH_3$, $PO_4$, $PO_3$, $BO_3$ and $-CN$.

Methods of Making

In another example, provided herein is a method for making an electrochemical cell, including: providing catholyte in a positive electrode, the catholyte comprising a lithium salt; and at least two $C_{3-10}$ heterocyclic molecules, each independently, in each instance, comprising at least one sulfur (S) ring atom and optionally substituted with 1 to 6 substituents; and contacting a solid-state electrolyte including lithium-stuffed garnet to the positive electrode.

In another example, provided herein is a method for making catholyte solution, comprising: mixing at least two $C_{3-10}$ heterocyclic molecules, each independently, in each instance, comprising at least one sulfur (S) ring atom and optionally substituted with 1 to 6 substituents; and a lithium salt; thereby providing a catholyte solution.

In some embodiments, including any of the foregoing, the methods further include contacting a solid-state electrolyte comprising lithium-stuffed garnet with the catholyte solution In some embodiments, including any of the foregoing, set forth herein is an electrochemical cell made by a method described herein.

In some embodiments, including any of the foregoing, set forth herein is a rechargeable battery including an electrochemical cell set forth herein.

In some embodiments, including any of the foregoing, set forth herein is an electric vehicle comprising a rechargeable battery set forth herein.

In some embodiments, including any of the foregoing, set forth herein is a method of making a catholyte. In some embodiments, a mixture of 50:50 ethylene sulfite:sulfolane to 70:30 ES:S by volume is prepared. In some embodiments, a mixture of 40:60 ethylene sulfite:sulfolane by volume is prepared. In some embodiments, a mixture of 60:40 ethylene sulfite:sulfolane ES:S by volume is prepared. In some embodiments, a mixture of 80:20 ethylene sulfite:sulfolane by volume is prepared. In some embodiments, a mixture of 20:80 ethylene sulfite:sulfolane by volume is prepared.

In some embodiments, including any of the foregoing, propylene glycol sulfite is used instead of ethylene sulfite.

In some embodiments, including any of the foregoing, other additives are used, e.g., TTSPi (Tris trimethylsilyl phosphite).

After drying, a lithium salt is added at salt concentrations from 0.8 M-2M.

In some embodiments, including any of the foregoing, the salt is selected from the group consisting of LiPF$_6$, Lithium bis(oxalato)borate (LiBOB), lithium bis(perfluoroethanesulfonyl)imide (LIBETI), bis(trifluoromethane)sulfonimide (LiTFSI), LiBF$_4$, LiClO$_4$, LiAsF$_6$, lithium bis(fluorosulfonyl)imide (LiFSI), LiI, and combinations thereof.

In some embodiments, including any of the foregoing, the salt is LiPF$_6$ or LiBF$_4$.

In some embodiments, including any of the foregoing, the salt is LiPF$_6$.

In some embodiments, including any of the foregoing, the salt is LiBF$_4$.

In some embodiments, including any of the foregoing, other anion mixtures are used, such as but not limited to, LiFSi, LiTFSi, e.g., 1.4M Li$^+$ with 80:20 LiBF$_4$ to LiFSi.

In some embodiments, including any of the foregoing, 1,2-propyleneglycol sulfite (CAS 1469-73-4) is used as an additive with ESS.

In some embodiments, including any of the foregoing, 1,3,2-dioxathiolane 2,2-dioxide (CAS 1072-53-3) is used as an additive with ESS.

In some embodiments, including any of the foregoing, the C$_{3-10}$ heterocyclic molecule comprises at least one sulfur (S) ring atom.

In some embodiments, including any of the foregoing, the C$_{3-10}$ heterocyclic molecule comprises at least one sulfur (S) ring atom and one oxygen (O) ring atom.

In certain embodiments, set forth herein is a catholyte solution comprising: a lithium salt; and at least two aprotic C$_{3-10}$ heterocyclic molecules, each independently, in each instance, comprising at least one sulfur (S) ring atom and optionally substituted with 1 to 6 substituents; wherein at least one C$_{3-10}$ heterocyclic molecule is selected from the group consisting of ethylene sulfite; 4-methyl-1,3,2-dioxathiolane 2-oxide; 1,3-propane sultone; sulfolane; thiophene; thiazole; 1,2-oxathiolane; thiepine; 1,4-thiazepine; 6-H-1,2,5-thiadiazine; 2H,6H-1,5,2-dithiazine; methylene methanedisulfonate; ethylene sulfate; thiopyran; thiocine, derivatives thereof, and combinations thereof.

In some embodiments, including any of the foregoing, the at least one aprotic C$_{3-10}$ heterocyclic molecule is selected from the group consisting of ethylene sulfite and propylene glycol sulfite.

In some embodiments, including any of the foregoing, the catholyte solution is in contact with a solid-state electrolyte comprising lithium-stuffed garnet, wherein the solid-state electrolyte is a thin film.

In some embodiments, including any of the foregoing, the solid-state electrolyte comprising lithium-stuffed garnet is a sintered thin film.

In some embodiments, including any of the foregoing, the lithium salt is selected from the group consisting of LiPF$_6$, Lithium bis(oxalato)borate (LiBOB), lithium bis(perfluoroethanesulfonyl)imide (LIBETI), bis(trifluoromethane)sulfonimide (LiTFSI), LiBF$_4$, LiClO$_4$, LiAsF$_6$, lithium bis(fluorosulfonyl)imide (LiFSI), LiI, and combinations thereof.

In some embodiments, including any of the foregoing, the lithium salt is present at a concentration of about 0.5 M to about 2.0 M.

In some embodiments, including any of the foregoing, the at least one C$_{3-10}$ heterocyclic molecules is sulfolane.

In some embodiments, including any of the foregoing, the at least one C$_{3-10}$ heterocyclic molecules is 1,3-propane sultone.

In some embodiments, including any of the foregoing, the at least one C$_{3-10}$ heterocyclic molecules is sulfolene.

In some embodiments, including any of the foregoing, the at least one C$_{3-10}$ heterocyclic molecules is thiophene.

In some embodiments, including any of the foregoing, the at least one C$_{3-10}$ heterocyclic molecules is ethylene sulfite.

In some embodiments, including any of the foregoing, the catholyte solution includes two C$_{3-10}$ heterocyclic molecules, wherein a ratio of one C$_{3-10}$ heterocyclic molecule to the other C$_{3-10}$ heterocyclic molecules is from 10:90 vol/vol (v/v) to 90:10 v/v.

In some embodiments, including any of the foregoing, the catholyte solution includes two C$_{3-10}$ heterocyclic molecules, wherein a ratio of one C$_{3-10}$ heterocyclic molecule to the other C$_{3-10}$ heterocyclic molecules is from 20:80 vol/vol (v/v) to 80:20 v/v.

In some embodiments, including any of the foregoing, the catholyte solution includes sulfolane and ethylene sulfite, and wherein the ratio of sulfolane:(ethylene sulfite) is from 30:70 v/v to 50:50 v/v.

In some embodiments, including any of the foregoing, the catholyte solution includes sulfolane and ethylene sulfite, and wherein the ratio of sulfolane:(ethylene sulfite) is 30:70 v/v.

In some embodiments, including any of the foregoing, the catholyte solution includes sulfolane and ethylene sulfite, and wherein the ratio of sulfolane:(ethylene sulfite) is 50:50 v/v.

In some embodiments, including any of the foregoing, the catholyte solution includes a Lewis acid selected from the group consisting of tris(trimethysilyl) phosphite (TTSPi); tris(trimethysilyl) phosphate (TTSPa); trimethoxyboroxine (C$_3$H$_9$B$_3$O$_6$, TMOBX); vinylene carbonate (VC); vinyl ethylene carbonate (VEC); methylene methane disulfonate (MMDS); prop-1-ene-1,3 sultone (PES); 1,3-propane sultone; fluoroethylene carbonate (FEC); LiTFSi; LiBOB; succinonitrile, trimethylene sulfate (TMS); triallyl phosphate (TAP); tris(trimethylsilyl) borate (TMSB); tris(pentafluorophenyl) borane (TPFPB); tris(pentafluorophenyl)borane (TPFPB); methyl acetate (MA); tris(trimethylsilyl) acetate (TMSA); tris(trimethylsilyl) pyridine; tris(trimethylsilyl) methacrylate (TMSMA); tris (2,2,2-trifluoroethyl) phosphite (TTFEP); tris(2,2,2-trifluoroethyl) borate (TTFEB); and combinations thereof.

In some embodiments, including any of the foregoing, the additive is TTSPi.

In some embodiments, including any of the foregoing, the additive is TTSPa.

In some embodiments, including any of the foregoing, the additive is a combination of TTSPi and TTSPa.

In some embodiments, including any of the foregoing, the solid-state electrolyte is a lithium-stuffed garnet characterized by a formula selected from the group consisting of Li$_A$La$_B$M'$_C$M''$_D$Zr$_E$O$_F$, Li$_A$La$_B$M'$_C$M''$_D$Ta$_E$O$_F$, and Li$_A$La$_B$M'$_C$M''$_D$Nb$_E$O$_F$, wherein 4<A<8.5, 1.5<13<4, 0≤C<2.5, 0≤D<2.5; 0<E<2.5, 10<F<14, and wherein M' and M" are each, independently, selected from the group consisting of Al, Mo, W, Nb, Ga, Y, Gd, Sb, Ca, Ba, Sr, Ce, Hf, Rb, and Ta.

In some embodiments, including any of the foregoing, the catholyte solution has a boiling point within a range from 60° C. to 100° C.

In some embodiments, including any of the foregoing, the catholyte solution has a melting point within a range from −60° C. to −40° C.

In some embodiments, including any of the foregoing, the catholyte solution has a lithium-ion conductivity within a range of 2000 μS/cm to 3200 μS/cm.

In some embodiments, including any of the foregoing, the catholyte solution has a viscosity within a range of 1 centipoise (cP) to 10 cP.

In some embodiments, including any of the foregoing, the lithium salt is 1.4M $LiPF_6$; 1.4M $LiBF_4$; or 1.6M $LiBF_4$.

In some embodiments, including any of the foregoing, the catholyte solution includes 70:30 v/v % ethylene sulfite:sulfolane.

Additional Embodiments

In some embodiments, set forth herein is a catholyte solution including: a lithium salt; and at least two aprotic $C_{3-10}$ heterocyclic molecules, each independently, in each instance, comprising at least one sulfur (S) ring atom and optionally substituted with 1 to 6 substituents.

In some embodiments, set forth herein is a catholyte solution including: a lithium salt; an aprotic $C_{3-10}$ heterocyclic molecule comprising at least one sulfur (S) ring atom and optionally substituted with 1 to 6 substituents.

In some embodiments, including any of the foregoing, the catholyte includes an organic carbonate solvent.

In some embodiments, including any of the foregoing, the catholyte includes ethylene carbonate.

In some embodiments, including any of the foregoing, the catholyte includes diethyl carbonate, dimethyl carbonate, or a combination thereof.

In some embodiments, including any of the foregoing, the catholyte includes methyl acetate.

In some embodiments, including any of the foregoing, the catholyte includes at least one aprotic $C_{3-10}$ heterocyclic molecule is selected from the group consisting of ethylene sulfite; 4-methyl-1,3,2-dioxathiolane 2-oxide; 1,3-propane sultone; sulfolane; thiophene, thiazole, 1,2-oxathiolane, thiepine, 1,4-thiazepine, 6-H-1,2,5-thiadiazine, 2H,6H-1,5,2-dithiazine; methylene methanedisulfonate; ethylene sulfate; thiopyran, thiepine, thiocine, derivatives thereof, and combinations thereof.

In some embodiments, including any of the foregoing, the catholyte includes at least one aprotic $C_{3-10}$ heterocyclic molecule is selected from the group consisting of ethylene sulfite and propylene glycol sulfite.

In some embodiments, including any of the foregoing, the catholyte includes at least one aprotic $C_{3-10}$ heterocyclic molecule is selected from the group consisting of ethylene sulfite and sulfolane.

In some embodiments, including any of the foregoing, the catholyte is in contact with a solid-state electrolyte comprising lithium-stuffed garnet, wherein the solid-state electrolyte is a thin film.

In some embodiments, including any of the foregoing, the solid-state electrolyte comprising lithium-stuffed garnet is a sintered thin film.

In some embodiments, including any of the foregoing, the lithium salt is selected from the group consisting of $LiPF_6$, lithium bis(oxalato)borate (LiBOB), lithium bis(perfluoroethanesulfonyl)imide (LIBETI), bis(trifluoromethane)sulfonimide (LiTFSI), $LiBF_4$, $LiClO_4$, $LiAsF_6$, lithium bis(fluorosulfonyl)imide (LiFSI), LiI, LiBr, LiCl, and combinations thereof.

In some embodiments, including any of the foregoing, the lithium salt is present at a concentration of about 0.5 M to about 5.0 M.

In some embodiments, including any of the foregoing, the lithium salt is $LiPF_6$; $LiBF_4$; or $LiBF_4$.

In some embodiments, including any of the foregoing, the lithium salt is 1.4M $LiPF_6$; 1.4M $LiBF_4$; or 1.6M $LiBF_4$.

In some embodiments, including any of the foregoing, the lithium salt is $LiBF_4$.

In some embodiments, including any of the foregoing, the lithium salt is 1.4M $LiBF_4$ or 1.6M $LiBF_4$.

In some embodiments, including any of the foregoing, the catholyte includes 70:30 v/v % ethylene sulfite:sulfolane.

In some embodiments, including any of the foregoing, the at least one aprotic $C_{3-10}$ heterocyclic molecules is sulfolane.

In some embodiments, including any of the foregoing, the at least one aprotic $C_{3-10}$ heterocyclic molecules is 1,3-propane sultone.

In some embodiments, including any of the foregoing, the at least one aprotic $C_{3-10}$ heterocyclic molecules is sulfolene.

In some embodiments, including any of the foregoing, the at least one aprotic $C_{3-10}$ heterocyclic molecules is thiophene.

In some embodiments, including any of the foregoing, the at least one aprotic $C_{3-10}$ heterocyclic molecules is ethylene sulfite.

In some embodiments, including any of the foregoing, the catholyte includes ethylene sulfite and sulfolane.

In some embodiments, including any of the foregoing, the catholyte consists essentially of ethylene sulfite and sulfolane.

In some embodiments, including any of the foregoing, the catholyte includes two $C_{3-10}$ heterocyclic molecules, wherein a ratio of one $C_{3-10}$ heterocyclic molecule to the other $C_{3-10}$ heterocyclic molecules is from 10:90 vol/vol (v/v) to 90:10 v/v.

In some embodiments, including any of the foregoing, the catholyte includes two $C_{3-10}$ heterocyclic molecules, wherein a ratio of one $C_{3-10}$ heterocyclic molecule to the other $C_{3-10}$ heterocyclic molecules is from 20:80 vol/vol (v/v) to 80:20 v/v.

In some embodiments, including any of the foregoing, the catholyte includes ratio is 30:70 vol/vol (v/v).

In some embodiments, including any of the foregoing, the catholyte includes sulfolane:ethylene sulfite at 30:70 v/v.

In some embodiments, including any of the foregoing, the catholyte includes sulfolane and ethylene sulfite, and wherein the ratio of sulfolane:(ethylene sulfite) is from 30:70 v/v to 50:50 v/v.

In some embodiments, including any of the foregoing, the catholyte includes sulfolane and ethylene sulfite, and wherein the ratio of sulfolane:(ethylene sulfite) is 30:70 v/v.

In some embodiments, including any of the foregoing, the catholyte includes sulfolane and ethylene sulfite, and wherein the ratio of sulfolane:(ethylene sulfite) is 50:50 v/v.

In some embodiments, including any of the foregoing, the catholyte includes sulfolane and ethylene sulfite, wherein the concentration of lithium salt is 0.5 molar (M) to 5 M.

In some embodiments, including any of the foregoing, the catholyte includes sulfolane and ethylene sulfite, wherein the concentration of $LiBF_4$ is 0.5 molar (M) to 5 M.

In some embodiments, including any of the foregoing, the catholyte includes an additive selected from the group consisting of tris(trimethysilyl) phosphite (TTSPi); tris(trimethysilyl) phosphate (TTSPa); trimethoxyboroxine ($C_3H_9B_3O_6$, TMOBX); vinylene carbonate (VC); vinyl ethylene carbonate (VEC); methylene methane disulfonate (MMDS); prop-1-ene-1,3 sultone (PES); 1,3-propane sultone; fluoroethylene carbonate (FEC); LiTFSi; LiBOB; succinonitrile; trimethylene sulfate (TMS); triallyl phosphate (TAP); tris(trimethylsilyl) borate (TMSB); tris(pentafluorophenyl) borane (TPFPB); tris(trimethylsilyl) borate (TMSB); tris(pentafluorophenyl)borane (TPFPB); methyl acetate (MA); tris(trimethylsilyl) acetate (TMSA); tris(trimethylsilyl) pyridine; tris(trimethylsilyl) methacrylate (TMSMA); tris (2,2,2-trifluoroethyl) phosphite (TTFEP); tris(2,2,2-trifluoroethyl) borate (TTFEB) and combinations thereof.

In some embodiments, including any of the foregoing, the additive is TTSPi.

In some embodiments, including any of the foregoing, the additive is TTSPa.

In some embodiments, including any of the foregoing, the additive is a combination of TTSPi and TTSPa.

In some embodiments, including any of the foregoing, the solid-state electrolyte is a lithium-stuffed garnet characterized by a formula selected from the group consisting of $Li_ALa_BM'_CM''_DZr_EO_F$, $Li_ALa_BM'_CM''_DTa_EO_F$, and $Li_ALa_BM'_CM''_DNb_EO_F$, wherein $4<A<8.5$, $1.5<B<4$, $0 \leq C<2.5$, $0 \leq D<2.5$, $0<E<2.5$, $10<F<14$, and wherein M' and M'' are each, independently, selected from the group consisting of Al, Mo, W, Nb, Ga, Y, Gd, Sb, Ca, Ba, Sr, Ce, Hf, Rb, and Ta.

In some embodiments, including any of the foregoing, the lithium-stuffed garnet is characterized by a formula selected from the group consisting of $Li_aLa_bZr_cAl_dMe''_eO_f$ wherein $5<a<7.7$; $2<b<4$; $0<c<2.5$; $0<d<2.5$; $0 \leq e<2.5$, $10<f<14$, and wherein Me'' is a metal selected from the group consisting of Nb, Ta, V, W, Mo, and Sb.

In some embodiments, including any of the foregoing, the lithium-stuffed garnet is characterized by a formula selected from the group consisting of $Li_aLa_bZr_cAl_dOf$ wherein $5<a<7.7$; $2<b<4$; $0<c<2.5$; $0<d<2.5$; $10<f<14$.

In some embodiments, including any of the foregoing, the catholyte solution is disposed in an electrochemical cell which comprises a positive electrode, a lithium-metal negative electrode, and a solid-state electrolyte comprising lithium-stuffed garnet.

In some embodiments, including any of the foregoing, the catholyte includes a third component that is not an aprotic $C_{3-10}$ heterocyclic molecules comprising at least one sulfur (S) ring atom and optionally substituted with 1 to 6 substituents.

In some embodiments, including any of the foregoing, the third component is selected from the group consisting of gamma butyrolactone, gamma valerolactone, gamma octalactone, ethyl cyanoacetate, trimethyl phosphate, adiponitrile, glutaronitrile, malononitrile, methyl acetate, ethyl cyanoacrylate, malononitrile, methyl cyanoacetate, ethyl cyanoacrylate, methyl cyanoacrylate, methoxyacetonitrile, acetonitrile, succinonitrile, malononitrile, methyl cyanoacetate, ethyl cyanoacrylate, methyl cyanoacrylate, and combinations thereof.

In some embodiments, including any of the foregoing, the third component is methyl acetate.

In some embodiments, set forth herein is a method for making catholyte solution, comprising: mixing at least two $C_{3-10}$ heterocyclic molecules, each independently, in each instance, comprising at least one sulfur (S) ring atom and optionally substituted with 1 to 6 substituents; and a lithium salt; thereby providing a catholyte solution.

In some embodiments, including any of the foregoing, the methods include contacting a solid-state electrolyte comprising lithium-stuffed garnet with the catholyte solution.

In some embodiments, set forth herein is a method for making an electrochemical cell, comprising: providing catholyte in a positive electrode, the catholyte comprising: a lithium salt; and at least two $C_{3-10}$ heterocyclic molecules, each independently, in each instance, comprising at least one sulfur (S) ring atom and optionally substituted with 1 to 6 substituents; and contacting a solid-state electrolyte comprising lithium-stuffed garnet to the positive electrode.

In some embodiments, set forth herein is an electrochemical cell made by a method disclosed herein.

In some embodiments, set forth herein is a rechargeable battery comprising an electrochemical cell disclosed herein.

In some embodiments, set forth herein is an electric vehicle comprising a rechargeable battery disclosed here.

In some embodiments, set forth herein is a catholyte solution including: a lithium salt; and at least two aprotic $C_{3-10}$ heterocyclic molecules, each independently, in each instance, comprising at least one sulfur (S) ring atom and optionally substituted with 1 to 6 substituents; wherein at least one $C_{3-10}$ heterocyclic molecule is selected from the group consisting of ethylene sulfite; 4-methyl-1,3,2-dioxathiolane 2-oxide; 1,3-propane sultone; sulfolane; thiophene; thiazole; 1,2-oxathiolane; thiepine; 1,4-thiazepine; 6-H-1,2,5-thiadiazine; 2H,6H-1,5,2-dithiazine; methylene methanedisulfonate; ethylene sulfate; thiopyran; thiocine, derivatives thereof, and combinations thereof.

In some embodiments, including any of the foregoing, the at least one aprotic $C_{3-10}$ heterocyclic molecule is selected from the group consisting of ethylene sulfite and propylene glycol sulfite.

In some embodiments, including any of the foregoing, the catholyte solution is in contact with a solid-state electrolyte comprising lithium-stuffed garnet, wherein the solid-state electrolyte is a thin film.

In some embodiments, including any of the foregoing, the solid-state electrolyte comprising lithium-stuffed garnet is a sintered thin film.

In some embodiments, including any of the foregoing, the lithium salt is selected from the group consisting of $LiPF_6$, Lithium bis(oxalato)borate (LiBOB), lithium bis(perfluoroethanesulfonyl)imide (LIBETI), bis(trifluoromethane)sulfonimide (LiTFSI), $LiBF_4$, $LiClO_4$, $LiAsF_6$, lithium bis(fluorosulfonyl)imide (LiFSI), LiF, LiCl, LiBr, LiI, and combinations thereof.

In some embodiments, including any of the foregoing, the lithium salt is $LiBF_4$.

In some embodiments, including any of the foregoing, the lithium salt is present at a concentration of about 0.5 M to about 2.0 M.

In some embodiments, including any of the foregoing, the at least one $C_{3-10}$ heterocyclic molecules is sulfolane.

In some embodiments, including any of the foregoing, the at least one $C_{3-10}$ heterocyclic molecules is 1,3-propane sultone.

In some embodiments, including any of the foregoing, the at least one $C_{3-10}$ heterocyclic molecules is sulfolene.

In some embodiments, including any of the foregoing, the at least one $C_{3-10}$ heterocyclic molecules is thiophene.

In some embodiments, including any of the foregoing, the at least one $C_{3-10}$ heterocyclic molecules is ethylene sulfite.

In some embodiments, including any of the foregoing, the ratio of one $C_{3-10}$ heterocyclic molecule to the other $C_{3-10}$ heterocyclic molecules is from 10:90 vol/vol (v/v) to 90:10 v/v.

In some embodiments, including any of the foregoing, the ratio of one $C_{3-10}$ heterocyclic molecule to the other $C_{3-10}$ heterocyclic molecules is from 20:80 vol/vol (v/v) to 80:20 v/v.

In some embodiments, including any of the foregoing, the catholyte includes sulfolane and ethylene sulfite, and wherein the ratio of sulfolane:(ethylene sulfite) is from 30:70 v/v to 50:50 v/v.

In some embodiments, including any of the foregoing, the catholyte includes sulfolane and ethylene sulfite, and wherein the ratio of sulfolane:(ethylene sulfite) is 30:70 v/v.

In some embodiments, including any of the foregoing, the catholyte includes sulfolane and ethylene sulfite, and wherein the ratio of sulfolane:(ethylene sulfite) is 50:50 v/v.

In some embodiments, including any of the foregoing, the catholyte includes an additive selected from the group consisting of tris(trimethysilyl) phosphite (TTSPi); tris(trimethysilyl) phosphate (TTSPa); trimethoxyboroxine ($C_3H_9B_3O_6$, TMOBX); vinylene carbonate (VC); vinyl ethylene carbonate (VEC); methylene methane disulfonate (MMDS); prop-1-ene-1,3 sultone (PES); 1,3-propane sultone; fluoroethylene carbonate (FEC); LiTFSi; LiBOB; succinonitrile, trimethylene sulfate (TMS); triallyl phosphate (TAP); tris(trimethylsilyl) borate (TMSB); tris(pentafluorophenyl) borane (TPFPB); tris(pentafluorophenyl)borane (TPFPB); methyl acetate (MA); tris(trimethylsilyl) acetate (TMSA); tris(trimethylsilyl) pyridine; tris(trimethylsilyl) methacrylate (TMSMA); tris (2,2,2-trifluoroethyl) phosphite (TTFEP); tris(2,2,2-trifluoroethyl) borate (TTFEB); and combinations thereof.

In some embodiments, including any of the foregoing, the additive is TTSPi.

In some embodiments, including any of the foregoing, the additive is TTSPa.

In some embodiments, including any of the foregoing, the additive is a combination of TTSPi and TTSPa.

In some embodiments, including any of the foregoing, the solid-state electrolyte is a lithium-stuffed garnet characterized by a formula selected from the group consisting of $Li_ALa_BM'_CM''_DZr_EO_F$, $Li_ALa_BM'_CM''_DTa_EO_F$, and $Li_4La_BM'_CM''_DNb_EO_F$, wherein $4<A<8.5$, $1.5<B<4$, $0 \le C<2.5$, $0 \le D<2.5$; $0<E<2.5$, $10<F<14$, and wherein M' and M" are each, independently, selected from the group consisting of Al, Mo, W, Nb, Ga, Y, Gd, Sb, Ca, Ba, Sr, Ce, Hf, Rb, and Ta.

In some embodiments, including any of the foregoing, the catholyte solution has a boiling point within a range from 60° C. to 100° C.

In some embodiments, including any of the foregoing, the catholyte solution has a melting point within a range from −60° C. to −40° C.

In some embodiments, including any of the foregoing, the catholyte solution has a lithium-ion conductivity within a range of 2000 μS/cm to 3200 μS/cm.

In some embodiments, including any of the foregoing, the catholyte solution has a viscosity within a range of 1 cP to 10 cP.

In some embodiments, including any of the foregoing, the lithium salt is 1.4M $LiPF_6$; 1.4M $LiBF_4$; or 1.6M $LiBF_4$.

In some embodiments, including any of the foregoing, the catholyte includes 70:30 v/v % ethylene sulfite:sulfolane.

In some embodiments, including any of the foregoing, the lithium salt is 1.4M $LiPF_6$.

In some embodiments, including any of the foregoing, the lithium salt is 1.4M $LiBF_4$.

In some embodiments, including any of the foregoing, the lithium salt is 1.6M $LiBF_4$.

EXAMPLES

Instruments used for electrochemical measurements were Bio-Logic potentiostat, Arbin Instruments battery cyclers, and Maccor battery cyclers.

Reagents, chemicals, and materials were commercially purchased unless specified otherwise to the contrary.

Pouch cell containers were purchased from Showa Denko.

The Electrochemical potentiostat used was an Arbin potentiostat.

Electrical impedance spectroscopy (EIS) was performed with a Biologic VMP3, VSP, VSP-300, SP-150, or SP-200.

Mixing was performed using a Fischer Scientific vortex mixer, a Flaktek speed mixer, or a Primix filmix homogenizer.

Casting was performed on a TQC drawdown table. Calendering was performed on an IMC calender.

Light scattering was performed on a Horiba, model: Partica, Model Number: LA-950V2, which is a laser scattering particle size distribution analyzer.

The Lithium Nickel Cobalt Manganese Oxide (NMC) used in the Examples was $LiNi_{0.8}Co_{0.1}Mn_{0.1}O_2$ unless specified otherwise.

Example 1: Low Temperature Power

A cathode electrode slurry was prepared by mixing 3% Super C65, 1% ketjen black, 5% Kynar HSV, and 91% by weight $LiNi_{0.8}Co_{0.1}Mn_{0.1}O_2$ (also known as NMC811) in N-methyl pyrrolidone (NMP). After mixing and degassing, the slurry was cast onto an aluminum foil with a doctor blade to a thickness that achieves 28 mg/cm² of dry material. The electrode was dried of NMP at 120° C. for eight hours. The electrode was calendered to a thickness where the porosity was 35% by volume as determined by scanning electron microscopy. Cathode electrode discs of 8 mm diameter were punched from the cathode electrode sheet.

Electrochemical cells were constructed using a lithium-stuffed garnet separator, lithium-free lithium metal anode, and the cathode electrode described above. Lithium-free means the cells were assembled in a discharged state. Before cell assembly, the cathode electrode was soaked in a catholyte mixture of ESS (70:30 v/v % ethylene sulfite:sulfolane+1.4M $LiBF_4$). Herein, "ESS" refers to a combination of ethylene sulfite and sulfolane. After soaking, excess electrolyte was removed by dabbing with a cloth, and then 0.5-3 μL of excess catholyte mixture was added to the cathode-separator interface with a pipette. An anode current collector foil with a tab was placed in contact with the anode side of the separator and a cathode current collector foil with a tab was placed in contact with the Al foil on the back of the cathode electrode. A pouch was sealed around the cell, with the tabs sticking out of the cell to make electrical connections to each electrode.

Figure 1:
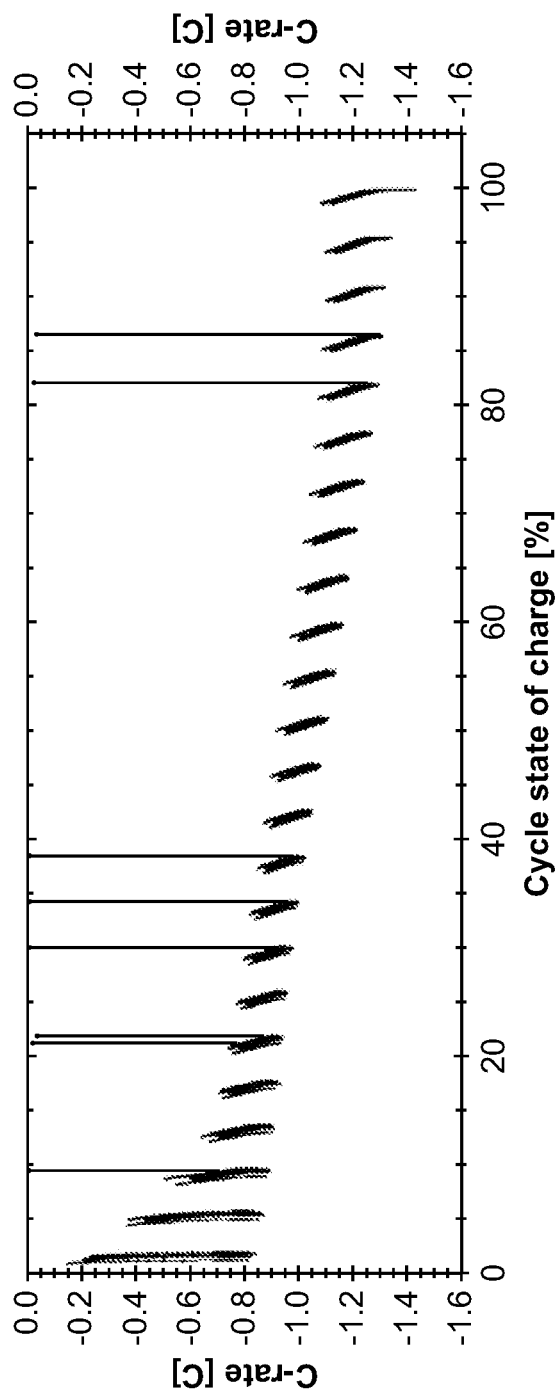
FIG. 1 is a plot of C-rate as a function of cycle state of charge.

Electrochemical cells were charged and discharged at a rate of C/10, which is the current at which the battery is charged (or discharged) in 10 hours, from 3.4 V to 4.4 V at 25° C. FIG. 1 shows the results of a low temperature power test. A cell was charged to 4.4 V at 25° C. and then brought to −30° C. The cell was discharged for 30 seconds by applying a constant voltage of 2V and the current was monitored during the 30 seconds. After 30 seconds, there was a 10-minute rest at open circuit and then a C/10 discharge current was applied for 6 minutes. The 2V discharge, rest, and C/10 discharge was repeated until the cell voltage decreased below 2V during the C/10 discharge step.

FIG. 1 shows the C-rate that was extracted during the 2V fast discharge step as a function of state of charge. The cell was able to deliver over 1 C of current at −30° C. for 30 seconds while the state of charge is above about 60%, and over 0.5 C of current for 30 seconds while the state of charge is above about 10%. 1 C is the current at which the battery is discharged (or charged) in 1 hour. 0.5 C is the current at which the battery is discharged (or charged) in 2 hours.

Example 2: Fast Charging

Figure 2:
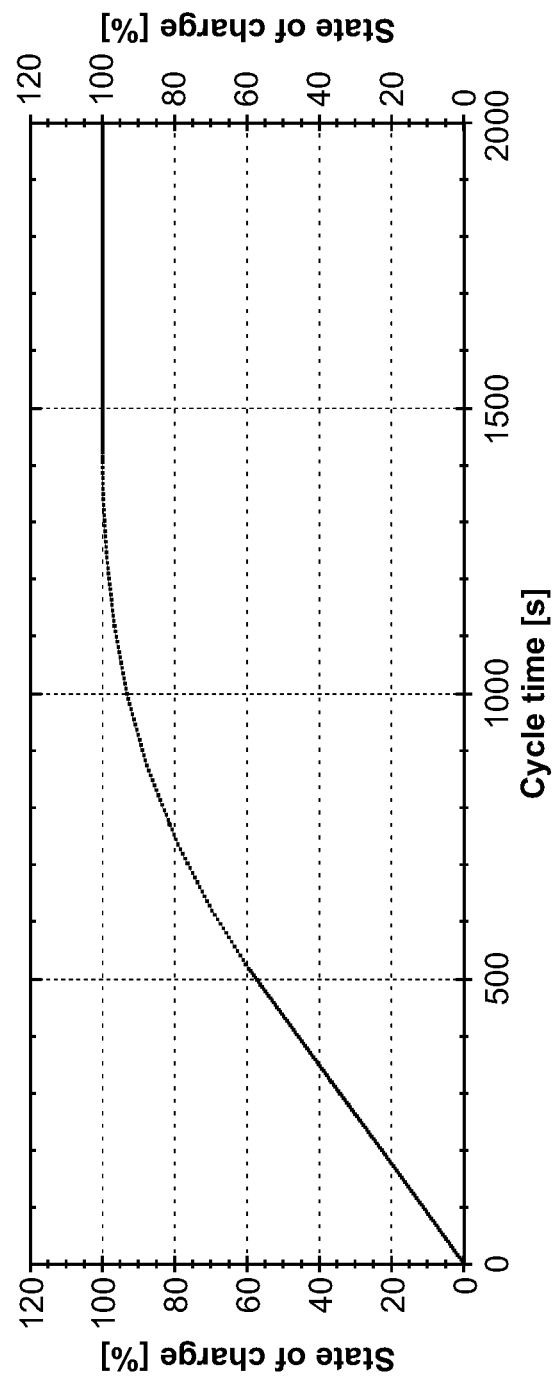
FIG. 2 is a plot of state of charge (SOC) as function of cycle time (seconds).

Electrochemical cells were constructed and formed as described in Example 1. A cell was heated to 25° C. and a 4 C charging current was applied until the cell reached 4.4V, at which time a constant voltage of 4.4V was applied until the current fell below C/20 or 15 minutes, whichever came first. FIG. 2 shows the state of charge plotted against time, showing that the cell charged from 0-80% state of charge (SOC) in 12.5 minutes. In FIG. 2, the "ESS7.4" is synonymous with a 70:30 v/v mixture of ethylene sulfite and sulfolane with 1.4 M Li$^+$ concentration. "ESS+1.6M LiBF$_4$," is a 70:30 v/v mixture of ethylene sulfite and sulfolane with 1.6 M Li$^+$ concentration.

FIG. 4 shows a comparison of charging rate for cells with 3 different catholytes: a 45:55 mix of ethylene carbonate: sulfolane with 1.4M LiPF$_6$ (ECS), which is labeled ECS45.4, a 70:30 mix of ethylene sulfite:sulfolane with 1.6M LiBF$_4$ (ESS1), and a 70:30 mix of ethylene sulfite:sulfolane with 1.4M LiPF$_6$ (ESS2). Cells with ESS1 and ESS2 catholytes were able to charge from 0-80% state of charge in 12-15 minutes, whereas cells with ECS charged in 15-20 minutes.

Additional electrochemical cells were constructed and formed as described in Example 1. A cell was brought to 25° C. and a 4 C charging current was applied until the cell reached 4.4V, at which time a constant voltage of 4.4V was applied until the current fell below C/20 or 15 minutes, whichever came first.

FIG. 9 shows a comparison of charging rate for cells with two catholytes: a 70:30 mixture by volume of ethylene sulfite:sulfolane with 1.4M LiBF$_4$, and a 50:50 mixture by volume of ethylene sulfite:sulfolane with 1.4M LiBF$_4$. Cells with a 70:30 mixture by volume of ethylene sulfite:sulfolane catholyte, with 1.4M LiBF$_4$, charged from 0-80% state of charge in 15-22 minutes, whereas cells with 50:50 mixture by volume of ethylene sulfite:sulfolane with 1.4M LiBF$_4$ charged in 23-30 minutes. The ratio of ethylene sulfite to sulfolane is shown in the label on the x-axis, e.g., the "70-30" in 70-30 ESS refers to a 70:30 volume ratio ethylene sulfite to sulfolane. The "50-50" in 50-50 ESS refers to a 50:50 volume ratio ethylene sulfite to sulfolane.

FIG. 10 shows a comparison of charging rate for cells with different catholytes as shown on the x-axis. These results are described in Example 2, herein. The ratio of ethylene sulfite to sulfolane is shown in the label on the x-axis, e.g., the "70-30" in 70-30 ESS refers to a 70:30 volume ratio ethylene sulfite to sulfolane. The "70-30" in 70-30 MA-S refers to a 70:30 volume ratio methyl acetate to sulfolane.

FIG. 11 shows a comparison of charging rate for cells with different catholytes as shown on the x-axis. In "70-30 ESS+1.2M 10% LiFSi," the "1.2M" refers to the Li$^+$ concentration in a solution of LiFSi. The "10%" means that the catholyte included 10% by volume of the LiFSi solution and 90% by volume of the 70-30 ESS 1.4 M LiBF$_4$ solution described above. "70-30 ESS+1.2M 10% LiFSi," is a mixture that includes 90% by volume the 70-30 v/v solution of ethylene sulfite and sulfolane. "70-30 ESS+1.2M 10% LiFSi," is a mixture that includes 10% by volume the 1.2M LiFSi solution.

Example 3: Calendar Life

Cells were made and formed according to Example 1. The cells were then charged and discharged at a rate of C/3 between 3.4-4.4 V to measure an initial ASR (area-specific resistance) and then charged at C/3 to 4.4 V. C/3 is the current at which the battery is charged or discharged in 3 hours. The cells were held at open circuit voltage in a chamber at 60° C. for 7 days and then discharged at 25° C. at a rate of C/3 to 3.4V. The cells were then charged and discharged from 3.4-4.4 V at 25° C. at a rate of C/3 to measure a final ASR. The initial ASR and final ASR were used as metrics of calendar life of the cell. A cell preferably has a low initial ASR and little growth in ASR to a final ASR value.

The area-specific resistance (ASR) in units of Ω cm$^2$ was calculated by determining the internal resistance of the cell via current interrupt technique near 50% state-of-charge in the charge cycle and multiplying that resistance in ohms by the cell area in cm$^2$. In this measurement, the cell is observed after turning off the current (i.e., at relaxation). FIG. 3 shows the final ASR for cells with two different catholytes: a 70:30 v/v mix of ethylene sulfite:sulfolane (ESS, which is labeled as 70:30 ESI:SLF), and a 45:55 v/v mix of ethylene carbonate:sulfolane (ECS, which is labeled as ECS 45.4). As shown in FIG. 3, there is a statistically significant difference between the final ASR, where the cells with ESS have a lower final ASR.

FIG. 5 shows the discharge capacity of cells after storage at 60° C. for one week with different additive amounts of ethylene sulfite additive: 0.5%, 1%, 2%, 4%, and 8% by weight in ECS. Cells with up to 8% ethylene sulfite have a high discharge capacity after storage.

Experiments were conducted to obtain the following data in the following Table 1. Cells were made and formed according to Example 1. The cells were then charged and discharged at a rate of C/3 between 3.4-4.35 V to measure an initial ASR (area-specific resistance) and then charged at C/3 to 4.35 V. C/3 is the current at which the battery is charged or discharged in 3 hours. The cells were held at open circuit voltage in a chamber at 60° C. for 7 days and then discharged at 25° C. at a rate of C/3 to 3.4V. The cells were then charged and discharged from 3.4-4.35 V at 25° C. at a rate of C/3 to measure a one-week ASR. An additional three-weeks storage at 60° C. occurred. A final ASR check was measured at 25° C. All ASR was measured at 25° C. Storage conditions included 4.35 V and 60° C.

TABLE 1

| Additive | Median charge ASRDC [Ω-cm$^2$] |
|---|---|
| Li$_2$SO$_4$ | A |
| Li$_2$SO$_4$ | A |
| Li$_2$SO$_4$ | B |
| Li$_2$SO$_4$ | B |
| Li$_2$SO$_4$ | B |
| Li$_2$SO$_4$ | B |
| LiF | A |
| LiF | A |
| LiF | A |
| LiF | B |
| LiF | B |
| LiF | B |

TABLE 1-continued

| Additive | Median charge ASRDC [Ω-cm²] |
|---|---|
| LiF | B |
| LiF | B |
| methyl acetate | B |
| methyl acetate | B |
| methyl acetate | B |
| methyl acetate | B |
| methyl acetate | B |
| methyl acetate | B |
| methyl acetate | B |
| methyl acetate | B |
| methyl acetate | C |
| methyl acetate | C |
| TMSB | B |
| TMSB | B |
| TMSB | B |
| TMSB | B |
| TMSB | B |
| TMSB | B |
| TMSB | B |
| TMSB | C |
| TTSPa | B |
| TTSPa | B |
| TTSPa | B |
| TTSPa | B |
| TTSPa | B |
| TTSPa | B |
| TTSPa | C |

In Table 1, A is 0 Ω-cm² to 59 Ω-cm²; B is 60 Ω-cm² to 100 Ω-cm²; and C is 60 Ω-cm² to 100 Ω-cm².

See FIG. 12 for a one-month ASR study for a catholyte molarity skew of 0.5M to 5M, wherein the molarity skew refers to the concentration of LiBF$_4$ salt in a catholyte of 70:30 v/v ethylene sulfite and sulfolane.

FIG. 6 shows the charge ASR after storage at 60° C. for one week with different amounts of ethylene sulfite additive: 0.5%, 1%, 2%, 4%, and 8% by weight in ECS. Cells with up to 8% ethylene sulfite have a lower charge ASR after storage.

FIG. 7 shows the charge ASR after storage at 60° C. for one week with two different catholytes: 70:30 mix of ethylene sulfite:sulfolane with 1.4M LiPF$_6$ (ESS, labeled as 1.4M LiPF$_6$/ESS) versus 45:55 mix of ethylene carbonate:sulfolane with 1.4M LiPF$_6$ (ECS, labeled as ECS45.4). The charge ASR is lower for cells with ESS than with ECS after storage.

FIG. 12 shows the charge ASR after storage at 60° C. for one-month with three different catholytes: 70:30 mix of ethylene sulfite:sulfolane with 0.5 M LiBF$_4$, 1.4 M LiBF$_4$, or 5 M LiBF$_4$. The cells were then charged and discharged at a rate of C/3 between 3.4-4.35 V to measure an initial ASR (area-specific resistance) and then charged at C/3 to 4.35 V. C/3 is the current at which the battery is charged or discharged in 3 hours. The cells were held at open circuit voltage in a chamber at 60° C. for 7 days and then discharged at 25° C. at a rate of C/3 to 3.4V. The cells were then charged and discharged from 3.4-4.35 V at 25° C. at a rate of C/3 to measure a one-week ASR. An additional three-weeks storage at 60° C. occurred. A final ASR check was measured at 25° C. All ASR was measured at 25° C. Storage conditions included 4.35 V and 60° C.

Example 4

Cells were made according to Example 1. The cycle life of cells made with ESS (70:30 ethylene sulfite:sulfolane with 1.4M LiPF$_6$) and ECS (45:55 ethylene carbonate:sulfolane with 1.4M LiPF$_6$) were tested by cycling cells between 3-4.4V at 45° C. at a rate of C/3. FIG. 8 shows that the cycle life of the cell with ESS catholyte is superior to the cycle life of a cell with ECS catholyte.

Example 5

Catholyte solutions were prepared by mixing ethylene sulfite (Sigma Aldrich 774251) and sulfolane (Sigma Aldrich T22209) in various ratios from 4:6 to 8:2, by volume, respectively, and including 1:1 and 7:3.

After mixing ethylene sulfite and sulfolane, the resulting mixture was dried over molecular sieves until the solution contained less than 10 parts-per-million (ppm) H$_2$O. The mixture was decanted away from the molecular sieves.

Lithium salt (LiPF$_6$ or LiBF$_4$) was added at a concentration ranging from 0.8 M to 2 M. The salt was added slowly to reduce the temperature rise.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A catholyte solution comprising:
   a lithium salt; and
   sulfolane; and
   ethylene sulfite;
   wherein the ratio of sulfolane:(ethylene sulfite) is from 30:70 v/v to 50:50 v/v.

2. The catholyte solution of claim 1, further wherein the solution is in contact with a solid-state electrolyte comprising lithium-stuffed garnet, wherein the solid-state electrolyte is a thin film.

3. The catholyte solution of claim 1, wherein the lithium salt is selected from the group consisting of LiPF$_6$, Lithium bis(oxalato)borate (LiBOB), lithium bis(perfluoroethanesulfonyl)imide (LIBETI), bis(trifluoromethane)sulfonimide (LiTFSI), LiBF$_4$, LiClO$_4$, LiAsF$_6$, lithium bis(fluorosulfonyl)imide (LiFSI), LiF, LiCl, LiBr, LiI, and combinations thereof.

4. The catholyte solution of claim 1, wherein the lithium salt is LiPF$_6$ or LiBF$_4$.

5. The catholyte solution of claim 1, wherein the lithium salt is 1.4M LiPF$_6$; 1.4M LiBF$_4$; or 1.6M LiBF$_4$.

6. The catholyte solution of claim 1, wherein the lithium salt is present at a concentration of about 0.5 M to about 2.0 M.

7. An electrochemical cell comprising the catholyte solution of claim 1.

8. The catholyte solution of claim 1, further comprising 1,3-propane sultone.

9. The catholyte solution of claim 1, further comprising thiophene.

10. The catholyte solution of claim 1, wherein the ratio of sulfolane:(ethylene sulfite) is 30:70 v/v.

11. The catholyte solution of claim 1, wherein the ratio of sulfolane:(ethylene sulfite) is 50:50 v/v.

12. The catholyte solution of claim 1, further comprising an additive selected from the group consisting of tris(trimethysilyl) phosphite; tris(trimethysilyl) phosphate; trimethoxyboroxine; vinyl ethylene carbonate; methylene methane disulfonate; prop-1-ene-1,3 sultone; 1,3-propane sultone; fluoroethylene carbonate; LiTFSi; LiBOB; succinonitrile, trimethylene sulfate; triallyl phosphate; tris(trimethylsilyl) borate; tris(pentafluorophenyl) borane; tris(pentafluorophenyl)borane; methyl acetate; tris(trimethylsilyl) acetate; tris(trimethylsilyl) pyridine; tris(trimethylsilyl) methacrylate; tris (2,2,2-trifluoroethyl) phosphite; tris(2,2,2-trifluoroethyl) borate; and combinations thereof.

13. The catholyte solution of claim 12, wherein the additive is $TTSP_i$.

14. The catholyte solution of claim 12, wherein the additive is $TTSP_a$.

15. The catholyte solution of claim 2, wherein the solid-state electrolyte is a lithium-stuffed garnet characterized by a formula selected from the group consisting of $Li_4La_BM'_CM''_DZr_EO_F$, $Li_4La_BM'_CM''_DTa_EO_F$, and $Li_4La_BM'_CM''_DNb_EO_F$, wherein $4<A<8.5$, $1.5<B<4$, $0≤C<2.5$, $0≤D<2.5$; $0<E<2.5$, $10<F<14$, and wherein M' and M" are each, independently, selected from the group consisting of Al, Mo, W, Nb, Ga, Y, Gd, Sb, Ca, Ba, Sr, Ce, Hf, Rb, and Ta.

16. The catholyte solution of claim 1, wherein the catholyte solution has a boiling point within a range from 60° C. to 100° C.

17. A method for making catholyte solution, comprising:
  mixing sulfolane and ethylene sulfite, and wherein the ratio of sulfolane:(ethylene sulfite) is from 30:70 v/v to 50:50 v/v; and
  a lithium salt; thereby providing a catholyte solution.

18. A catholyte solution comprising:
  a lithium salt; and
  two $C_{3-10}$ heterocyclic molecules, wherein a ratio of one $C_{3-10}$ heterocyclic molecule to the other $C_{3-10}$ heterocyclic molecules is from 30:70 v/v to 50:50 v/v;
  wherein at least one $C_{3-10}$ heterocyclic molecules is sulfolane; and
  wherein at least one $C_{3-10}$ heterocyclic molecules is ethylene sulfite.

* * * * *